(12) United States Patent
Rykowski et al.

(10) Patent No.: US 10,122,577 B1
(45) Date of Patent: Nov. 6, 2018

(54) PRE-POPULATING FIELDS FOR CREATING DYNAMICALLY GENERATED CONFIGURATION PROFILES

(71) Applicant: AIRWATCH LLC, Atlanta, GA (US)

(72) Inventors: Adam Stephen Rykowski, Atlanta, GA (US); Huda Osman, Atlanta, GA (US); Mithila Tople, Atlanta, GA (US); Jacob Postema, Atlanta, GA (US); Jeremy Dejiacomo, Atlanta, GA (US); Harit Patel, Atlanta, GA (US); Manikandan Sigamani, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 15/661,015

(22) Filed: Jul. 27, 2017

(30) Foreign Application Priority Data

Jun. 1, 2017 (IN) .............................. 201741019336

(51) Int. Cl.
| | |
|---|---|
| *H04L 12/24* | (2006.01) |
| *G06F 17/30* | (2006.01) |
| *H04L 29/08* | (2006.01) |
| *G06F 17/24* | (2006.01) |
| *H04W 84/12* | (2009.01) |

(52) U.S. Cl.
CPC ........ *H04L 41/0806* (2013.01); *G06F 17/243* (2013.01); *G06F 17/3053* (2013.01); *G06F 17/30283* (2013.01); *H04L 41/22* (2013.01); *H04L 67/303* (2013.01); *H04W 84/12* (2013.01)

(58) Field of Classification Search
CPC .... H04L 41/0806; H04L 41/22; H04L 67/303
See application file for complete search history.

(56) References Cited

U.S. PATENT DOCUMENTS

| | | |
|---|---|---|
| D607,468 S | 1/2010 | Ho |
| D640,269 S | 6/2011 | Chen |
| D758,424 S | 6/2016 | Ding et al. |
| D762,676 S | 8/2016 | Lim |
| D763,905 S | 8/2016 | Patel |
| D765,664 S | 9/2016 | Taniuchi et al. |
| D795,279 S | 8/2017 | Van Every et al. |
| D801,373 S | 10/2017 | Vaglio et al. |
| D808,397 S | 1/2018 | Beaty et al. |
| D808,398 S | 1/2018 | Beaty et al. |
| D809,542 S | 2/2018 | Lu |
| D812,080 S | 3/2018 | Saneii |

(Continued)

OTHER PUBLICATIONS

Office Action dated Apr. 2, 2018 for U.S. Appl. No. 26/605,888.

*Primary Examiner* — Lakeram Jangbahadur
(74) *Attorney, Agent, or Firm* — Thomas | Horstemeyer, LLP

(57) ABSTRACT

Disclosed are various examples for pre-populating fields for creating dynamically generated configuration profiles. A computing environment can identify at least one field for input of a setting used to generate a configuration profile and can query existing configuration profiles to identify existing settings specified through the at least one field that can be actively used in device management. The existing settings can be ranked to determine a recommended value for the at least one field. The computing environment can generate a user interface that includes the at least one field, such that it is pre-populated to comprise the recommended value as a default value.

20 Claims, 56 Drawing Sheets

(56) References Cited

U.S. PATENT DOCUMENTS

| | | |
|---|---|---|
| D813,262 S | 3/2018 | Wan |
| 2015/0324608 A1* | 11/2015 | Dabbiere ................ H04L 29/08 |
| | | 726/1 |
| 2016/0092481 A1* | 3/2016 | Marshall ........... G06F 17/30554 |
| | | 707/741 |
| 2016/0366079 A1* | 12/2016 | Razavian ................ H04L 51/18 |

* cited by examiner

| id | field_name | os_ios_v10 | os_android_v11 | os_windows_v9 | ... |
|---|---|---|---|---|---|
| ... | ... | ... | ... | ... | ... |
| 1598 | common_wifi_ssid | SSID_STR | SSID | wifi_ssid | ... |
| 1599 | common_wifi_pass | Password | WIFIPASS | wifi_pass | ... |
| ... | ... | ... | ... | ... | ... |

| | iOS | OS X® (User) | Android® | Windows® Phone 10 | Windows® Desktop 10 |
|---|---|---|---|---|---|
| ... | ... | ... | ... | ... | ... |
| Mail Client | Mail Client | Email Client | Mail Client | Mail Client | Mail Client |
| Account Name | Account Name | Account Name | Account Name | Account Name | Account Name |
| Exchange Host | Exchange ActiveSync Host | Internal Exchange Host | Exchange ActiveSync Host | Exchange ActiveSync Host | Exchange ActiveSync Host |
| Use SSL | Use SSL | Use SSL for Internal Exchange Host | Use SSL | Use SSL | Use SSL |
| ADVANCED SECTION | | | | | |
| Domain | Domain | N/A – Prepended to Username Setting | Domain | Domain | Domain |
| Username | Username | Username | User | Username | Username |
| Email Address | Email Address | Email Address | Email Address | Email Address | Email Address |
| Password | Password | Password | Password | Password | Password |
| Show Characters | Show Characters | Show Characters | Show Characters | Show Characters | Show Characters |
| Identity Certificate | Payload Certificate | Payload Certificate | Identity Certificate | Identity Certificate | Identity Certificate |
| Past Days of Mail to Sync | Past Days of Mail to Sync | N/A | Past Days of Mail to Sync | Past Days of Mail to Sync | Past Days of Mail to Sync |
| Sync Calendar | N/A | N/A | Sync Calendar | Allow Calendar Sync | Allow Calendar Sync |
| Sync Contacts | N/A | N/A | Sync Contacts | Allow Contacts Sync | Allow Contacts Sync |
| ... | ... | ... | ... | ... | ... |

*FIG. 7B*

| Connection Type | iOS | OS X® (User) | Android® | Windows® Phone 10 | Windows® Desktop 10 |
|---|---|---|---|---|---|
| ... | ... | ... | ... | ... | ... |
| Connection Type | Connection Type = AirWatch Tunnel | N/A | Connection Type = Pulse Secure | Connection Type = Junos Pulse | Connection Type = Junos Pulse |
| Connection Name | Connection Name | N/A | Connection Name | Connection Name | Connection Name |
| Server | Server | N/A | Server | Server | Server |
| ... | ... | ... | ... | ... | ... |

| Connection Type | iOS | OS X® (User) | Android® | Windows® Phone 10 | Windows® Desktop 10 |
|---|---|---|---|---|---|
| ... | ... | ... | ... | ... | ... |
| Connection Type | Connection Type = AirWatch Tunnel | Connection Type = AirWatch Tunnel | Connection Type = AirWatch Tunnel | Connection Type = AirWatch Tunnel | Connection Type = AirWatch Tunnel |
| Connection Name | Connection Name | Connection Name | Connection Name | Connection Name | Connection Name |
| Server | Server | Server | Server | Server | Server |
| ... | ... | ... | ... | ... | ... |

| | iOS | OS X® (User) | Android® | Windows® Phone 10 | Windows® Desktop 10 |
|---|---|---|---|---|---|
| Connection Type | Connection Type = Cisco AnyConnect | N/A | Connection Type = Cisco AnyConnect | Connection Type = Cisco AnyConnect | N/A |
| Connection Name | Connection Name | N/A | Connection Name | | N/A |
| Server | Server | N/A | Server | | N/A |

*FIG. 7E*

| | iOS | OS X® (User) | Android® | Windows® Phone 10 | Windows® Desktop 10 |
|---|---|---|---|---|---|
| ⋮ | ⋮ | ⋮ | ⋮ | ⋮ | ⋮ |
| Payload | Wi-Fi | Network Interface = Wi-Fi | Wi-Fi | Wi-Fi | Wi-Fi |
| Service Set Identifier | Service Set Identifier | Service Set Identifier | Service Set Identifier | Service Set Identifier | Service Set Identifier |
| Hidden Network | Hidden Network | Hidden Network | Hidden Network | Hidden Network | Hidden Network |
| Auto-Join | Auto-Join | Auto-Join | Set as Active Network | Auto-Join | Auto-Join |
| Security Type | Security Type | Security Type | Security Type | Security Type | Security Type |
| 1. None<br>2. Shared<br>3. WPA Personal<br>4. WPA2 Personal<br>5. WPA Enterprise<br>6. WPA2 Enterprise | 1. None<br>2. Any (Personal)<br>3. WPA/WPA2<br>4. WPA2 Personal<br>5. WPA/WPA2 Enterp.<br>6. WPA2 Enterprise | 1. None<br>2. Any (Personal)<br>3. WPA/WPA2<br>4. WPA2 Personal<br>5. WPA/WPA2 Enterp.<br>6. WPA2 Enterprise | 1. None<br>2. Any (Personal)<br>3. WPA/WPA2<br>4. WPA/WPA2<br>5. WPA/WPA2 Enterp...<br>6. WPA/WPA2 Enterp... | 1. Open<br>2. Shared<br>3. WPA Personal<br>4. WPA2 Personal<br>5. WPA Enterprise<br>6. WPA2 Enterprise | 1. Open<br>2. Shared<br>3. WPA Personal<br>4. WPA2 Personal<br>5. WPA Enterprise<br>6. WPA2 Enterprise |
| Encryption | N/A | N/A | N/A | Encryption | Encryption |
| 1. None<br>2. WEP<br>3. TKIP<br>4. AES | 1. Ignore<br>2. If Security Type is Shared, change the Security Type to WEP. Otherwise, ignore.<br>3. Ignore<br>4. Ignore | 1. Ignore<br>2. If Security Type is Shared, change the Security Type to WEP. Otherwise, ignore.<br>3. Ignore<br>4. Ignore | 1. Ignore<br>2. If Security Type is Shared, change the Security Type to WEP. Otherwise, ignore.<br>3. Ignore<br>4. Ignore | 1. None<br>2. WEP<br>3. TKIP<br>4. AES | 1. None<br>2. WEP<br>3. TKIP<br>4. AES |
| Protocol | Protocols | Protocols | Protocols — SFA Type | Protocols | Protocols |
| 1. TTLS<br>2. PEAP<br>3. TLS | 1. TTLS<br>2. PEAP<br>3. EAP-TLS | 1. TTLS<br>2. PEAP<br>3. EAP-TLS | 1. TTLS<br>2. PEAP<br>3. TLS | 1. EAP-TTLS<br>2. Peap-MsChapv2<br>3. EAP-TTLS | 1. EAP-TTLS<br>2. Peap-MsChapv2<br>3. EAP-TTLS |
| Password | Password | Password | Password | Password | Password |
| ⋮ | ⋮ | ⋮ | ⋮ | ⋮ | ⋮ |

*FIG. 7F*

| | iOS | OS X® (User) | Android® | Windows® Phone | Windows® Desktop |
|---|---|---|---|---|---|
| Payload | ... | ... | ... | ... | ... |
| Service Set Identifier | Wi-Fi | Wi-Fi | Wi-Fi | Wi-Fi | Wi-Fi |
| Hidden Network | Service Set Identifier | Service Set Identifier | Service Set Identifier | Service Set Identifier | Service Set Identifier |
| Auto-Join | Hidden Network | Hidden Network | Hidden Network | Hidden Network | Hidden Network |
| Security Type | Auto-Join | Auto-Join | Set as Active Network | Auto-Join | Auto-Join |
| WPA Personal | Security Type | Security Type | Security Type | Security Type | Security Type |
| Encryption | WPA/WPA2 | WPA/WPA2 | WPA/WPA2 | WPA Personal | WPA Personal |
| 1. TKIP 2. AES | N/A | N/A | N/A | Encryption | Encryption |
| Password | Disregard | Disregard | Disregard | 1. TKIP 2. AES | 1. TKIP 2. AES |
| ... | Password | Password | Password | Password | Password |
| | ... | ... | ... | ... | ... |

*FIG. 7G*

| | iOS | OS X® | Android® | Windows® Phone 10 | Windows® Desktop 10 |
|---|---|---|---|---|---|
| ... | ... | ... | ... | ... | ... |
| Profile Payload | Exchange ActiveSync | (User) Exchange Web Services | Exchange ActiveSync | Exchange ActiveSync | (User) Exchange ActiveSync |
| | ... | | | | ... |

*FIG. 7H*

```
<?xml version="1.0" encoding="UTF-8"?>
<!DOCTYPE plist PUBLIC "-//Apple//DTD PLIST 1.0//EN" "http://www.apple.com/DTDs/
PropertyList-1.0.dtd">
<plist version="1.0">
  <dict>
    <key>SSID_STR</key>
    <string>AlphaCo Employee WiFi</string>
    <key>CommandUUID</key>
    <string>9F09D114-BCFD-4CAD-A974-371AA7D6256E</string>
    <key>Status</key>
    <string>Acknowledged</string>
  </dict>
</plist>
```

```
<WLANProfile
xmlns="http://www.microsoft.com/networking/WLAN/profile/v1">
  <name><Name of wifi profile></name>
  <SSIDConfig>
    <SSID>
      <hex>53534944</hex>
      <name>AlphaCo Employee WiFi</name>
    </SSID>
    <nonBroadcast>false</nonBroadcast>
  </SSIDConfig>
  <connectionType>ESS</connectionType>
  <connectionMode>auto</connectionMode>
  <autoSwitch>false</autoSwitch>
  <MSM>
    <security>
      <authEncryption>
        <authentication><Type of authentication></authentication>
        <encryption><Type of encryption></encryption>
        <useOneX>false</useOneX>
      </authEncryption>
      <sharedKey>
        ...
```

Add VPN Resource

1. Resource Details      2. Platforms      3. Assignment

| Field | Value |
|---|---|
| Resource Name* | VPN |
| Description | This is a description of the VPN resource. |

CONNECTION INFO

| Field | Value |
|---|---|
| Connection Type | AirWatch® Tunnel |
| | Cisco® AnyConnect® VPN |
| | Pulse Secure® VPN |
| Connection Name* | |
| Server* | TCP://enterprise.site:8443 |

ⓘ The "AirWatch® Tunnel" VPN is not configured. It can be configured via System Settings here.

[ Previous ]   [ Next ]   Cancel

VPN: iOS (Pulse Secure®)

CONNECTION INFO

- Account
- Disconnect on idle (min)
- Realm
- Role
- Per-App VPN Rules ☐  iOS7

AUTHENTICATION

- User Authentication: Password
- Password
  - ☐ Show Characters

PROXY

- Proxy: None

VENDOR CONFIGURATIONS

- Vendor Keys ☐

Save   Cancel

Add a Certificate

| | |
|---|---|
| Certificate Source | Defined Certificate Authority ▼ |
| Certificate Name* | Certificate2 |
| Certificate Authority* | Select Certificate Authority ▼ |
| Certificate Template* | Select Certificate Template ▼ |

[ Previous ]  [ Next ]  Cancel

PRE-POPULATING FIELDS FOR CREATING DYNAMICALLY GENERATED CONFIGURATION PROFILES

CROSS-REFERENCE TO RELATED APPLICATIONS

Benefit is claimed under 35 U.S.C. 119(a)-(d) to Foreign Application Serial No. 201741019336 filed in India entitled "DYNAMIC CONSTRUCTION OF CONFIGURATION PROFILES FOR SETTINGS COMMON ACROSS DIFFERENT OPERATING SYSTEMS", on Jun. 1, 2017, by AIRWATCH LLC, which is herein incorporated in its entirety by reference for all purposes.

The present application is related in subject matter to U.S. patent application Ser. No. 15/660,990, U.S. patent application Ser. No. 15/660,998, U.S. patent application Ser. No. 15/661,000, U.S. patent application Ser. No. 15/661,001, and U.S. patent application Ser. No. 15/661,005, which are incorporated herein by reference.

BACKGROUND

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a management service capable of protecting enterprise data stored on a device from theft, data loss, and unauthorized access. Through an administrator console, administrators for the enterprise can oversee the operation of enrolled devices.

Particular operating systems offer device management capabilities that allow the administrators to create policies or other settings to manage the configuration of a device. For example, depending on the capabilities of an operating system, an administrator of an enterprise can remotely install applications, resources, or other data on an employee's device. Depending on the sophistication of the administrator, remotely configuring a device, or a multitude of devices with varying capabilities, can be problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 7A-7H are example excerpts of database tables for mapping fields of a user interface to variable names for different versions or types of operating systems.

FIGS. 8A-8B are example excerpts of a configuration profile illustrating the differences between configuration profiles generated for different operating systems.

FIG. 10 is a drawing of a user interface for configuring virtual private network (VPN) settings common to various platforms.

FIGS. 11A-11L are drawings of user interfaces for configuring advanced VPN settings specific to various platforms.

FIGS. 12A-12E are drawings of user interfaces for configuring email settings common to various platforms.

FIGS. 13A-13E are drawings of user interfaces for configuring advanced email settings specific to various platforms.

FIG. 14 is a drawing of a user interface for configuring wireless fidelity (Wi-Fi) network settings common to various platforms.

DETAILED DESCRIPTION

Figure 1:
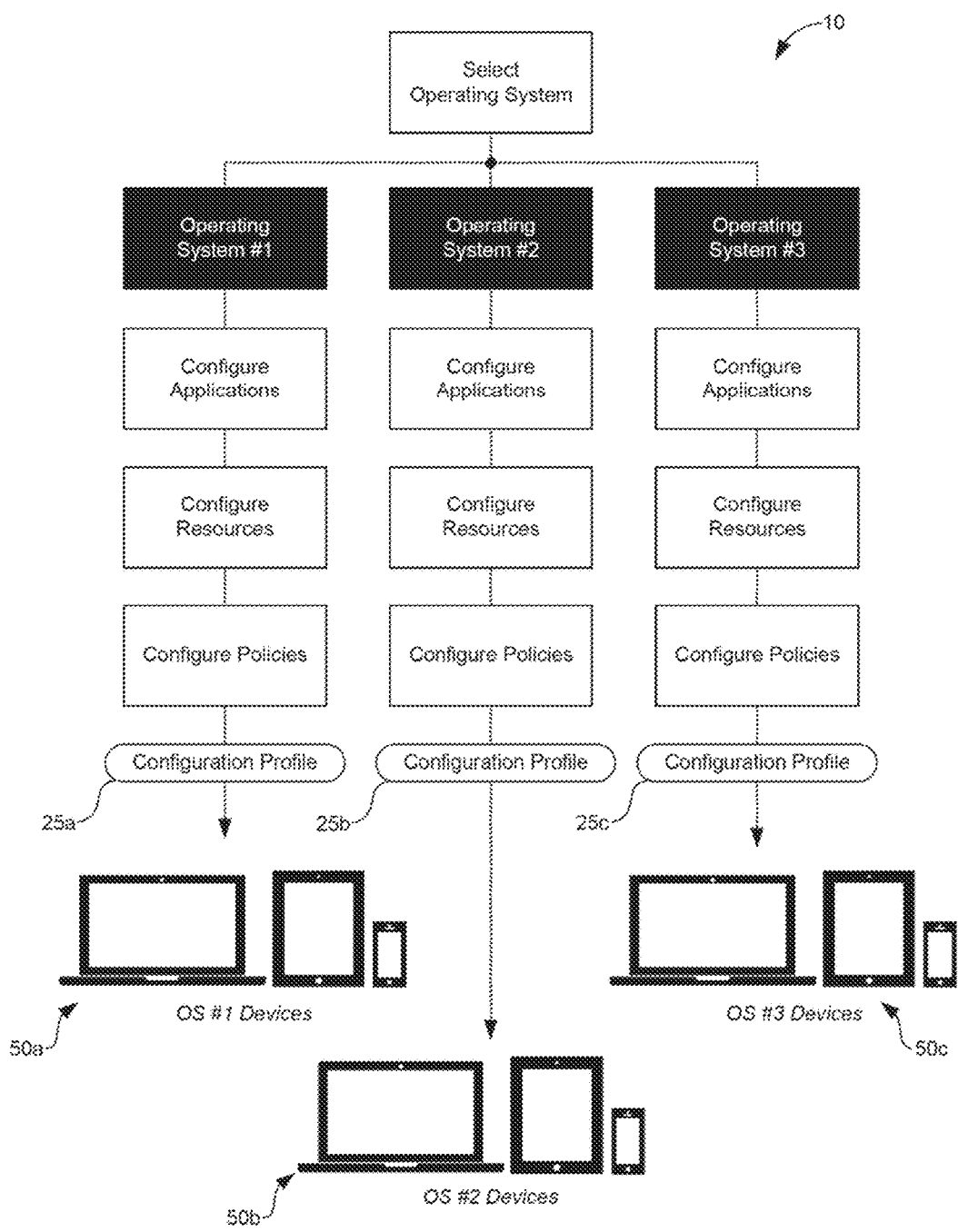
FIG. 1 is a drawing of a process chart that illustrates the traditional process of creating a configuration profile when an operating system is first selected.

The present disclosure relates to the dynamic construction of operating system profiles for commonly defined settings. Different devices, such as smartphones, tablets, and personal computers, can have one or more of a multitude of operating systems installed thereon. For example, devices brought into a given workplace can have the Microsoft Windows®, Apple® iOS, Apple® OS X®, Android®, Ubuntu® Linux, or other operating system installed thereon. Each operating system provides varying degrees of features, capabilities, and restrictions with respect to device management. For example, one operating system can allow an administrator to remotely configure Bluetooth® functionality on a device while another operating system may restrict or not provide access to the Bluetooth® functionality. Additionally, to change a Bluetooth® setting on an Android® device, an application on the device must make an Android®-specific API call, whereas to change a Bluetooth® setting on an iOS device, an application on the device must make an iOS-specific API call.

Traditionally, to account for the differing ways to configure devices based on the various operating systems, or other hardware or software specifications, an administrator would manually create a profile for each operating system. For instance, an administrator console might include an ingestion process where an administrator provides information in a series of user interfaces, also known as a "wizard," in which the administrator specifies settings for devices managed by the enterprise. However, at the beginning of the wizard, the administrator is required to select an operating system where any options shown throughout the wizard would be specific to the selected operating system. At the end of the wizard, a device profile is created that is specific to the selected operating system and specific to information provided in the wizard. Only the operating system selected at the beginning of the wizard would be supported for device management purposes, unless the administrator again went through each step in the wizard after having specified a different operating system.

Moreover, each operating system (or version of operating system) can have different variable names, function calls, or other parameters that must be used to configure settings on each device. Hence, due to the difference in variable names required to configure settings on those devices, a profile for one operating system can be vastly different than a profile configured for a different operating system. As the restrictions and capabilities differ for each operating system, an administrator must be aware of a multitude of differences and nuances prior to setting restrictions.

The aforementioned limitations are addressed herein by obtaining information that can be commonly applied to different operating systems and dynamically constructing profiles to configure devices for each operating system (referred to herein as "configuration profiles"). Information that can be common to different types of devices or operating systems can include, for example, wireless fidelity (Wi-Fi) settings, virtual private network (VPN) settings, email settings, or other similar information.

In one example, an enterprise can have a Wi-Fi network having an SSID named "AlphaCo Employee WiFi" with a password of "Alpha12345." An administrator may desire to configure managed devices to store the SSID of "AlphaCo Employee WiFi" and the password of "Alpha12345," such that, when a device enters a workplace, it automatically connects to the wireless network and the end user is not required to manually enter the settings. As can be appreciated, doing so may prevent unauthorized distribution of potentially sensitive data over a third-party network.

Previously, the administrator would be required to create a profile for iOS devices that defined wireless network and password settings using variable names specific to iOS as well as create a profile for Android® devices that defined wireless network and password settings using variable names specific to Android®. The ingestion process, where an administrator navigates wizard and provides information, would again have to be repeated and information redundantly provided until all operating systems have been accounted for. Examples described herein, however, provide for dynamically buildings profiles specific to each supported operating system without requiring an administrator to manually create different profiles for each operating system. In a wizard, an administrator may define the Wi-Fi settings, and a computing environment may automatically build a profile for each supported operating system to configure the Wi-Fi settings, or other common settings, depending on platform-specific variable names.

According to various examples described herein, a computing environment can identify a value from a field of a user interface specified by an administrator, where the field pertains to a setting common or applicable to a multitude of different operating systems. The computing environment can determine a first variable name for inclusion in a first configuration profile in association with the value based on a first operating system. For example, a variable name for a wireless network on iOS may include "WiFiMac" which is specific to the iOS operating system. Using this variable name, a profile can be generated which will be deployed to iOS devices to configure the wireless network settings.

Additionally, the computing environment can determine a second variable name for inclusion in a second configuration profile in association with the value based at least in part on a second, different operating system. For instance, the "WiFi_iOS" variable name would not successfully configure a wireless network on an Android® or a Windows® device. Instead, a second profile can be generated using the "WiFi_Android" variable name for deployment to Android® devices as the "WiFi_Android" variable name must be used to successfully configure Android® devices.

The computing environment can dynamically generate both the first configuration profile and the second configuration profile using the appropriate variable names such that the value provided by an administrator is a value or parameter of the first variable name for deployment to a first client device having the first operating system installed thereon and a second client device having the second operating system installed thereon. An administrator is thus not required to create two different profiles for each operating system as the creation of the profiles and the mapping of variables names to a particular operating system are handled dynamically. The computing environment can publish the deployment configuration for at least one user group, thereby causing the client devices to automatically implement or install the profiles on the client devices currently enrolled with the management service, or at a time when a client device newly enrolls with the management service. If a user is part of more than one user group, any duplicate client applications, resources, or other data can be ignored and, if conflicting policies exist among the different user groups, then the more restrictive policy can be automatically employed.

With reference to FIG. 1, a process map 10 is shown illustrating a traditional process followed by an administrator when creating a configuration profile 25a . . . 25c that configures client devices 50a . . . 50c enrolled with a management service. A configuration profile 25 can include a document or other type of file that includes a listing of configurations that direct an application or an operating system of a client device 50 to perform on the client device 50. For instance, the configuration profile 25 can direct the client device 50 to install or remove particular applications, files, or other resources. The configuration profile 25 can also direct the client device 50 to add settings for wireless networks, network printers, VPNs, or perform other similar configurations. In some examples, the configuration profile 25 can include an extensible markup language (XML) document having an ".xml" or other appropriate file extension. The XML document can include XML schema that specify settings as well as values for those settings. For instance, to add a new VPN on a device, the following XML schema may be employed:

<vpn_name>AlphaCo VPN</vpn_name> where "vpn_name" is a variable name to configure the name of the VPN and "AlphaCo VPN" is the value for the "vpn_name" setting.

A management service can offer an administrator console that allows the administrator to oversee the configuration and operation of client devices 50 enrolled with the management service. To create a configuration profile 25 for a particular group of client devices 50, the administrator console can include a wizard in which an administrator interacts with a series of user interfaces to specify settings for managed client devices 50. However, at the beginning of the wizard, the administrator is traditionally required to select an operating system, where any options shown throughout the wizard would be specific to the selected operating system. For instance, the first operation required by an administrator is to specify an operating system (or other platform). If the administrator selects "Operating System #1," the management services provides one or more user interfaces where the administrator configures the applications, resources, and policies specific to that operating system. After completion, the management service generates a configuration profile 25a that is deployed to client devices 50a having "Operating System #1" installed thereon.

Although the administrator potentially performed a vast amount of configurations while generating the configuration profile 25a for "Operating System #1," the administrator is required to repeat this process for "Operating System #2," "Operating System #3," and so forth, thereby repeatedly configuring settings that may have been applicable to "Operating System #1." The process of creating a configuration profile 25 is thus redundant and operationally inefficient. However, due to the existence of differing operating systems, the varying capabilities and configurability of the operating systems, or due to other hardware or software specifications, the administrator console is required to separate the settings for each operating system.

Figure 2:
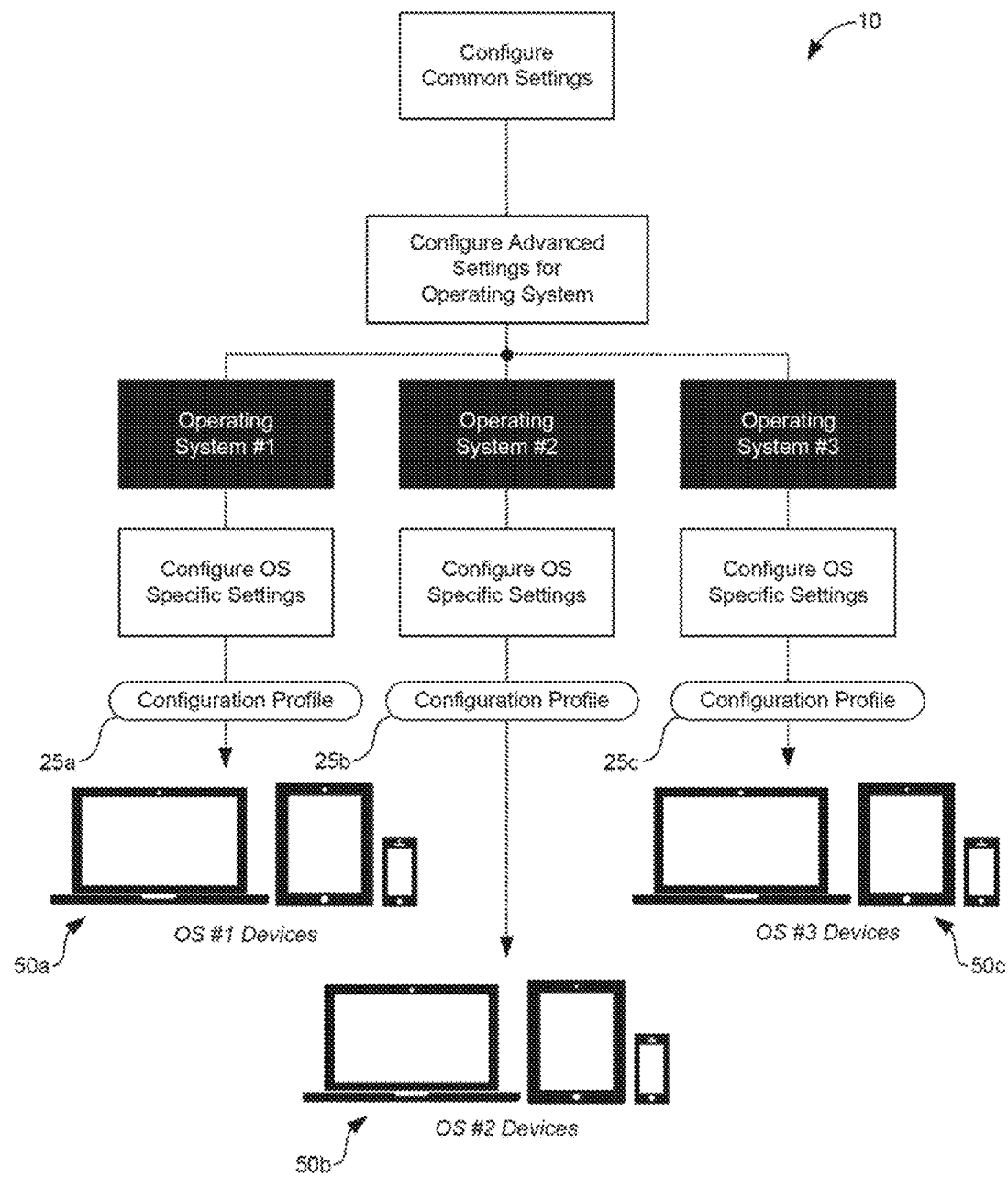
FIG. 2 is a drawing of a process chart that illustrates the process of specifying settings common or applicable to different operating system prior to selection of an operating system.

Referring next to FIG. 2, a process map 10 is shown illustrating another process for an administrator to follow when creating configuration profiles 25a . . . 25c. Instead of selecting an operating system or other type of platform, the first task performed by the administrator can include configuring common settings. Common settings can include, for example, settings that are applicable to different operating systems, platforms, or types of client devices 50. To this end, common settings can include, for example, Wi-Fi settings, VPN settings, email settings, or other similar settings.

Establishing a common setting can include, for example, generating a type of file, commonly referred to as a "resource," that includes information pertaining to the setting. For instance, an administrator can create a resource that includes Wi-Fi settings, a resource that includes VPN settings, or a resource that includes email settings for an enterprise. Thereafter, after common settings have been specified, the process can include configuring advanced settings that may be unique to a particular operating system or version of operating system. For instance, any Wi-Fi, VPN, or email settings that are specific to a particular operating system can then be configured.

Figure 3:
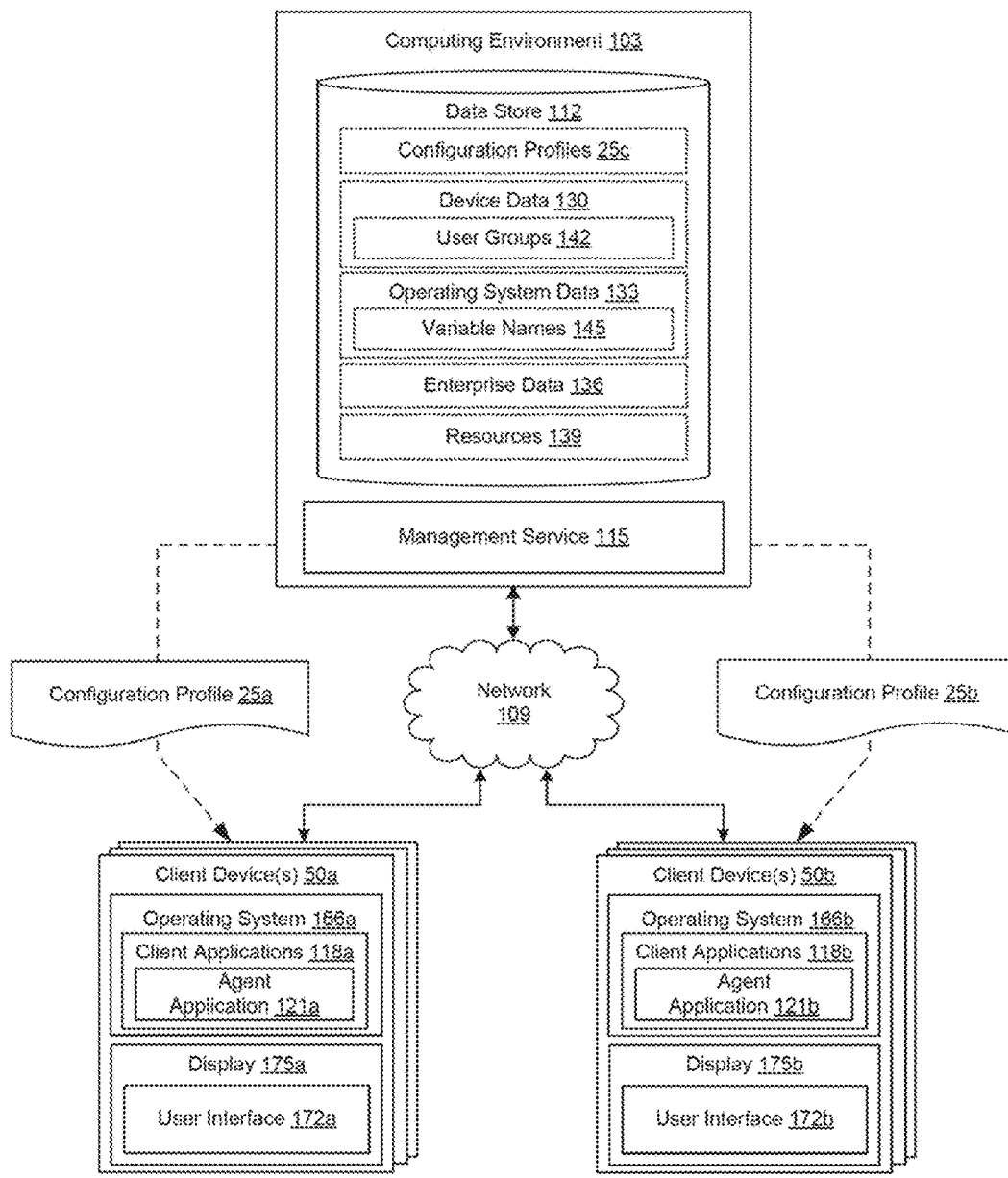
FIG. 3 is a drawing of a networked environment including a management service that communicates configuration profiles to client devices.

Turning now to FIG. 3, shown is an example of a networked environment 100. The networked environment 100 can include a computing environment 103 and client devices 50a . . . 50b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 50 remotely over the network 109, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115 as well as other applications, services, processes, systems, engines, or functionality not discussed in detail herein. The management service 115 can be executed to oversee the operation of client devices 50 enrolled with the management service 115. In some examples, an enterprise, such as a company, organization, or other entity, can operate the management service 115 to oversee or manage the operation of the client devices 50 of its employees, contractors, customers, or other users having accounts with the enterprise.

The management service 115 can cause various software components to be installed on a client device 50. Such software components can include, for example, client applications, resources, libraries, drivers, device configurations, or other similar components that require installation on the client device 50 as specified by an administrator of the management service 115. The management service 115 can further cause policies to be implemented on a client device 50. Policies can include, for example, restrictions or permissions pertaining to capabilities of a client device 50 such that access to enterprise data is secured on the client device 50.

The management service 115 can interact with one or more client applications 118a . . . 118b executed on the client devices 50. In one example, the management service 115 interacts with an agent application 121a . . . 121b on the client device 50 to enroll the client device 50 with the management service 115. The agent application 121 can be registered as a device administrator of the client device 50, which can provide the agent application 121 with sufficient privileges to control the operation of the client device 50. The agent application 121 can be configured to configure a client device 50 in accordance with a configuration profile 25 based on, for example, an analysis of an XML document.

In one example, the agent application 121 can be registered as the device administrator through the installation of a management profile at the operating system of the client device 50 that causes the operating system to designate the agent application 121 as the device administrator. The management service 115 can direct the agent application 121 to perform device management functions on the client device 50. For example, the management service 115 can direct the agent application 121 to control access to certain software or hardware functions available on the client device 50. As a result, the management service 115 can verify that configuration and operation of the client device 50 is in conformance with predefined criteria that ensures that enterprise data, or other data, is protected from data loss, unauthorized access, or other harmful event. The management service 115 can further provision enterprise data to the client device 50 through the agent application 121.

In one example, the management service 115 can cause the agent application 121 to control use of the client device 50 or provision enterprise data to the client device 50 through use of a command queue provided by the management service 115. The management service 115 can store commands in a command queue associated with a particular client device 50 and can configure the agent application 121 executed by such client device 50 to retrieve the contents of the command queue. In one example, the agent application 121 can be configured to retrieve the contents of the command queue on a configured interval, such as every four hours, or upon a certain event occurring, such as detection of an unauthorized application executed by the client device 50. In any case, the agent application 121 can retrieve the contents of the command queue by checking in with the management service 115 and requesting the contents of the command queue. In one example, the contents of the command queue can include a command that the agent application 121 should cause to be executed on the client device 50. In another example, the contents of the command queue can include a resource or client application 118 that the agent application 121 should cause to be installed on the client device 50, which the client device 50 may access through a URL specified by the command retrieved through the command queue.

In one example, the management service 15, upon receiving a request to publish a configuration profile 25 to one or more client devices 50, can identify one or more data records associated with such configuration profile 25 and can populate command queues associated with such client devices 50 with commands associated with such data records. For instance, a data record associated with a client application 118 can specify that a particular application should be installed, a particular configuration for the particular application should be applied, and a particular uniform resource locator (URL) from which the particular application can be downloaded. Based on such data record specifications, a command can be generated and placed in a command queue that, when executed by the client device 50, causes the client device 50 to download the particular application from the particular URL, install the application, and change configuration data associated with the particular application to cause the particular application to function in accordance with the particular configuration.

Accordingly, upon a request to publish a configuration profile 25 to particular client devices 50, the management service 115 can identify one or more data records associated with the configuration profile 25 and can appropriately populate command queues associated with such client devices 50, which can in turn cause such client devices 50 to operate in accordance with the specifications associated with the deployment configuration 160.

The data stored in the data store 112 can include, for example, configuration profiles 25, device data 130, operating system data 133, enterprise data 136, as well as other data. Generally, configuration profiles 25 include data associated with a configuration of a client device 50 enrolled or managed by the management service 115. Configuration profiles 25 can include, for example, data generated by an administrator that deploys specified client applications 118, resources, policies, or other data to a client device 50.

In one example, the management service 115 generates one or more user interfaces that obtain information about the configuration of client devices 50 enrolled (or to be enrolled) with the management service 115. The process of filling out information in the user interfaces, such as through a wizard, is referred to herein as an ingestion process. Through the ingestion process, an administrator or other appropriate user can provide information regarding how the administrator desires to configure the client devices 50. In one example, the administrator can specify one or more client applications 118 to be installed on the client device 50. After completion of the ingestion process, a configuration profile 25 is generated and published. When published, the management service 115 or the agent application 121 on a client device 50 can identify the configuration profile 25 as being applicable to the client device 50 and, as a result, will download and install the client application 118 specified by the administrator.

Resources 139 can include files or other applicable data relating to the configuration of a client device 50 and include settings common to different platforms, operating systems, or types of client devices 50. In one example, a first resource 139 can include a file having Wi-Fi settings, a second resource 139 can include a file having VPN settings, and a third resource 139 can include a file having email settings. The management service 115 can generate a first payload that includes XML schema pertaining to Wi-Fi settings by consulting the first resource 139. Similarly, the management service 115 can generate a second payload pertaining to VPN settings by consulting the second resource 139 and a third payload pertaining to email settings by consulting the second resource 139. An example of a payload for settings obtained for a resource 139, such as a Wi-Fi resource 139, can appear as follows:

```
<plist version="1.0">
   <dict>
      <key>SSID_STR</key>
      <string>AlphaCo Employee WiFi</string>
      <key>CommandUUID</key>
      <string>9F09D114-BCFD-42AD-A974-
         371AA7D6256E</string>
      <key>Status</key>
      <string>Acknowledged</string>
   </dict>
</plist>
```

The first payload, the second payload, and the third payload can be generated using variable names corresponding to a particular type of version of an operating system. Thus, a configuration profile 25 can be generated for an operating system by consolidating the first payload, the second payload, and the third payload into a single configuration profile 25.

Some examples of Wi-Fi settings that can be defined by an administrator and stored in a resource 139 include an SSID name, a password, a network type, Wi-Fi band, or an authentication protocol for the Wi-Fi network, such as extensible authentication protocol (EAP), transport layer security (TLS), wired equivalent privacy (WEP), or protected extensible authentication protocol (PEAP). The network type can include, for example, standard, legacy, or passpoint. The Wi-Fi band can include, for example, 2.4 GHz, 5.0 GHz, or other appropriate band.

VPN settings that can be defined by an administrator and stored in a resource 139 can include, for example, a connection name, a connection type, a server or IP address, or authenticate type, such as on-demand authentication, password-based authentication, certificate-based authentication, or other known VPN authentication types. The connection type can include, for example, secure socket layer (SSL). In another example, a VPN setting can include, for example, establishing a VPN for an individual client application 118, also referred to as "per-app tunneling." In another example, a VPN setting can include establishing a secure socket layer virtual private network (SSL-VPN). Email settings that can be defined by an administrator and stored in a resource 139 can include, for example, an enterprise domain, an email address, a password, an email server setting, a password policy setting, an email certificate setting, and an email attachment setting. Additionally, an agent application 121 configuring an email setting on a client device 50 can include, for example configuring a third-party application, such as a third-party email client.

In some examples, the management service 115 accesses information stored in a resource 139 for inclusion in the configuration profile 25. By providing a configuration profile 25 to the client device 50, for example, having information pertaining to a wireless network, the agent application 121 can preconfigure the client device 50 to access the wireless network using the authentication data.

In further examples, the computing environment 103 can include policies, which include constraints specified by an administrator for a client device 50 to be in "compliance" with the management service 115. Policies can include compliance rules or other criteria. In one example, the agent application 121 can configure hardware or software functionality of a client device 50 such that the client device 50 operates in conformance with the policies. Additionally, the agent application 121 can identify when the client device 50 is not in conformance with the policies and can take appropriate remedial actions, such as denying access to enterprise data 136 or other features of the agent application 121.

In some examples, the management service 115 communicates with the agent application 121 or other client application 118 executable on the client device 50 to determine whether vulnerabilities exist on the client device 50 that do not satisfy policies defined by an administrator. Vulnerabilities can include, for example, the presence of a virus or malware on the client device 50, the client device 50 being "rooted" or "jailbroken" where root access is provided to a user of the client device 50, the presence of particular applications or files, questionable device configurations, vulnerable versions of client applications, or other vulnerability as can be appreciated.

Device data 130 can include, for example, data pertaining to an enrollment status for individual ones of the client devices 50. In one example, a client device 50 designated as "enrolled" can be permitted to access the enterprise data 136 while a client device 50 designated as "not enrolled" or having no designation can be denied access to the enterprise data 136. Device data 130 can also include data pertaining to user groups 142. An administrator can specify one or more of the client devices 50 as belonging to a particular user group 142. The management service 115 can use a configuration profile 25 applicable to the particular user group 142 and/or applicable to an operating system (or other feature) of the client devices 50 to configure the client devices 50.

The operating system data 133 can include information pertaining to different types of operating systems 166 as well as data relating to the configuration of the different types of operating systems 166. The operating system data 133 can include, for example, variable names 145 used to configure a setting for a type or a version of operating system 166. The operating system data 133 can include a mapping of a field of a user interface to different variable names 145 for different operating systems. For instance, to configure an SSID for a wireless network on an iOS device, the variable name 145 can include "iOS_SSID," where a configuration profile 25 would have to include this variable name 145 in order to successfully configure the SSID for the wireless network. However, to configure an SSID for a wireless network on an Android® device, a different variable name 145 would have to be used, as will be described.

The client devices 50a . . . 50b can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 50 can also be equipped with networking capability or networking interfaces, including a localized networking or communication capability, such as a near-field communication (NFC) capability, radio-frequency identification (RFID) read or write capability, or other localized communication capability.

The client devices 50 can include an operating system 166a . . . 166b configured to execute various client applications 118, such as the agent application 121 as well as other applications. Some client applications 118 can access network content served up by the computing environment 103 or other servers, thereby rendering a user interface 169a . . . 169b on a display 172a . . . 172b, such as a liquid crystal display (LCD), touch-screen display, or other type of display device. To this end, some client applications 118 can include a browser or a dedicated application, and a user interface can include a network page, an application screen, or other interface. Further, other client applications 118 can include device management applications, enterprise applications, social networking applications, word processors, spreadsheet applications, media viewing application, or other applications.

Next, a general description of the operation of the various components of the networked environment 100 is provided. The management service 115 can be employed, for example, to manage and oversee the operation of client devices 50. For example, in a BYOD environment, an administrator can oversee the operation of client devices 50 using the management service 115 such that unauthorized access to enterprise data 136 is not obtained. Additionally, the management service 115 can provision (or "serve up") enterprise data 136 to client devices 50 enrolled with the management service 115 and in conformance with policies defined by an administrator.

In BYOD environments, it can be expected that different types of client devices 50 can have different operating systems 166 installed thereon. For example, an operating system 166 executing on a client device 50 can include the Microsoft Windows®, Apple iOS, Apple OSX®, Android®, Ubuntu® Linux, or other operating system 166. Each operating system 166 and client device 50 can provide varying degrees of features, capabilities, and restrictions. For example, one operating system 166 can allow an administrator to control camera functionality on a device while a different operating system 166 can restrict or not provide access to camera functionality. Configuring devices having one of a multitude of operating systems 166 operating system with varying capabilities and restrictions can be problematic, even to administrators having in-depth knowledge of device capabilities.

To avoid having to generate configuration profiles 25 that include resources 139 applicable to different platforms, in some examples, the management service 115 can permit an administrator to specify resources 139, or other platform-independent settings, prior to a specification of an operating system 166. Using the resources 139, the management service 115 can dynamically construct configuration profiles 25 that are able to be interpreted by different operating systems 166 although a configuration profile 25 for a first operating system 166 can be different than a configuration profile 25 for a second operating system 166.

The management service 115 can identify a value from a field of a user interface 169 specified by an administrator, where the field pertains to a setting common or applicable to a multitude of different operating systems 166. The field would only have to be filled in or completed by the administrator once, instead of having to enter a value into the field for each operating system 166 supported.

The management service 115 can determine a first variable name 145 for inclusion in a first configuration profile 25a in association with the value based on a first operating system 166a. For example, a variable name 145 for a wireless network on iOS may include "WiFiMac." Using this variable name 145, the management service 115 can generate a configuration profile 25 which will be deployed to iOS devices to configure the wireless network settings. Additionally, the management service 115 can determine a second variable name 145 for inclusion in a second configuration profile 25b in association with the value based at least in part on a second (and different) operating system 166b. For instance, the "WiFi_iOS" variable name 145 would not successfully configure a wireless network on an Android® device. Instead, a second configuration profile 25b can be generated using the "WiFi_Android" variable name 145 for deployment to Android® devices.

The management service 115 can dynamically generate both the first configuration profile 25a and the second configuration profile 25b using the appropriate variable names 145 such that the value is a parameter of the first variable name 145 for deployment to a first client device 50a having the first operating system 166a installed thereon and a second client device 50b having the second operating system 166b installed thereon. An administrator is thus not required to create two different configuration profiles 25 for each operating system 166 as the creation of the profiles and the mapping of variables names 145 to a particular operating system 166 are handled dynamically. The management service 115 can publish the deployment configurations 25 for at least one user group 142, thereby causing the client devices 50 to automatically implement or install the configuration profiles 25 on the client devices 106 enrolled with the management service 115, or at a time when a client device 50 newly enrolls with the management service 115.

Figure 4:
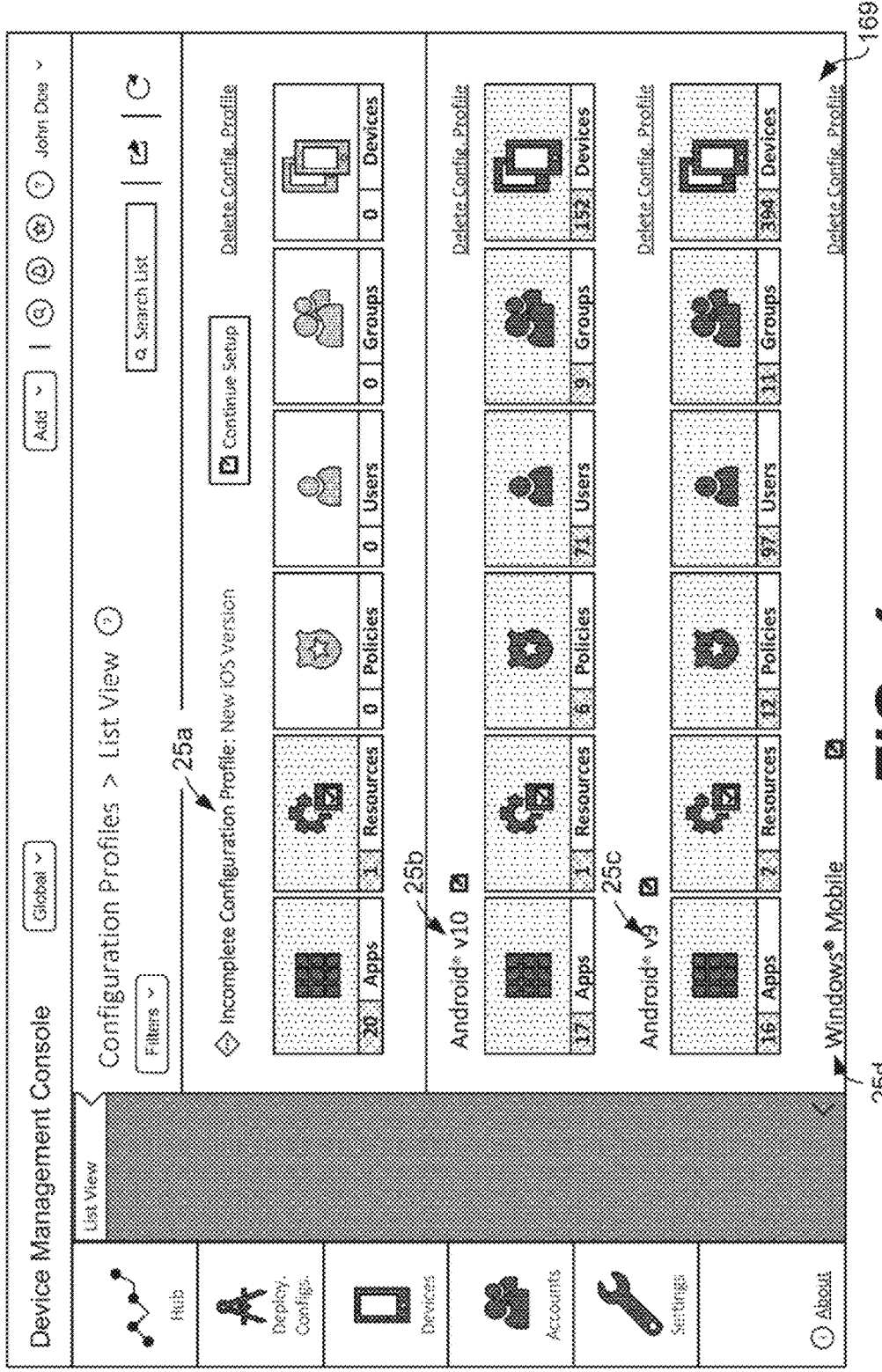
FIG. 4 is a drawing of a user interface of an administrator console.

With reference to FIG. 4, shown is an example of a user interface 169 of an administrator console generated by the management service 115. The management service 115 can provide the administrator with an overview of the various configuration profiles 25a . . . 25d created for different operating systems 166 or user groups 142. For instance, the configuration profile 25b for "Android® v10" indicates that the administrator configured seventeen applications (or "apps"), one resource, six policies, and so on. Any client devices 50 having "Android® v10" (or otherwise being a member of this user group 142) and being enrolled with the management service 115 would then be instructed to download the 17 applications, configure the one resource, and implement the six policies. The administrator console also can provide an ingestion process to modify an existing or create a new configuration profile 25.

Figure 5:
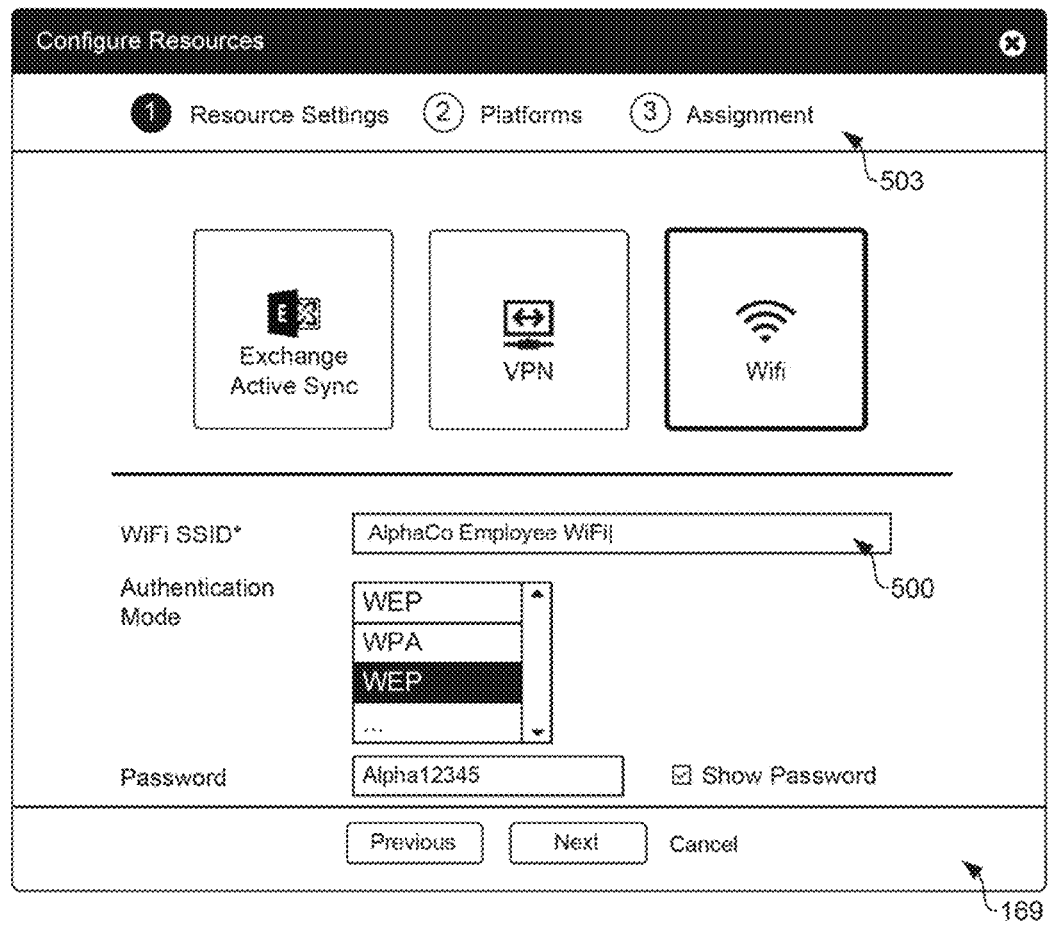
FIG. 5 is a drawing of a user interface for configuring settings common to different operating systems.

Referring next to FIG. 5, shown is an example of a user interface 169 that can be generated in association with the administrator console of FIG. 4. In some examples, the user interface 169 of FIG. 5 can be shown when an administrator desires to create a new or modify an existing configuration profile 25. As discussed above with respect to FIG. 2, instead of first asking the administrator to specify an operating system 166 in which the new configuration profile 25 will be created, the ingestion process can first ask the administrator to specify resources 139, or settings applicable across different operating systems 166. In other words, the management service 115 can first request information that is platform- or operating system-independent.

The user interface 169 can include a field 500. While not shown, the field 500 can be associated with a name, such as "common_wifi_ssid," that can be queried to identify the value of the field 500, such as "AlphaCo Employee WiFi." The management service 115 can maintain a listing of fields 500 in the user interfaces 169 that are not specific to a particular operating system 166 or device. For example, settings pertaining to Wi-Fi, VPN, or email are not specific to a particular type of operating system 166. Fields 500 can include a textbox for entry of a WiFi SSID or password, a textbox for entry of a VPN internet protocol (IP) address, or a textbox for an email server address, and so forth. The value of the field 500, in the example of FIG. 5, is "AlphaCo Employee WiFi." The management service 115 can use the value of the field in generating configuration profiles 25 for various operating systems 166, as will be discussed.

In some examples, the agent application 121 of a client device 50 can configure the client device 50 to automatically connect to an email server without a user of the client device 50 being required to manually input authentication information, such as a mail client, account name, Exchange® host (or other email application host), "use SSL" setting, "use S/MIME" setting, login information, a S/MIME certification setting (if the "use S/MIME" setting is selected), or other technical information. In some examples, the login information can include a domain setting, a username, an email address, a password, and an identity certificate.

In another example, resources 139 can include settings for a wireless network such that the client device 50 can be configured to automatically connect to the wireless network without a user of the client device 50 being required to manually input authentication information, such as a SSID name, authentication protocol or security type setting, hidden network settings, auto-join setting, password (if required depending on the authentication protocol or the security type setting), or other Wi-Fi setting.

In another example, resources 139 can include settings for a VPN such that the client device 50 can be configured to automatically connect to the VPN without a user of the client device 50 being required to manually input authentication information, such as an IP address for a VPN server. Notably, in a header 503 of the user interface 169, selection of the platforms (or operating systems 166) is performed after a specification of the settings common across platforms.

Figure 6:
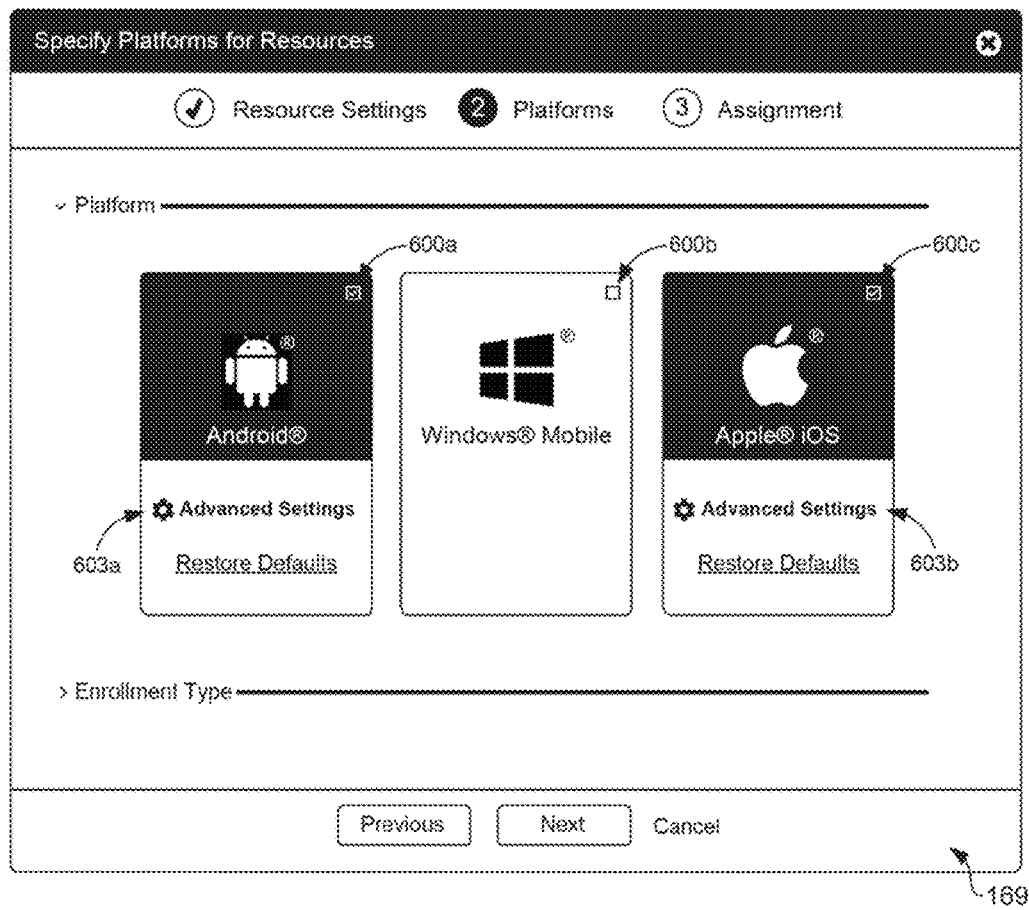
FIG. 6 is another drawing of a user interface for configuring settings common to different operating systems.

Turning now to FIG. 6, shown is an example of a user interface 169 that can be generated after the common settings are specified. Notably, the administrator is asked to specify the operating systems 166 after the common settings by the administrator. However, some operating systems 166 may have advanced settings, or settings different than those of other operating systems 166. Accordingly, if an operating system 166 is selected using an appropriate checkbox 600a . . . 600c, an "advanced settings" option 603a . . . 603b can be shown, allowing further refinement for the particular operating system 166. However, the settings previously specified in the user interface 169 of FIG. 5 are known to stay the same regardless of the operating system 166.

Moving on to FIGS. 7A-7H, examples of database tables 700a . . . 700h are shown, where the database tables 700 can include mappings of particular fields 500 of user interfaces 169 to variable names 145 for different versions or types of operating systems 166. In other words, the database tables 700 maintain mappings of resource settings to profile settings that are to be included in configuration profiles 25 for various operating systems 166. For instance, in FIG. 7A, the database table 700a includes a column for a name of a field ("field_name") that corresponds to a field 500 of a user interface 169. An administrator can specify a value for this field using the user interface 169. The database table 700a also includes different variable names 145 to map the value provided in the field 500 to different types and versions of operating systems 166. Referring back to FIG. 5, the field 500 includes a textbox for entry of a Wi-Fi SSID, the name of which is stored in the database table 700a of FIG. 7A as "common_wifi_ssid." By querying the value provided in that field 500, the value may be used in generating configuration profiles 25 for different operating systems 166.

For instance, to configure an SSID for a wireless network on a client device 50 having version 10 of iOS, the configuration profile 25 must include a variable name 145 and a value. As shown in the emphasized XML markup of FIG. 8A and in the database table 700a of FIG. 7A, the variable name 145 for defining an SSID can include "SSID_STR." When generating the configuration profile 25 for version 10.0 of iOS, the management service 115 can identify a value of the field 500 using the field name and can generate a configuration profile 25 that includes the value. In this case, the value of the field 500 is "AlphaCo Employee WiFi." Thus, the management service 115 can generate a configuration profile 25 for client devices 50 having version 10.0 of iOS that assumes the following schema:

<key>SSID_STR</key>
<string>AlphaCo Employee WiFi</string>

Notably, the variable name 145 of "SSID_STR" is shown and the value of "AlphaCo Employee WiFi" is shown as a value of the "SSID_STR" variable name 145. The agent application 121 can thus use the information to make an appropriate API call using the variable name 145 and the value to configure a client device 50.

In some situations, legacy configuration profiles 25 can exist, such as those created in legacy wizards where an operating system 166 is selected prior to configuration of resources 139 and other settings. Accordingly, in some examples, the management service 115 can consult the database table 700b of FIG. 7B to map a setting for a resource 139 back to a legacy configuration profile 25. As shown in FIG. 7B, settings in the database table 700b shown below the "Advanced Section" column can include settings specific to a particular operating system 166. For instance, "Sync Calendar" can include a setting for Android® and Windows® Phone 10 while iOS does not offer this setting. When generating a configuration profile 25 for iOS, the management service 115 can consult the database table 700b and determine not to include a payload (XML schema) for the "Sync Calendar" setting. However, when generating a configuration profile 25 for Android®, the management service 115 can consult the database table 700b and determine to include a payload (XML schema) for the "Sync Calendar" setting and to identify a value specified by the administrator for this particular setting.

The database table 700c of FIG. 7C shows examples of VPN settings mapped to variable names for different operating systems 166. The VPN settings can include, for example, a connection type, a connection name, and a server. A VPN type setting is not available for OS X®, so only values are shown for Android®, iOS, Windows® Phone 10, and Windows® Desktop 10. The left-most column can include names of fields 500 of a user interface 169 or can include an identifier that maps to corresponding fields 500 of a user interface 169. For instance, when a configuration profile 25 is dynamically generated for the Android® operating system 166, the management service 115 can consult the database table 700c to determine whether to include data pertaining to the connection type, connection name, server, or other VPN settings. The management service 115 can identify that a value for connection type in the XML markup for the Android® configuration profile 25 should be set as "Pulse Secure" and that a value for connection name in the XML markup for the Android® configuration profile 25 should be set as a value specified by an administrator in the user interface 169.

The database tables 700d . . . 700e of FIG. 7D and FIG. 7E show examples of VPN tunnel settings mapped to variable names for different operating systems 166. The VPN tunnel settings can include, for example, a connection type, a connection name, a server, as well as other tunnel settings. When a configuration profile 25 is dynamically generated for an operating system 166, the management service 115 can consult the database table 700d of FIG. 7D to determine whether to include data pertaining to the tunnel settings, such as a connection type, connection name, server, or other tunnel setting. For instance, the management service 115 can identify that a value for connection type in the XML markup for a configuration profile 25 should be set as "AirWatch Tunnel" and that a value for connection name in the configuration profile 25 should be set as a value specified by an administrator in the user interface 169.

The database tables 700f . . . 700g of FIG. 7F and FIG. 7G show examples of Wi-Fi settings mapped to variable names for different operating systems 166. The Wi-Fi settings can include, for example, a payload identifier, an SSID, a hidden network setting, an auto-join setting, a security type, an encryption setting, an authentication protocol, a password, as well as other Wi-Fi settings. The security type can include, for example, shared, WPA Personal, WPA2 personal, WPA enterprise, WPA2 enterprise, or other security type. The encryption type can include, for example, WEP, TKIP, AES, or other encryption type. The authentication protocols can include, for examples, TTLS, PEAP, TLS, or other authentication protocol. When a configuration profile 25 is dynamically generated for an operating system 166, the management service 115 can consult the database tables 700f . . . 700g of FIG. 7F and FIG. 7G to determine whether to include data pertaining to the Wi-Fi settings. For instance, an administrator can specify TLS as an authentication protocol to be used across different operating systems 166. The management service 115 can dynamically generate a configuration profile 25 for iOS using "EAP-TLS" while generating a configuration profile 25 for Android® using "TLS."

The database table 700h of FIG. 7h, as well as the database table 700b of FIG. 7B, show examples of email settings mapped to different operating systems 166. The email settings can include, for example, a type of profile payload that should be generated by the management service 115 when generating a configuration profile 25 for a particular operating system 166. For instance, for OS X® and Windows® Desktop 10, an Exchange ActiveSync™ payload is only available for a user profile type (as opposed to a device profile type). In the administrator console, the management service 115 can generate a user interface 169 that includes a profile type setting, however, an option to change from "user" to "device" can be disabled if Apple® OS X® and Windows® Desktop 10 are supported. The management service 115 can consult the database table 700g to identify that a standard Exchange ActiveSyc™ payload should be generated and included in a configuration profile 25 for iOS, Android®, and Windows® Phone 10. The email settings can further include, for example, a mail client setting, an account name, an Exchange® host, a "use SSL" setting, a domain setting, a username, an email address, a password, a "show characters" setting, an identity certificate setting, a "past days of mail to sync" setting, a "sync calendar" setting, a "sync contacts" setting, as well as other email settings as can be appreciated.

Using the value of the field 500, the management service 115 can generate a different configuration profile 25 for different operating systems 166. For instance, XML markup of a configuration profile 25 for Android® is shown in FIG. 8B. A comparison of the markup between FIG. 8A and FIG. 8B illustrates the differences between configuration profiles 25 generated for two different operating systems 166 although the value of the wireless network SSID defined by the administrator has remained constant. The configuration profile 25 shown in FIG. 8B uses the variable name 145 shown in the database table 700a of FIG. 7A ("SSID").

Figure 9A:
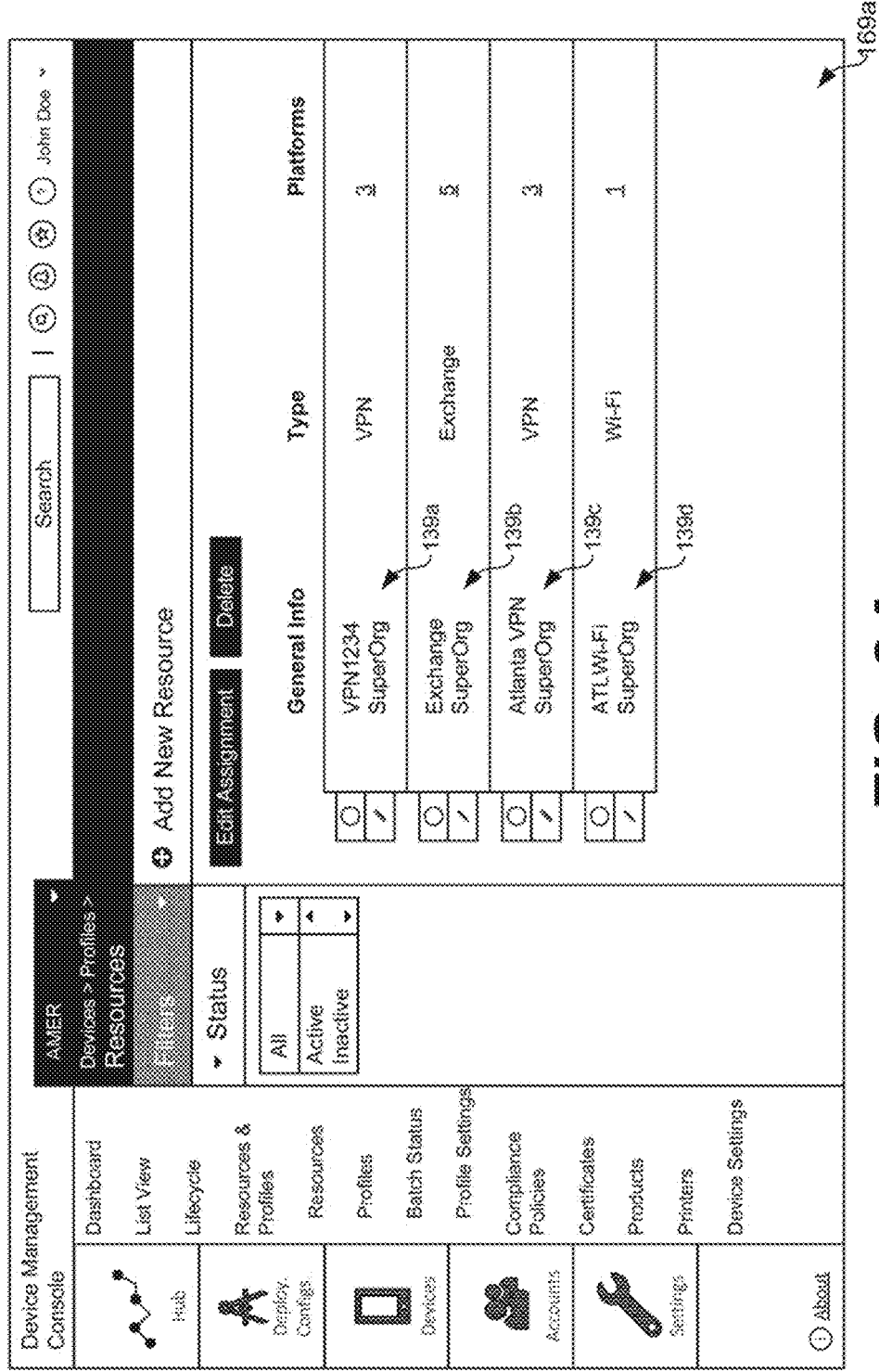
FIGS. 9A-9B are drawings of a user interface of an administrator console.
Figure 9B:
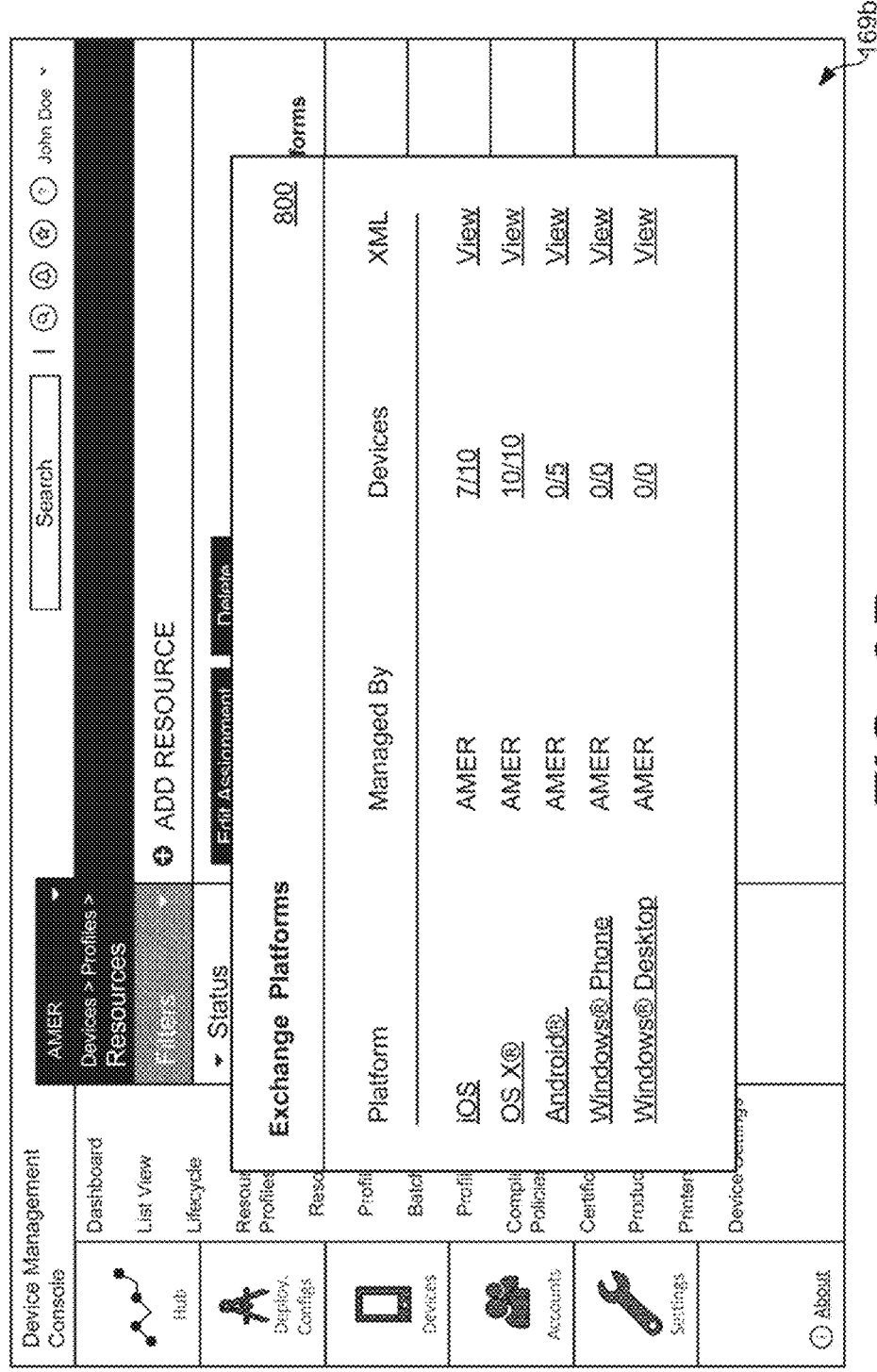

Turning now to FIGS. 9A and 9B, user interfaces 169a . . . 169b of an administrator console are shown according to various examples. Similar to the administrator console shown in the user interface 169 of FIG. 4, the management service 115 can generate the user interfaces 169a . . . 169b to permit an administrator to create, view, or modify resources 139a . . . 139d. For instance, in FIG. 9A, four resources 139a . . . 139d are shown, where the first resource 139a and the third resource 193c include settings for a VPN, the second resource 139b includes settings for an email application, such as Microsoft® Exchange, and the fourth resource 139b includes Wi-Fi settings. As shown in FIG. 9A, the resources 139 can be assigned to multiple platforms or, in other words, the resources 139 can be assigned to different types of operating systems 166 or devices.

The management service 115 can generate a dialog 800 shown in FIG. 9B when one of the resources 139 is selected in the user interface 169a of FIG. 9A. Specifically, the user interface 169b of FIG. 9B shows a dialog 800 pertaining the second resource 139b. The dialog 800 illustrates the platforms assigned to the resource 139, such as iOS, OS X®, Android®, Windows® Phone, and Windows® Desktop. The dialog 800 can illustrate a number of devices currently utilizing the resource and allow an administrator to view the configuration resource 139, for example, by selecting "View" in the XML column. By selecting a particular platform, such as Android®, advanced settings for the resource 139 specific to the platform can be modified. Additionally, common settings applicable to the five platforms can also be edited.

Referring next to FIG. 10, a user interface 169 for configuring VPN settings common to various platforms is shown according to one example. An administrator can specify values for the fields 500 of the user interface 169 which can be used in generating a resource 139 applicable to one or more platforms. For instance, to create a resource 139 having VPN settings common to various platforms, an administrator can specify a resource name, a description, a connection type, a connection name, and a server address. When generating a configuration profile 25 for a platform assigned to the resource 139, the management service 115 can utilize the values provided in the fields 500 to generate an XML file capable of interpretation by the different platforms. Additionally, in some examples, the management service 115 can pre-populate the field 500 corresponding to the resource name with the type of resource, such as VPN. In other words, a default value for the resource name can be "VPN." In some examples, a default value for connection type can include "AirWatch® Tunnel." In some examples, the fields 500 can still be edited by an administrator although having been pre-populated with a default value.

Figure 11B:
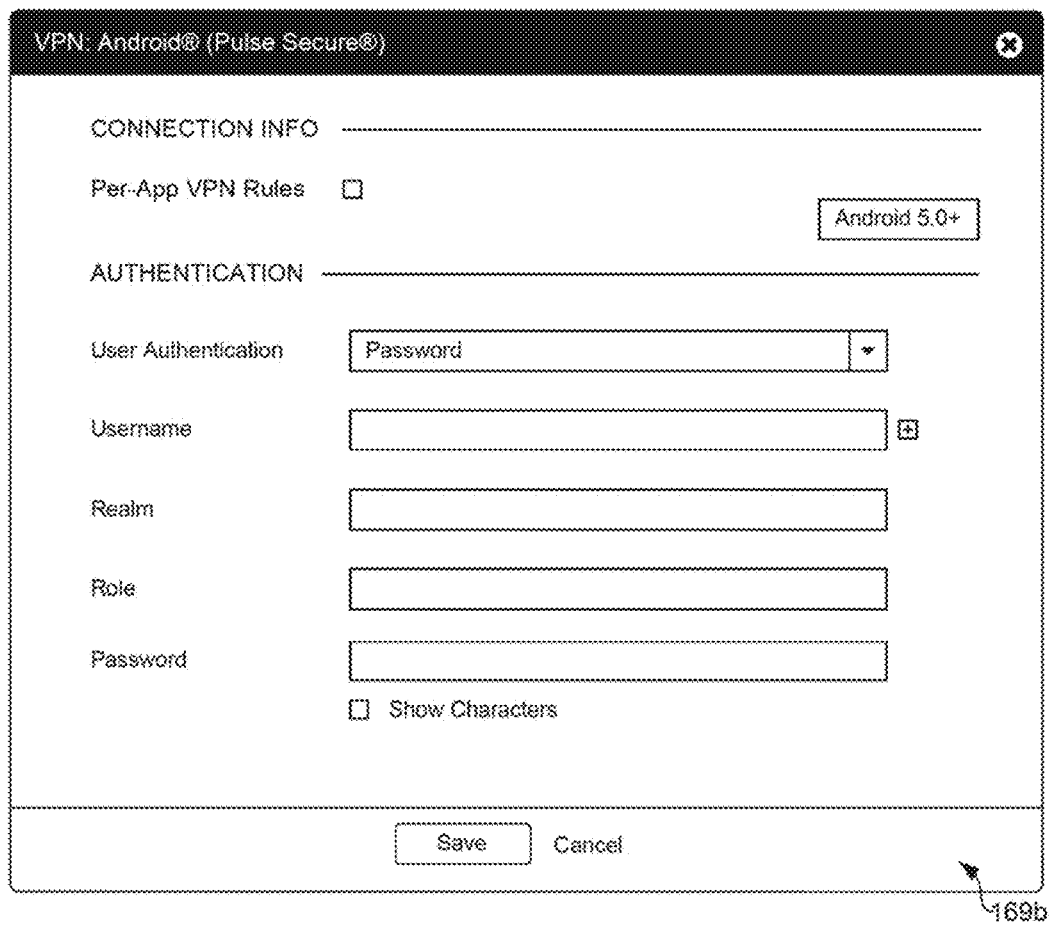
Figure 11C:
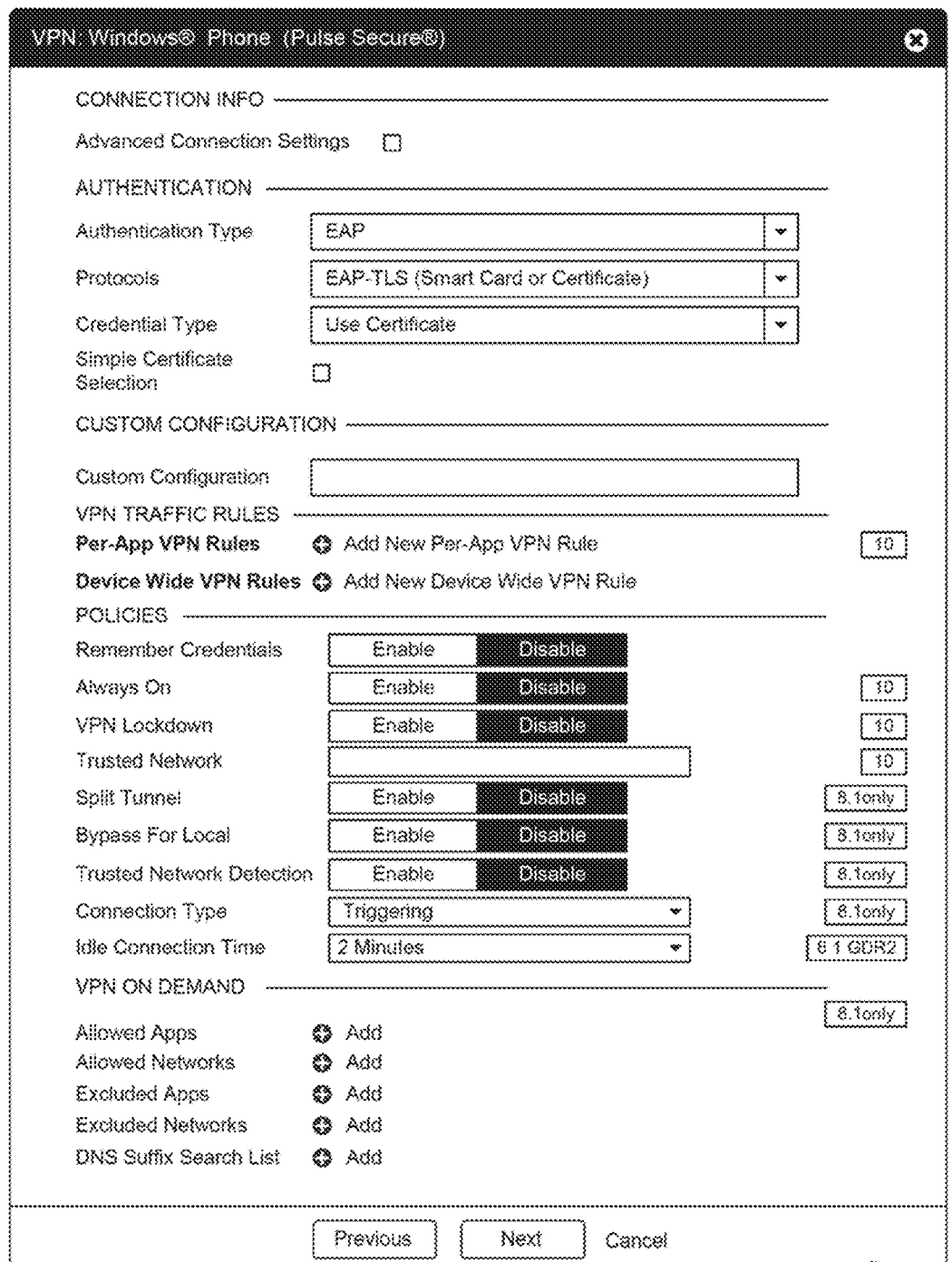
Figure 11D:
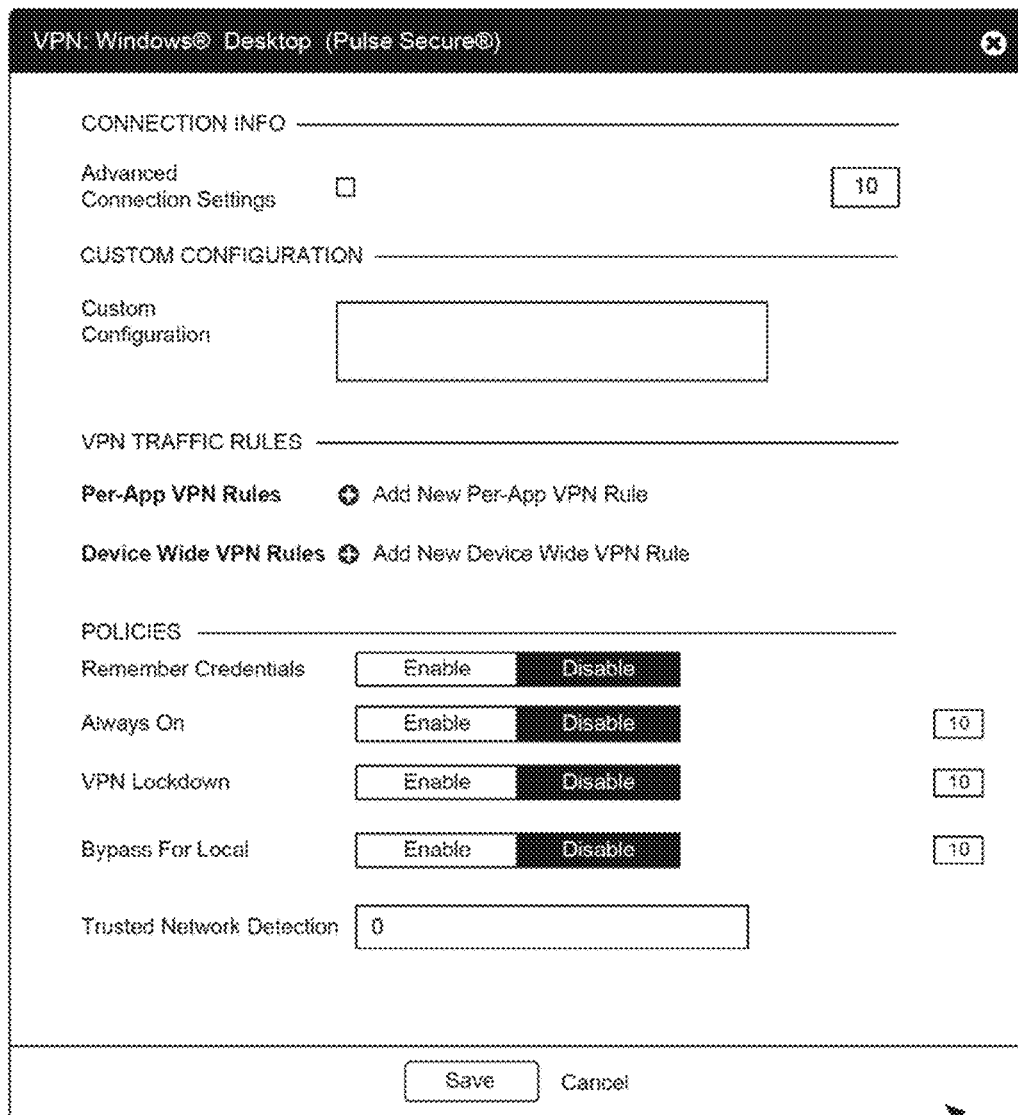
Figure 11E:
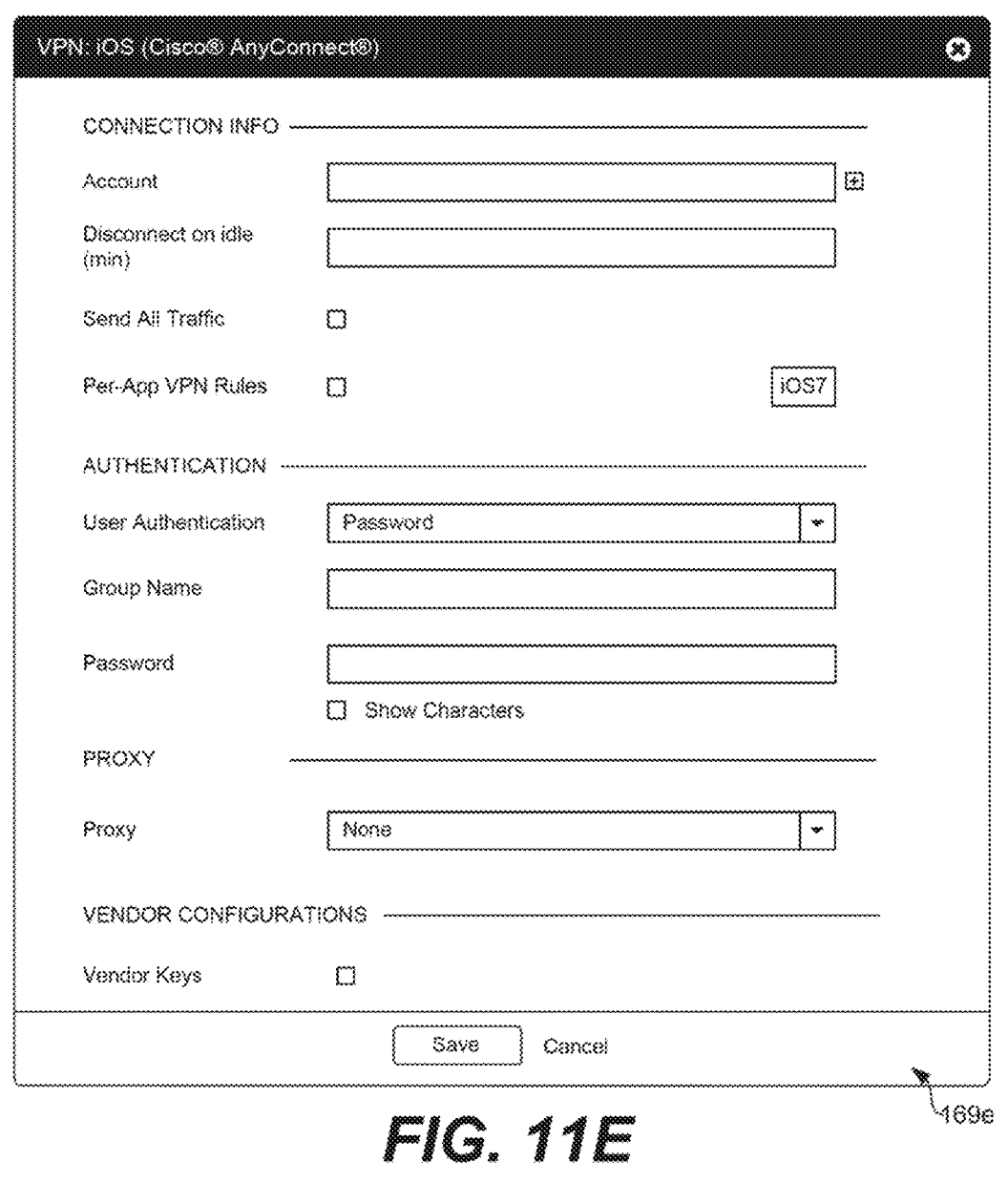
Figure 11F:
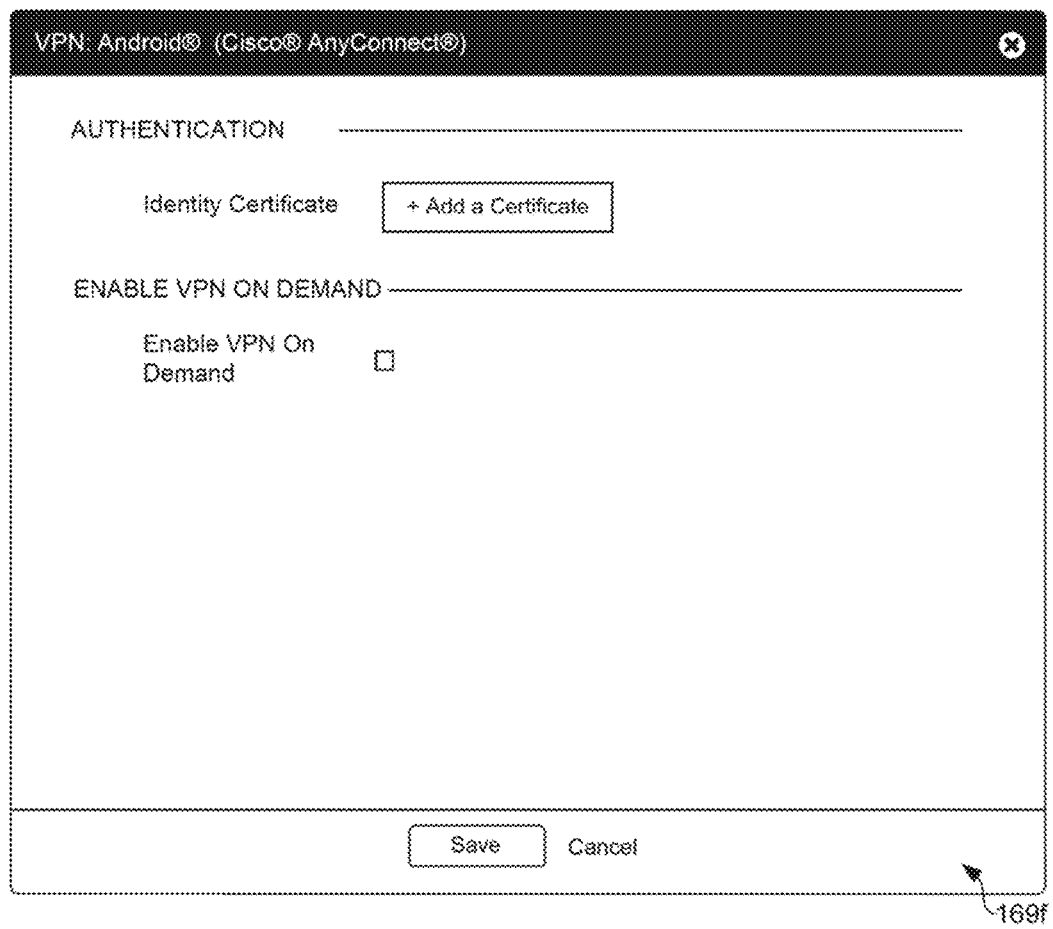
Figure 11G:
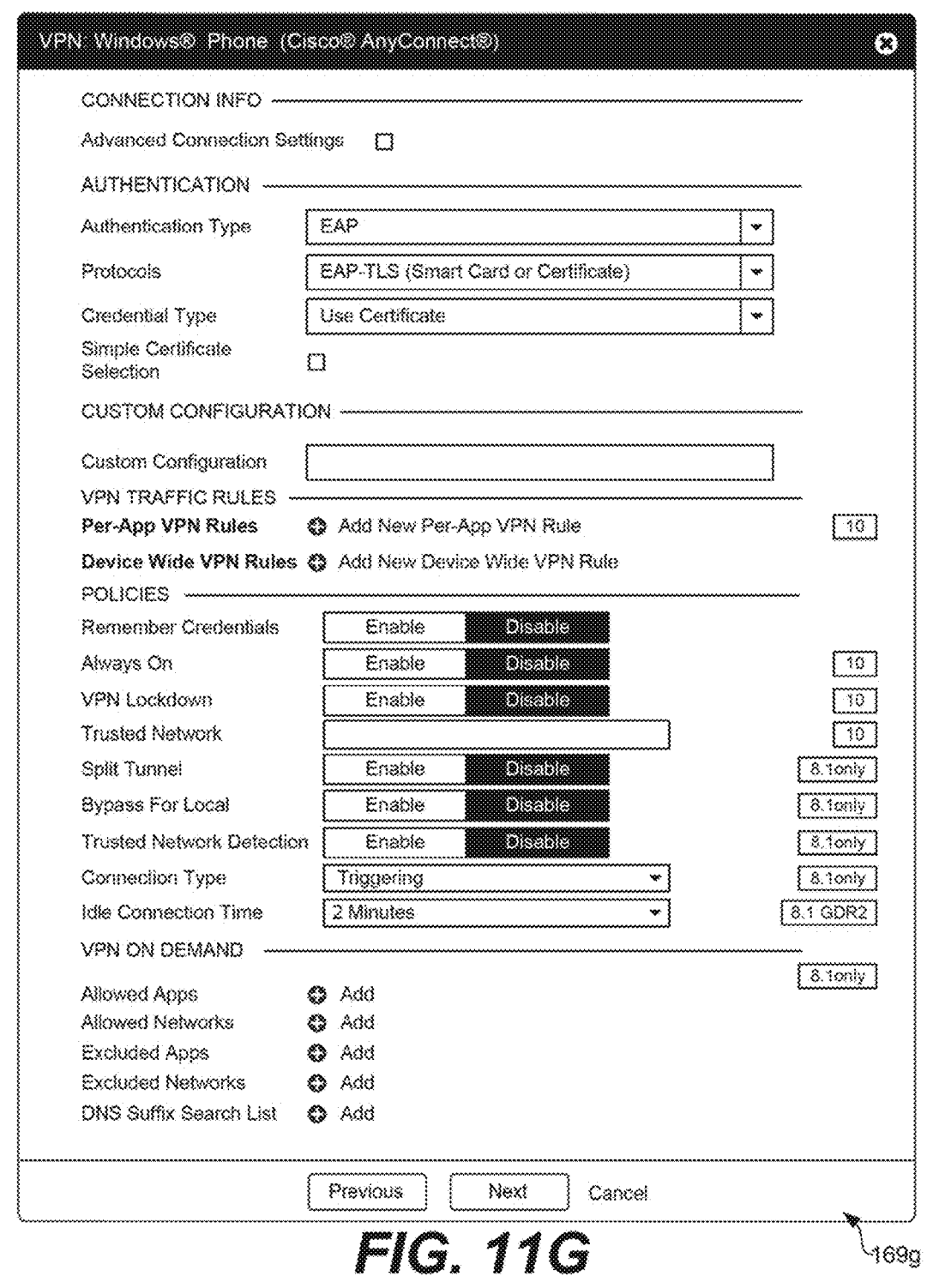

Moving on to FIGS. 11A-11L, user interfaces 169a . . . 169l for configuring advanced VPN settings specific to various platforms are shown according to various examples. More specifically, user interfaces 169a . . . 169d for configuring devices for a Pulse Secure® connection type are shown in FIGS. 11A-11D, user interfaces 169e . . . 169g for configuring devices for a Cisco® AnyConnect® connection type are shown in FIGS. 11E-11G, and user interfaces 169h . . . 169l for devices for an AirWatch® Tunnel connection type are shown in FIGS. 11H-11L.

Each type of operating system 166 or device can have a different degree of configurability for VPN settings. Thus, each of the user interfaces 169a . . . 169k can include fields 500 varying from other platforms. Additionally, the fields 500 shown in the user interfaces 169a . . . 169l can depend on values provided in the user interface 169 shown in FIG. 10. For instance, the user interface 169a of FIG. 11A is shown if a connection type of "Pulse Secure®" is selected in the user interface 169 of FIG. 10 and advanced settings for the iOS platform are selected whereas the user interface 169e of FIG. 11E is shown if advanced settings for iOS are selected when a connection type of "Cisco® AnyConnect®" is specified in FIG. 10.

Referring specifically to FIGS. 11A-11D, if a connection type of "Pulse Secure®" is selected in the user interface 169 of FIG. 10, a profile for the Pulse Secure® VPN configuration must be configured differently for various operating systems, as such a configuration can have differing variables for various operating systems 166. For example, Pulse Secure® is only available for iOS, Android®, Windows® Phone, and Windows® Desktop devices and the degree to which the VPN can be configured can vary from device to device. The management service 115 can be instructed to generate a resource 139 or a configuration profile 25 based on the resource 139 that includes the Pulse Secure® VPN setting. The management service 115 can thus determine which variables are required for each operating system 166 selected by the administrator, determine a value specified by an administrator, identify a corresponding variable name for inclusion in the XML document, determine whether a default value should control, or perform other similar operation. A mapping of settings for resources 139 to profile settings are shown in the database table 700c of FIG. 7C. A mapping of settings for resources 139 to profile settings when Pulse Secure® is selected as the connection type are shown in the database table 700c of FIG. 7C.

In FIG. 11A, the resource settings for iOS when a connection type of Pulse Secure® is selected can include, for example, an account name, a disconnect on idle setting, a realm setting, a role setting, a per-app VPN rules setting, a user authentication method, a password, a proxy setting, and a vendor keys setting. The default settings of the fields 500 for iOS when a connection type of Pulse Secure® is selected can include, for example, "Password" as the type of authentication method and "None" as the default value for the proxy setting. The per-app VPN rules setting and the vendor keys setting can be unchecked by default. The other fields 500 of the user interface 169a of FIG. 11A can be left blank for filling in by the administrator.

In FIG. 11B, the resource settings for Android® when a connection type of Pulse Secure® is selected can include, for example, an account name, a per-application VPN rules setting, a user authentication method, a username, a realm setting, a role setting, and a password. The default settings of the fields 500 for Android® when a connection type of Pulse Secure® is selected can include, for example, "Password" as the type of user authentication method. The per-app VPN rules setting can be unchecked by default. The other fields 500 of the user interface 169b of FIG. 11B can be left blank for filling in by the administrator.

In FIG. 11C, the resource settings for Windows® Phone when a connection type of Pulse Secure® is selected can include, for example, an account name, an advanced connection setting, an authentication type, a protocol setting, a credential type, a simple certificate selection setting, a custom configuration, per-application VPN rules setting, device wide VPN rules setting, policy settings, and VPN on demand settings. The policy settings can include, for example, a remember credentials setting, an always on setting, a VPN lockdown setting, a trusted network, a split tunnel setting, a bypass for local setting, a trusted network detection setting, a connection type, an idle connection time setting, or other similar setting. The VPN on demand setting can include, for example, allowed applications, allowed networks, excluded applications, excluded networks, a domain name servers (DNS) suffix search list, as well as other similar settings. The default settings of the fields 500 for Windows® Phone when a connection type of Pulse Secure® is selected can include, for example, "Password" as the type of user authentication method. The per-app VPN rules setting can be unchecked by default. In some examples, each of the policies can be disabled by default. The other fields 500 of the user interface 169c of FIG. 11C can be left blank for filling in by the administrator.

In FIG. 11D, the resource settings for Windows® Desktop when a connection type of Pulse Secure® is selected can include, for example, an advanced connection setting, a custom configuration setting, a per-application VPN rules setting, a device wide VPN rules setting, as well as policy settings. The policy settings can include, for example, a remember credentials setting, an always on setting, a VPN lockdown setting, a bypass for local setting, a trusted network detection setting, or other similar settings. The default settings of the fields 500 for Windows® Desktop when a connection type of Pulse Secure® is selected can include, for example, "0" for a default value of the trusted network detection as well as each of the policies being set as disabled. The advanced connection setting can be unchecked by default. The other fields 500 of the user interface 169d of FIG. 11D can be blank for entry by the administrator.

Referring to FIGS. 11E-11G, if a connection type of "Cisco® AnyConnect®" is selected in the user interface 169 of FIG. 10, a profile for the Cisco® AnyConnect® VPN configuration must be configured differently for various operating systems, as such a configuration can have differing variables for various operating systems 166. For example, Cisco® AnyConnect® is only available for iOS, Android®, and Windows® Phone and the degree to which the VPN can be configured can vary from device to device. The management service 115 can be instructed to generate a resource 139 or a configuration profile 25 based on the resource 139 that includes the Cisco® AnyConnect® VPN setting. The management service 115 can thus determine which variables are required for each operating system 166 selected by the administrator, determine a value specified by an administrator, identify a corresponding variable name for inclusion in the XML document, determine whether a default value should control, or perform other similar operation. A mapping of settings for resources 139 to profile settings when Cisco® AnyConnect® is selected as the connection type are shown in the database table 700e of FIG. 7E.

In FIG. 11E, the resource settings for iOS when a connection type of Cisco® AnyConnect® is selected can include, for example, an account name, a disconnect on idle setting, a send all traffic setting, a per-app VPN rules setting, a user authentication method, a group name, a password, a proxy setting, and a vendor keys setting. The default settings of the fields 500 for iOS when a connection type of Cisco® AnyConnect® is selected can include, for example, "Password" as the type of authentication method and "None" as the default value for the proxy setting. The send all traffic setting, the per-app VPN rules setting, and the vendor keys setting can be unchecked by default. The other fields 500 of the user interface 169e of FIG. 11E can be left blank for entry by the administrator.

In FIG. 11F, the resource settings for Android® when a connection type of Cisco® AnyConnect® is selected can include, for example, an identity certificate and an enable VPN on demand setting. The default settings of the fields 500 for Android® when a connection type of Cisco® AnyConnect® is selected can include, for example, the enable VPN on demand setting being unchecked by default and no identity certificates being identified.

In FIG. 11G, the resource settings for Windows® Phone when a connection type of Cisco® AnyConnect® is selected can include, for example, an advanced connection setting, an authentication type, a protocol setting, a credential type, a simple certificate selection setting, a custom configuration, per-application VPN rules settings, device wide VPN rules settings, policy settings, and VPN on demand settings. The policy settings can include, for example, a remember credentials setting, an always on setting, a VPN lockdown setting, a trusted network, a split tunnel setting, a bypass for local setting, a trusted network detection setting, a connection type, an idle connection time setting, or other similar setting. The VPN on demand setting can include, for example, allowed applications, allowed networks, excluded applications, excluded networks, a DNS suffix search list, as well as other similar settings. The default settings of the fields 500 for Windows® Phone when a connection type of Pulse Secure® is selected can include, for example, "EAP" as the default authentication type, "EAP-TLS" as the default protocol setting, "Triggering" as the default connection type policy, and "2 Minutes" as the default idle connection time. Each of the policies can be disabled by default. The other fields 500 can be left blank by default.

Referring to FIGS. 11H-11K, if a connection type of "AirWatch® Tunnel" is selected in the user interface 169 of FIG. 10, a profile for the AirWatch® Tunnel configuration must be configured differently for various operating systems, as such a configuration can have differing variables for various operating systems 166. For example, while AirWatch® Tunnel is available for iOS, OS X®, Android®, Windows® Phone, Windows® Desktop, the degree to which the VPN can be configured can vary from device to device. The management service 115 can be instructed to generate a resource 139 or a configuration profile 25 based on the resource 139 that includes the AirWatch® Tunnel setting. The management service 115 can thus determine which variables are required for each operating system 166 selected by the administrator, determine a value specified by an administrator, identify a corresponding variable name for inclusion in the XML document, determine whether a default value should control, or perform other similar operation. A mapping of settings for resources 139 to profile settings when AirWatch® Tunnel is selected as the connection type are shown in the database table 700d of FIG. 7D.

Figure 11H:
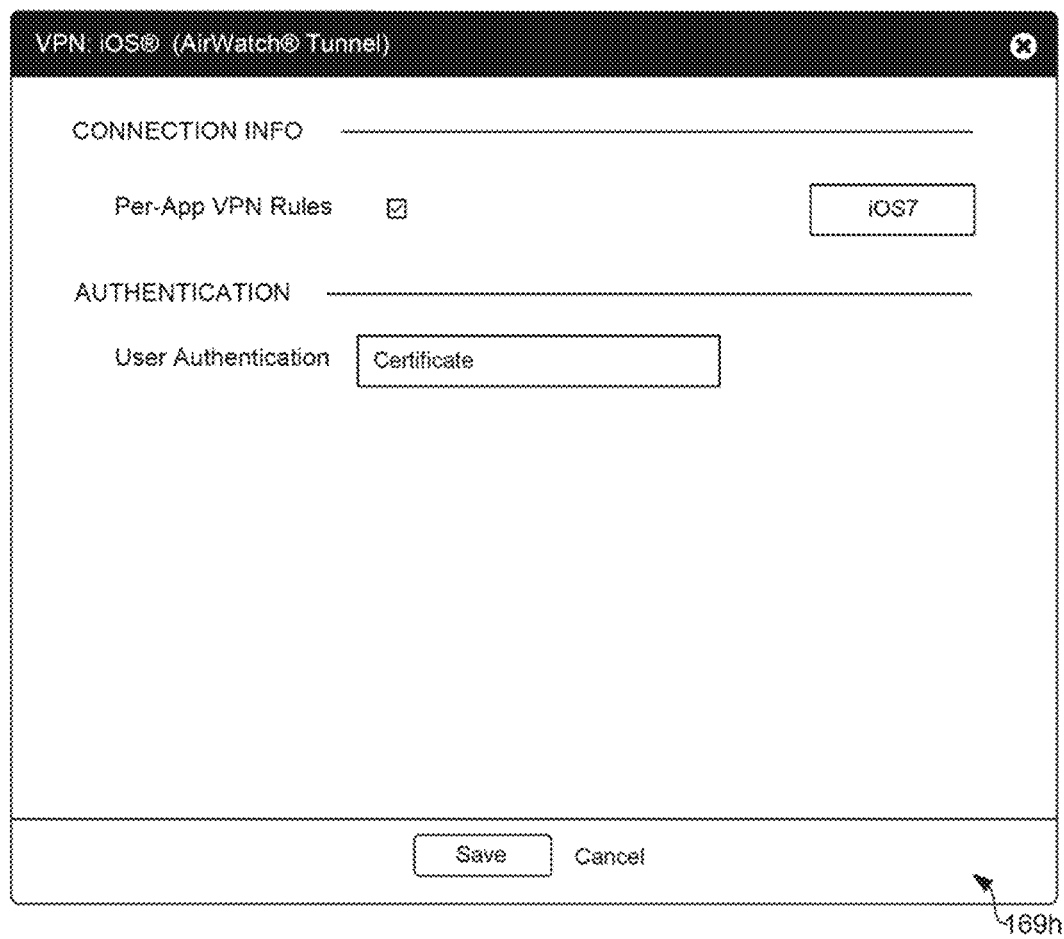

In FIG. 11H, the resource settings for iOS when a connection type of AirWatch® Tunnel is selected can include, for example, a per-application VPN rules setting, a user authentication setting, as well as other similar settings. The default settings of the fields 500 for iOS® when a connection type of AirWatch® Tunnel is selected can include, for example, "Certificate" as a default value for the user authentication setting and the per-application VPN rules setting being checked by default.

Figure 11I:
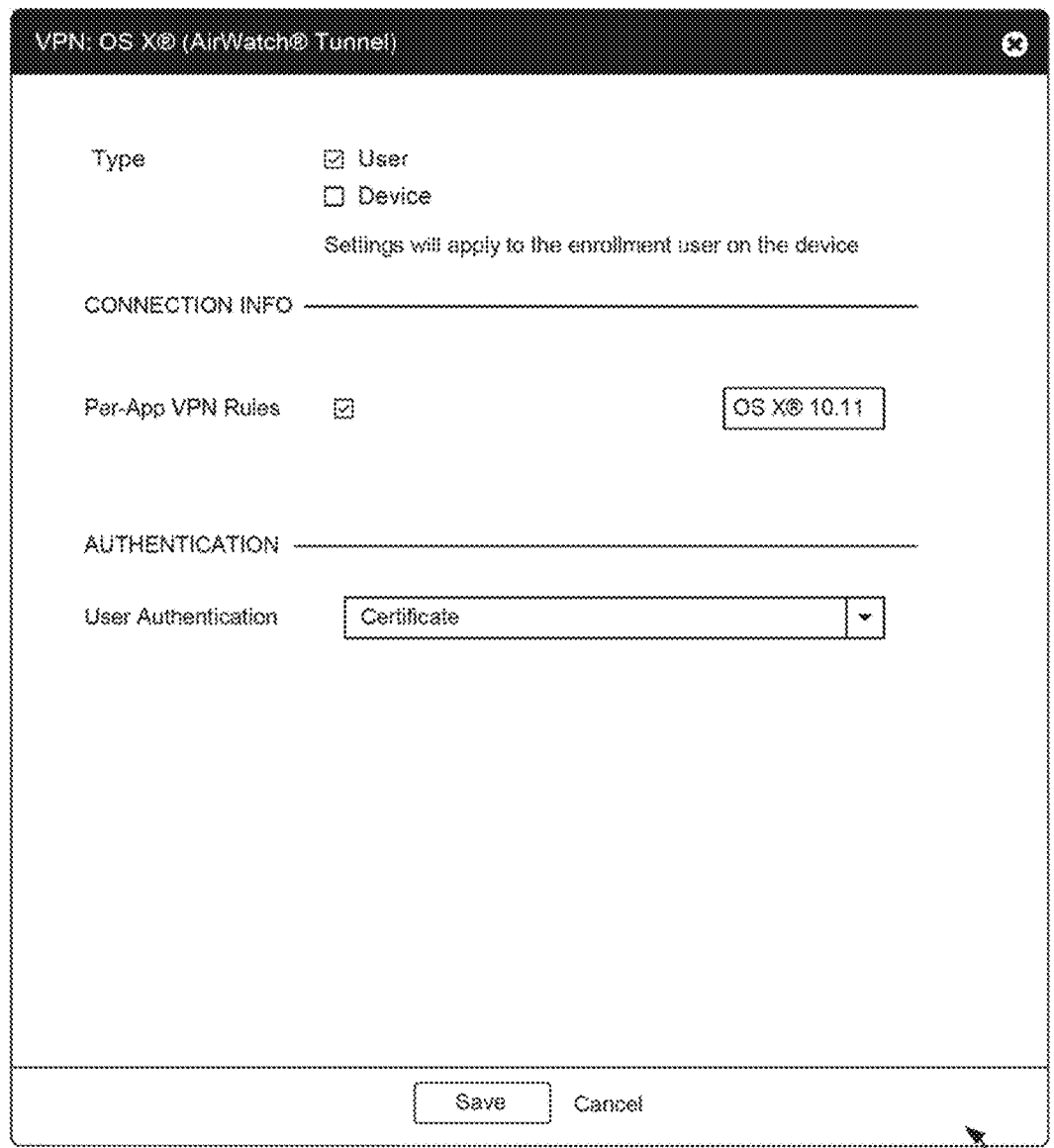

In FIG. 11I, the resource settings for OS X® when a connection type of AirWatch® Tunnel is selected can include, for example, a profile type, such as user or device, a per-application VPN rules setting, a user authentication setting, as well as other similar settings. The default settings of the fields 500 for OS X® when a connection type of AirWatch® Tunnel is selected can include, for example, "Certificate" as a default value for the user authentication setting as well as the per-application VPN rules setting and a user checkbox being checked by default.

Figure 11J:

In FIG. 11J, the resource settings for Android® when a connection type of AirWatch® Tunnel is selected can include, for example, a per-application VPN rules setting, a user authentication setting, as well as other similar settings. The default settings of the fields 500 for iOS® when a connection type of AirWatch® Tunnel is selected can include, for example, "Certificate" as a default value for the user authentication setting and the per-application VPN rules setting being checked by default.

Figure 11K:
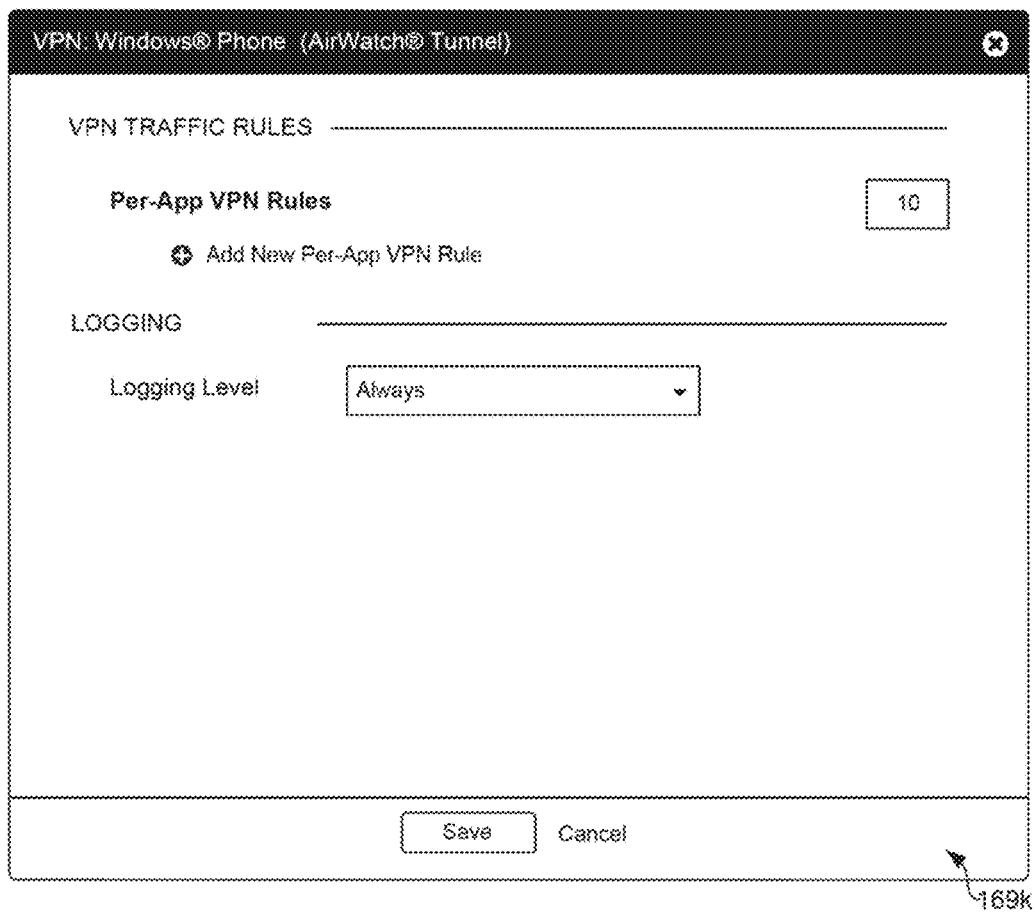

In FIG. 11K, the resource settings for Windows® Phone when a connection type of AirWatch® Tunnel is selected can include, for example, a per-application VPN rules setting, a logging level setting, as well as other similar settings. The default settings of the fields 500 for Windows® Phone when a connection type of AirWatch® Tunnel is selected can include, for example, "Always" as a default value for the logging level setting.

Figure 11L:
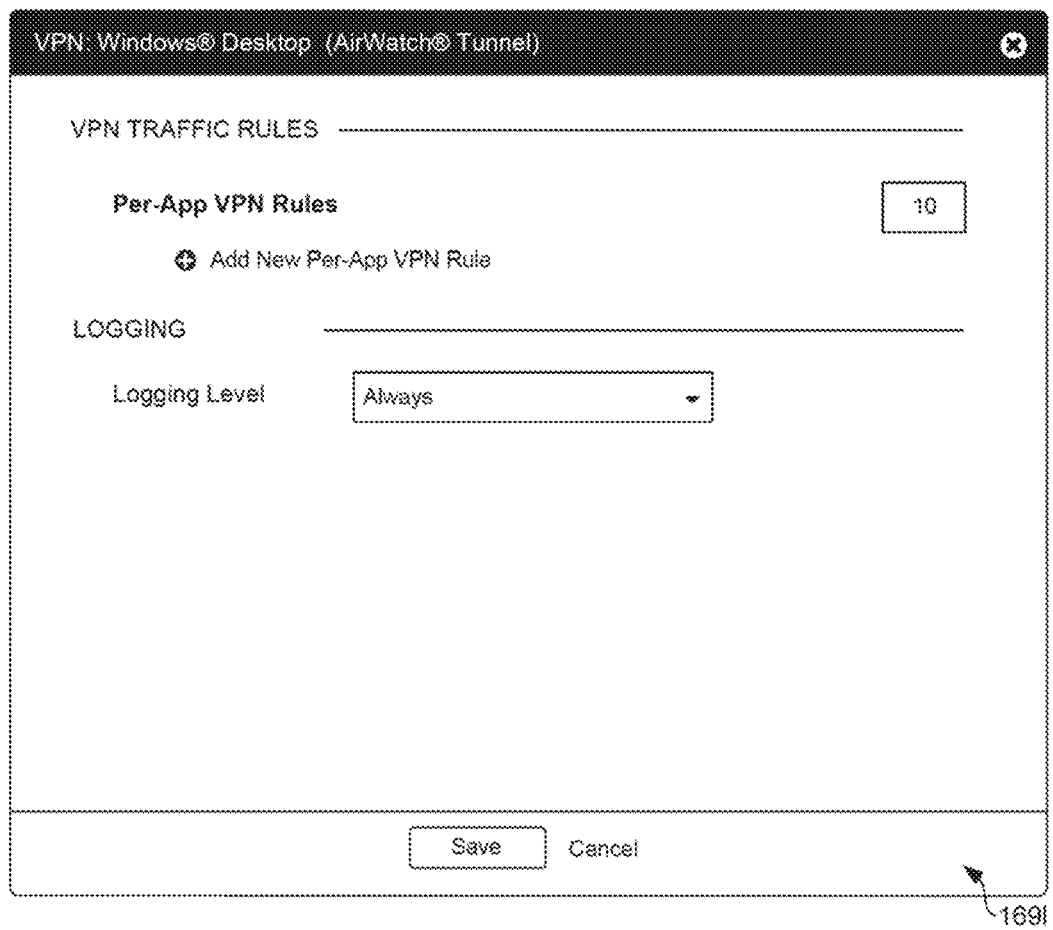

In FIG. 11L, the resource settings for Windows® Desktop when a connection type of AirWatch® Tunnel is selected can include, for example, a per-application VPN rules setting, a logging level setting, as well as other similar settings. The default settings of the fields 500 for Windows® Desktop when a connection type of AirWatch® Tunnel is selected can include, for example, "Always" as a default value for the logging level setting.

Turning now to FIGS. 12A-12E, user interfaces 169a . . . 169e for configuring email settings common to various platforms are shown according to various examples. In some examples, the email settings can include settings for the Microsoft® Exchange email service. The administrator can specify values for the fields 500 of the user interface 169 which can be used in generating an email resource 139 applicable to one or more platforms. For instance, referring to FIG. 12A, to create a resource 139 having email settings or, more specifically, Exchange settings common to various platforms, an administrator can specify a resource name, a description, a mail client setting, an account name, an Exchange host, a use SSL setting, a domain, a username, an email address, a password, an identity certificate, a past days of mail to sync setting, a sync calendar setting, and a sync contacts setting. A mapping of resource settings for an Exchange resource 139 to profile settings is shown in the database table 700b of FIG. 7B.

When generating a configuration profile 25 for a platform assigned to the resource 139, the management service 115 can utilize the values provided in the fields 500 to generate an XML file capable of interpretation by the different platforms. In some examples, the default values for common settings can include, "Exchange" as the resource name, "Native Mail Client" as the mail client, "Exchange Account" as the account name, a webmail address as the Exchange host, "Unlimited" as the past days of mail to sync setting, as well as various wildcard tags in the domain, username, and email address settings. The wildcard tags can be substituted with a corresponding value for a device at the time the configuration profile 25 is generated, as can be appreciated. The use SSL setting, the sync calendar setting, and the sync contacts setting can be checked by default.

Figure 12A:
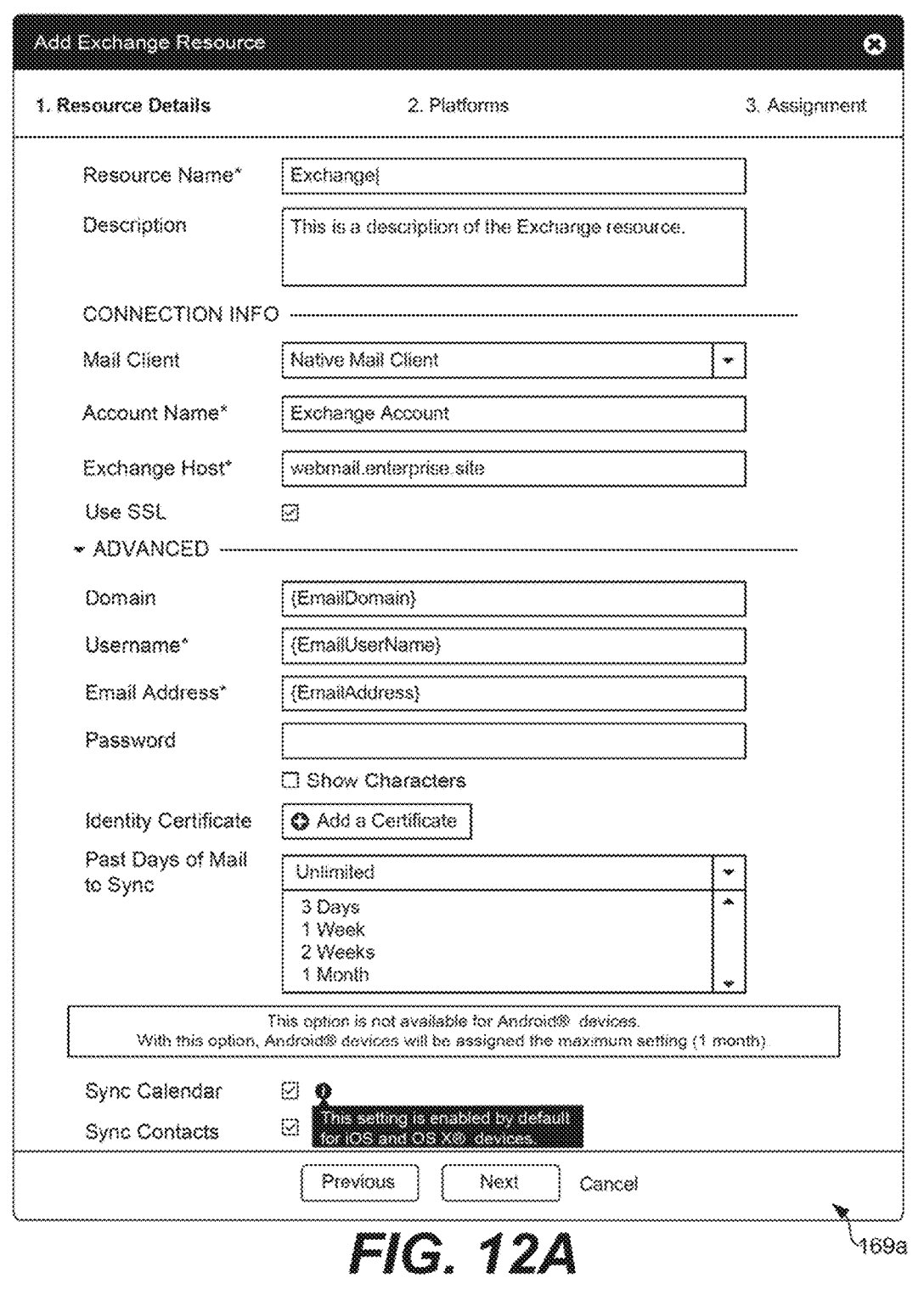
Figure 12D:
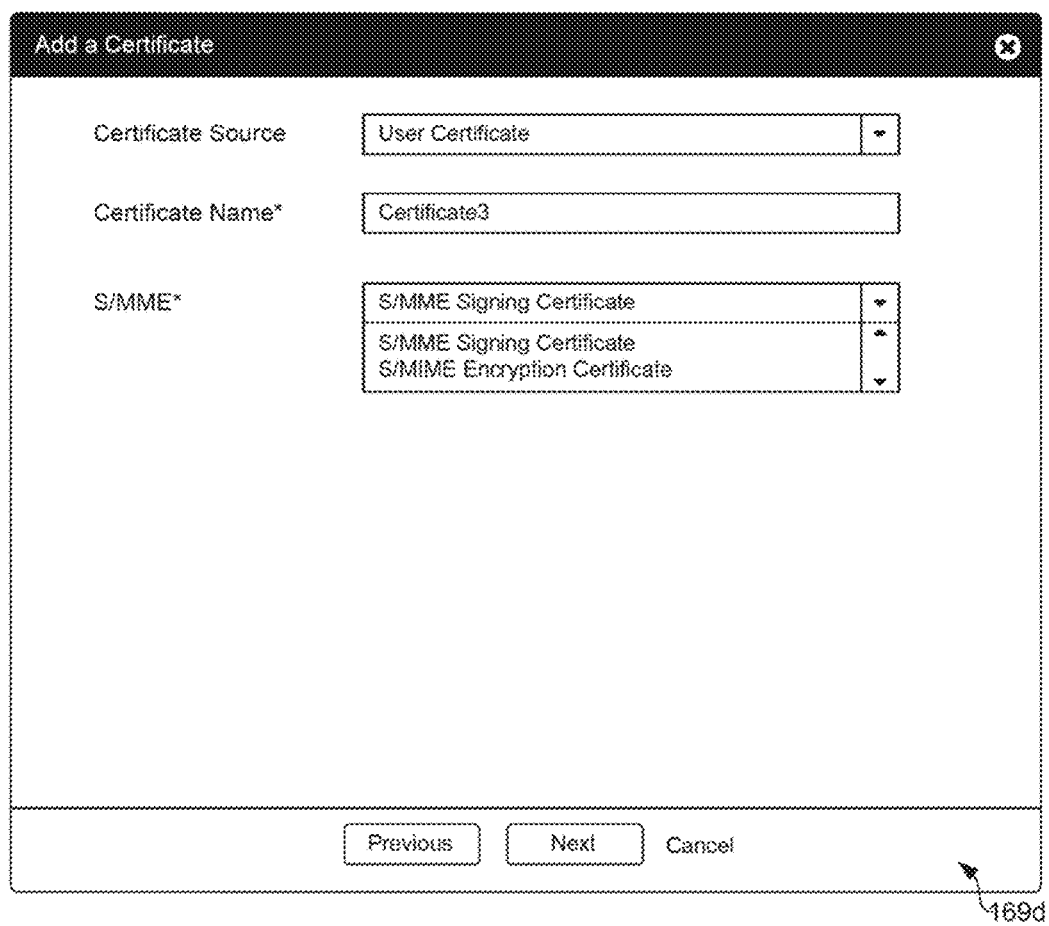

The user interfaces 169b . . . 169d of FIGS. 12B, 12C, and 12D can be shown when the "Add a Certificate" option in FIG. 12A is selected in association with the identity certificate setting. For instance, in FIGS. 12B, 12C, and 12D, an administrator can specify a certificate source and a certificate name. Potential values for the certificate source can include, for example, "Upload," "Defined Certificate Authority," or "User Certificate." The default value for the certificate source can include "Upload" and the default value for the certificate name can include "Certificate" followed by a number of uploaded certificates. If "Upload" is selected as the certificate source, an upload of a certificate file can be performed. If "Defined Certificate Authority" is selected as the certificate source, a certificate authority and a certificate template must be provided. If "User Certificate" is selected as the certificate source, a secure/multipurpose internet mail extensions (S/MME) setting must be provided. The S/MME setting can include, for example, S/MME Signing Certificate or S/MME Encryption Certificate.

Figure 12E:
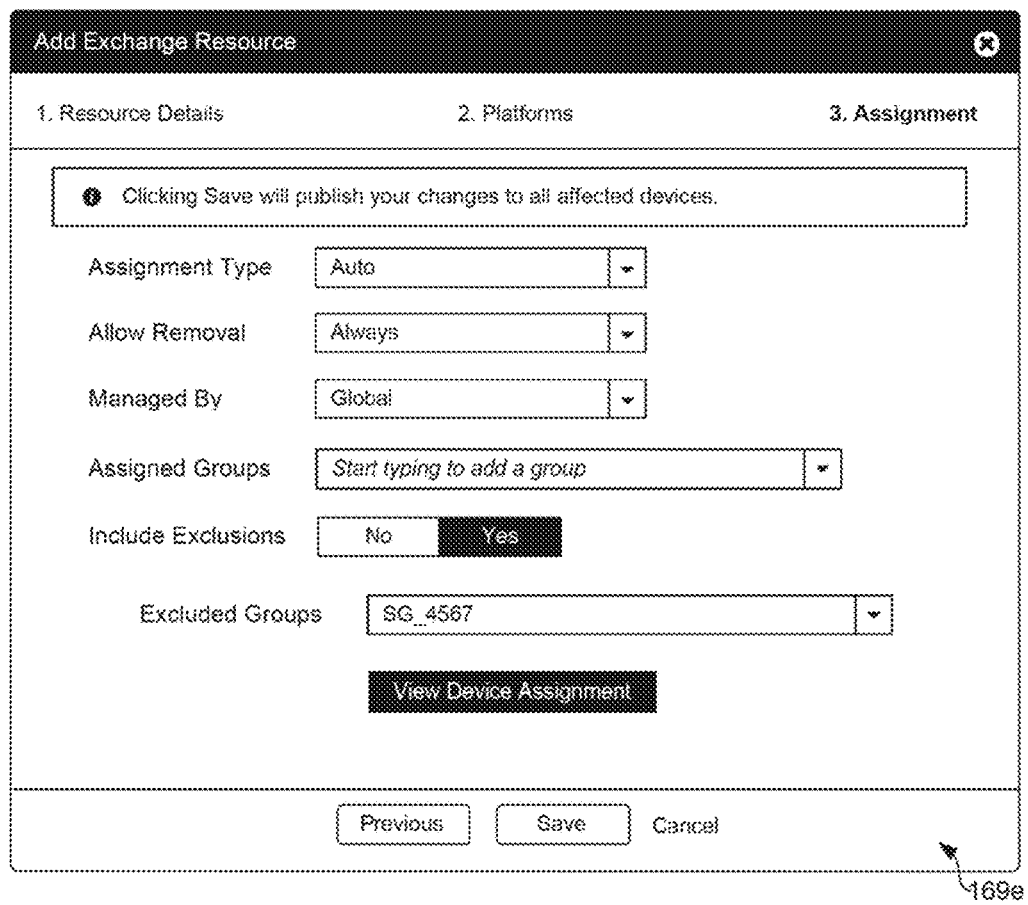

FIG. 12E shows a user interface 169e for assigning a created Exchange resource to, for example, one or more user groups 142. The user interface 169a can include, for example, an assignment type, an allow removal setting, a managed by setting, assigned user groups 142, an include exclusions setting, and an excluded groups setting.

Referring next to FIGS. 13A-13E, user interfaces 169a . . . 169e for configuring advanced email settings specific to various platforms are shown according to various examples. Similar to VPN settings, each type of operating system 166 or device can have a different degree of configurability for Exchange or other email service settings. Thus, each of the user interfaces 169a . . . 169e can include fields 500 varying from other platforms.

Figure 13A:
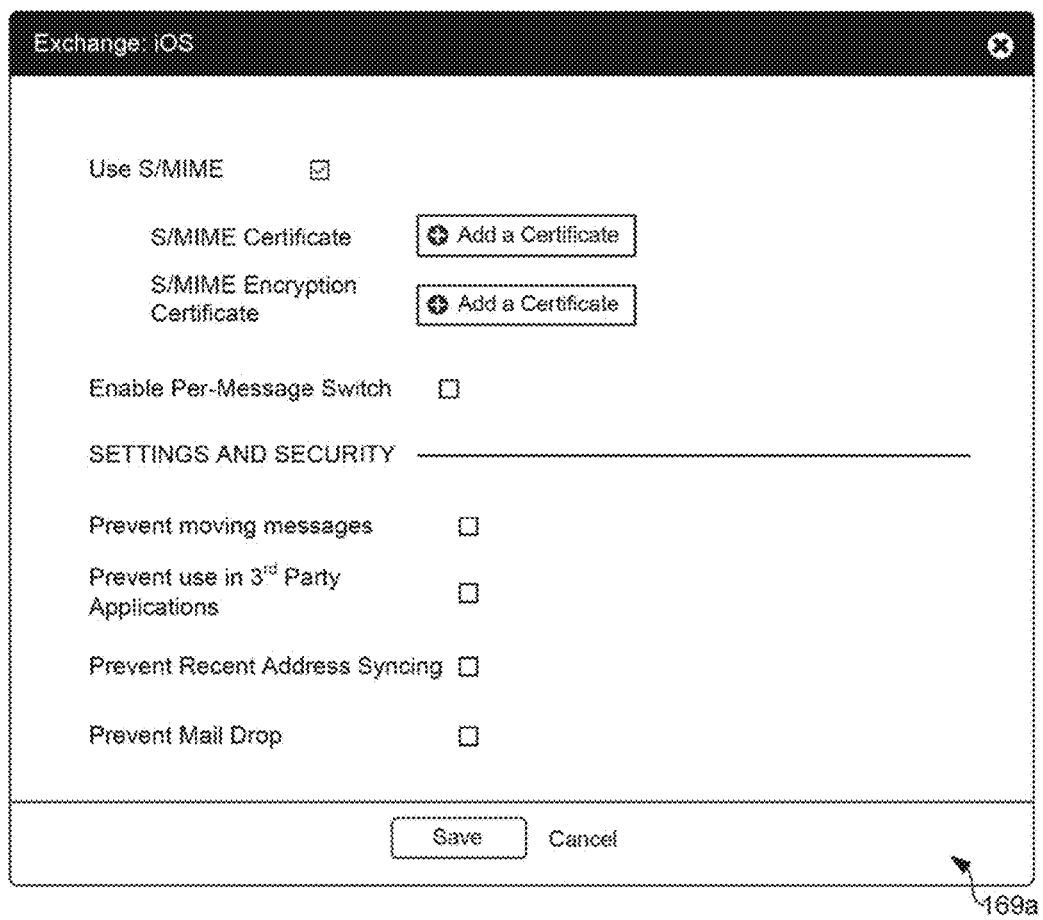

Referring to FIG. 13A, advanced settings for Microsoft® Exchange when iOS is selected can include, for example, a use S/MIME setting, an enable per-message switch setting, a prevent moving messages setting, a prevent use in third-party applications setting, a prevent recent address syncing setting, a prevent mail drop, as well as other settings. The default settings of the fields 500 for iOS when a user interface 169a is accessed to provide advanced email settings can include, for example, the use S/MIME setting being checked while other fields are left unchecked.

Figure 13B:
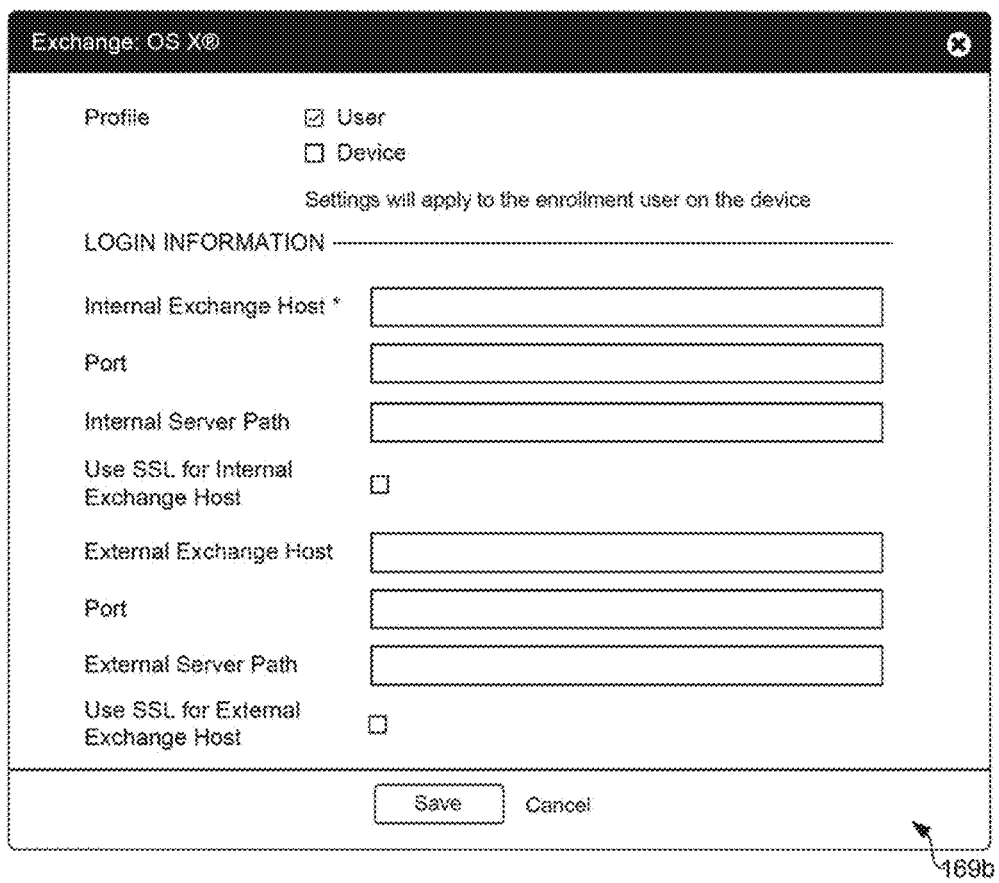

Referring to FIG. 13B, advanced settings for Microsoft® Exchange when OS X® is selected can include, for example, a profile setting, an internal Exchange host, a port setting for the internal Exchange host, an internal server path, a use SSL for internal Exchange host setting, an external Exchange host, a port setting for the external Exchange host, a use SSL for external Exchange host setting, as well as similar settings. The default settings of the fields 500 for OS X® when a user interface 169*b* is accessed to provide advanced email settings can include, for example, the user profile setting being checked while other fields are left unchecked and left blank. In some examples, the internal exchange host is a required field.

Figure 13C:
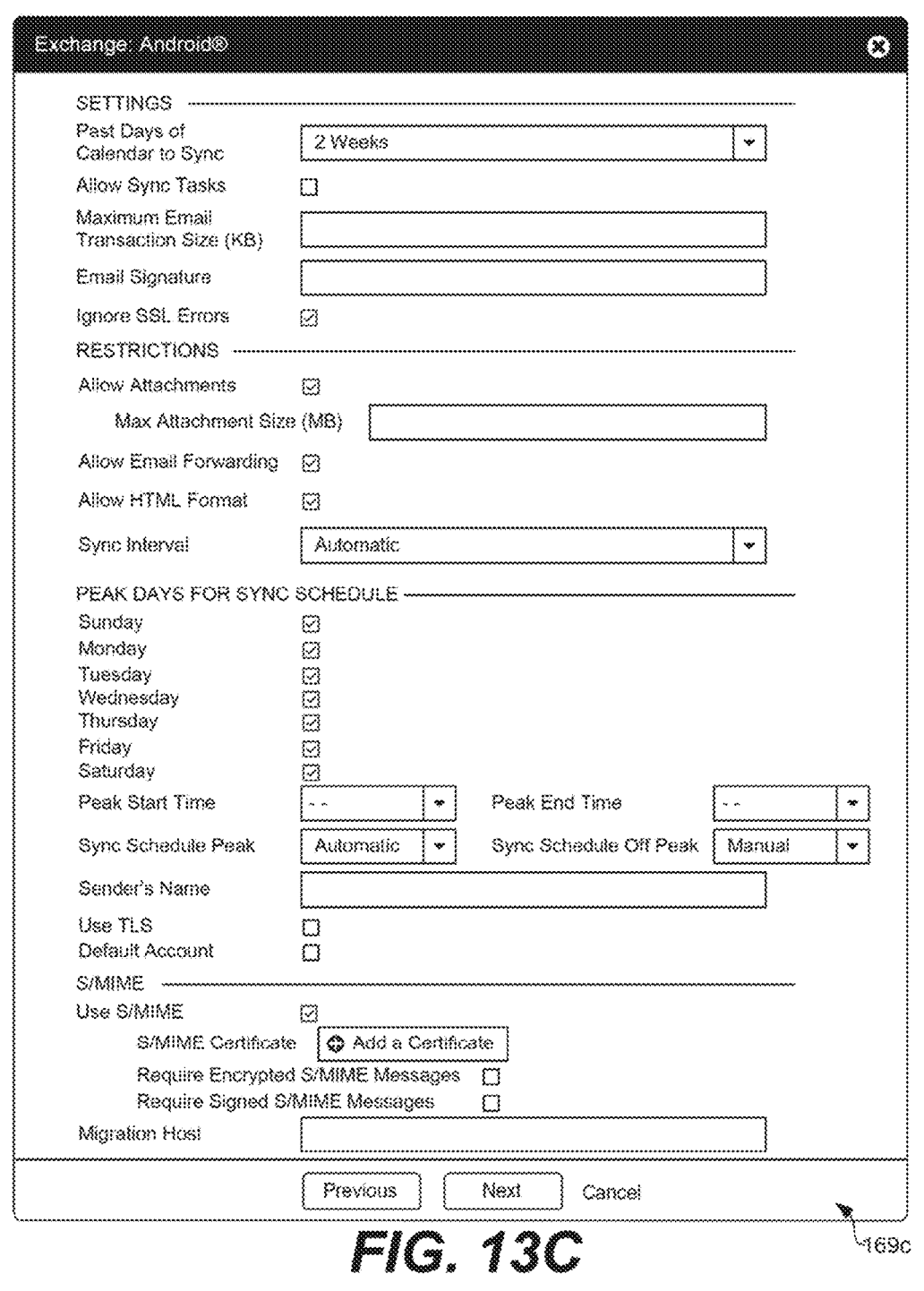

Referring to FIG. 13C, advanced settings for Microsoft® Exchange when Android® is selected as a platform can include, for example, a past days of calendar to sync setting, an allow sync tasks setting, a maximum email transaction size, an email signature, an ignore SSL errors setting, an allow attachments setting, a max attachment size setting, an allow email forwarding setting, an allow hypertext markup language (HTML) format setting, a sync intervals, peak days for sync schedule, a peak start time, a peak end time, a sync schedule peak setting, a sync schedule off peak setting, a sender's name, a use TLS setting, a default account setting, a use S/MIME setting, a require encrypted S/MIME messages setting, a require signed S/MIME messages setting, a migration host, as well as other similar settings. The default settings of the fields 500 for Android® when a user interface 169*c* is accessed to provide advanced email settings for Android® can include, for example, "2 Weeks" as the default value of the past days to sync calendar setting, "Automatic" for the sync interval, "Automatic" for the sync schedule peak, and "Manual" for the sync schedule off peak. Additionally, checkboxes for ignore SSL errors, allow attachments, allow email forwarding, allow HTML format, use S/MIME, as well as each day of the peak days for sync schedule can be checked by default.

Figure 13D:
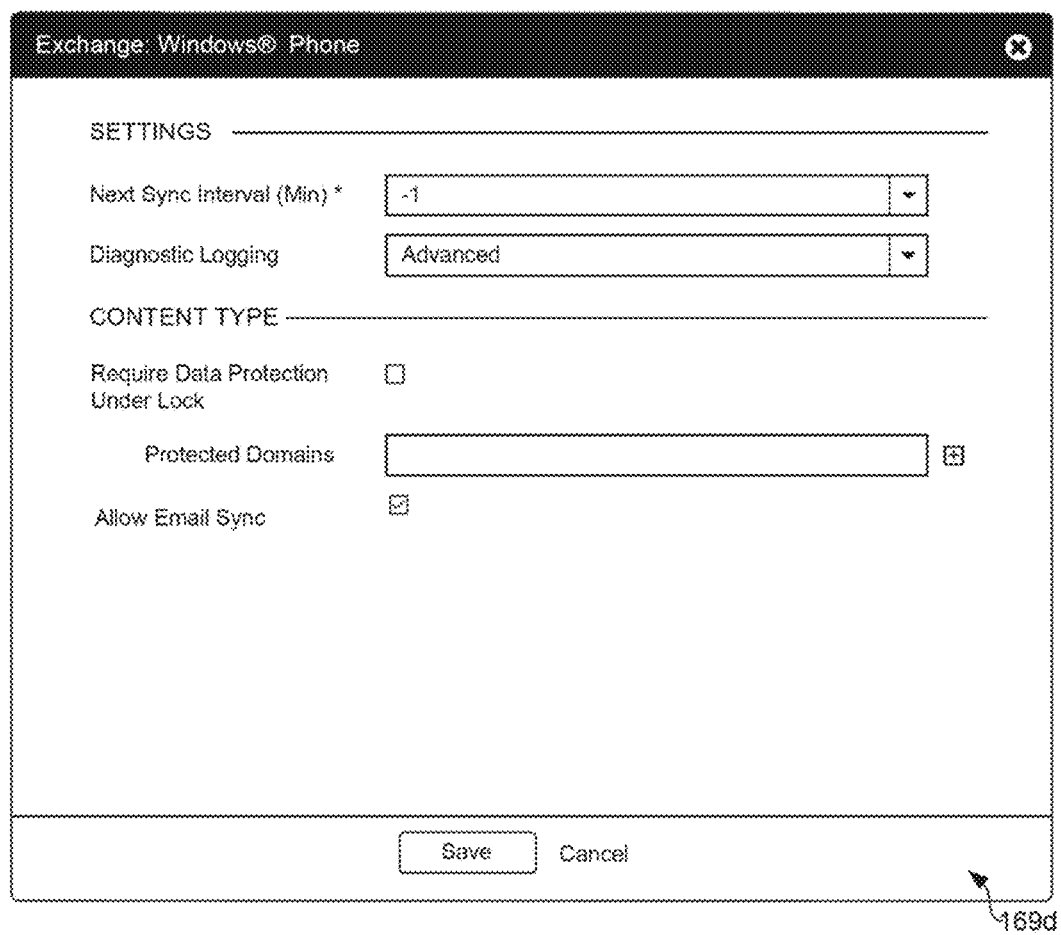

Referring to FIG. 13D, advanced settings for Microsoft® Exchange when Windows® Phone is selected as a platform can include, for example, a next sync interval, a diagnostic logging setting, a require data protection under lock setting, protected domains, an allow email sync setting, as well as other similar settings. The default settings of the fields 500 for Windows® Phone when a user interface 169*c* is accessed to provide advanced email settings for Windows® Phone can include, for example, "−1" as the default value of the next sync interval and "Advanced" as the diagnostic logging setting. Additionally, a checkbox for allow email sync can be checked by default.

Figure 13E:
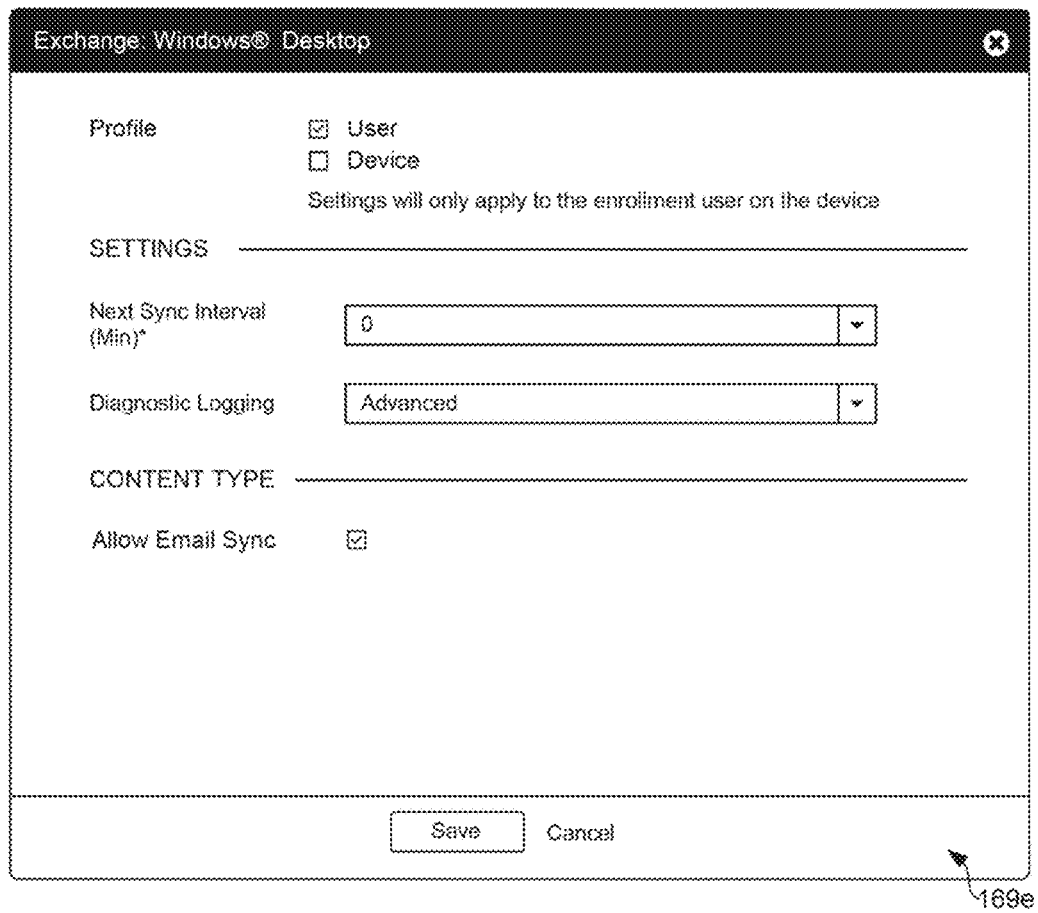

In FIG. 13E, advanced settings for Microsoft® Exchange when Windows® Desktop is selected as a platform can include, for example, a profile type, a next sync interval, a diagnostic logging setting, an allow email sync setting, as well as other similar settings. The default settings of the fields 500 for Windows® Desktop when a user interface 169*c* is accessed to provide advanced email settings for Windows® Desktop can include, for example, "0" as the default value of the next sync interval and "Advanced" as the diagnostic logging setting. Additionally, a checkbox for allow email sync and a user profile type can be checked by default.

Figure 14:
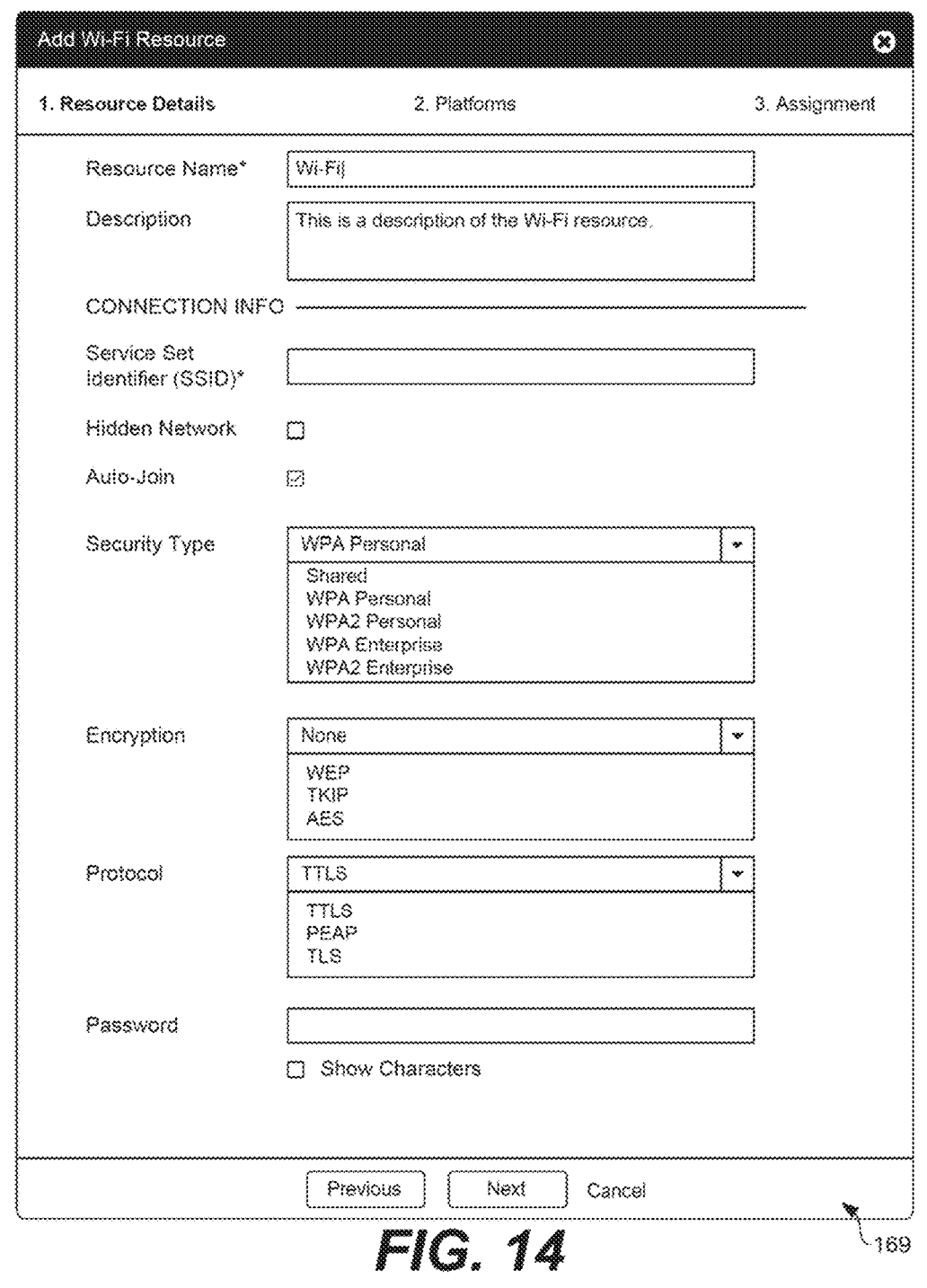

Moving on to FIG. 14, a user interface 169 for configuring Wi-Fi network settings common to various platforms is shown according to various examples. An administrator can specify values for the fields 500 of the user interface 169 which can be used in generating a resource 139 applicable to one or more platforms. For instance, to create a resource 139 having Wi-Fi settings common to various platforms, an administrator can specify a resource name, a description, a SSID, a hidden network setting, an auto-join setting, a security type, an encryption setting, a protocol setting, a password, and other similar settings. When generating a configuration profile 25 for a platform assigned to the resource 139, the management service 115 can utilize the values provided in the fields 500 to generate an XML file capable of interpretation by the different platforms. In some examples, the default values for the common settings of FIG. 14 can include, for example, "Wi-Fi" as the resource name, "WPA Personal" as the security type, "None" as the encryption setting, or "TTLS" as the protocol setting. Additionally, a checkbox for the auto-join setting can be checked by default.

In some examples, the SSID can be a required field 500 and be empty by default. Additionally, values for the security type can include, for example, "None," "Shared," "WPA Personal," "WPA2 Personal," "WPA Enterprise," "WPA2 Enterprise," or similar value. In some examples, if "Shared" is selected as a security type, values for the encryption setting can include "WEP," "TKIP," "AES," or similar method. If the security type is set to WPA/WPA2 Personal or WPA/WPA2 Enterprise, the encryption setting can include "None," "WEP," "TKIP," "AES," or similar setting. If the security type is set to one of "Shared," "WPA Personal," or "WPA2 Personal," the password field can appear with a "Show Characters" checkbox. If the security type is set to either "WPA Enterprise" or "WPA2 Enterprise," the protocol field can be shown with the following values: "TTLS," "PEAP," and "TLS."

Figure 15A:
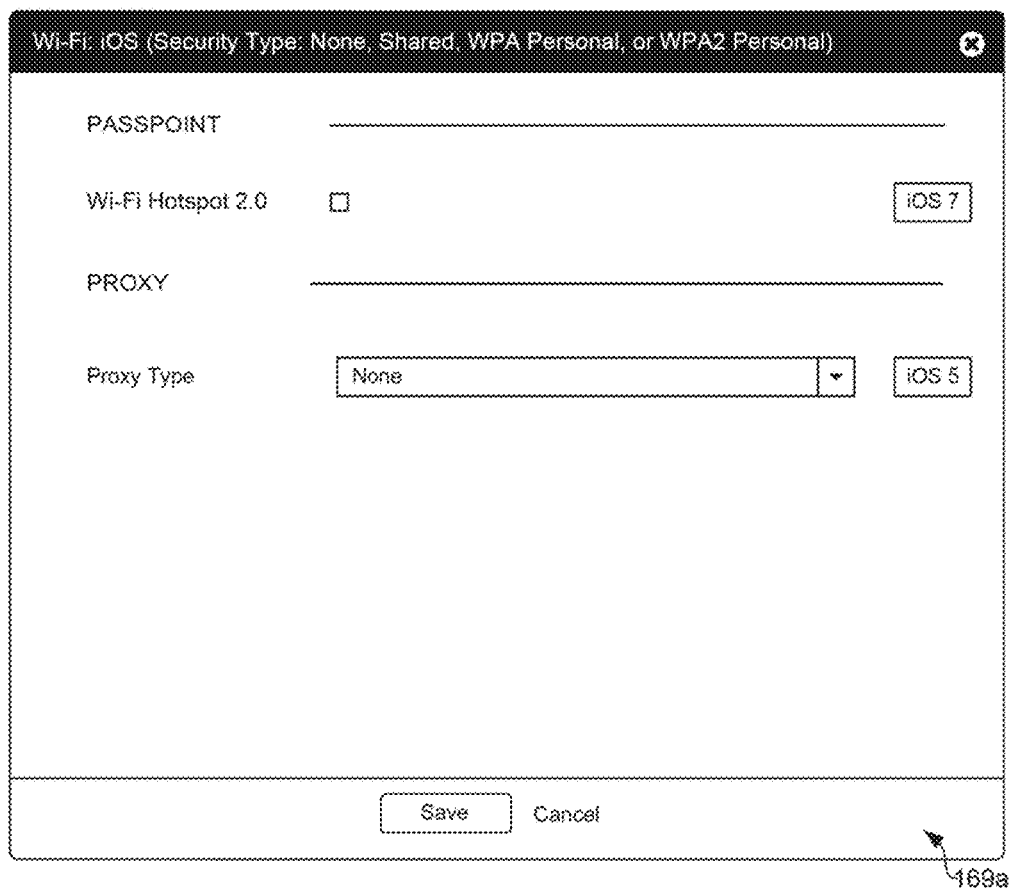
FIGS. 15A-15N are drawings of user interfaces for configuring advanced Wi-Fi settings specific to various platforms.
Figure 15B:
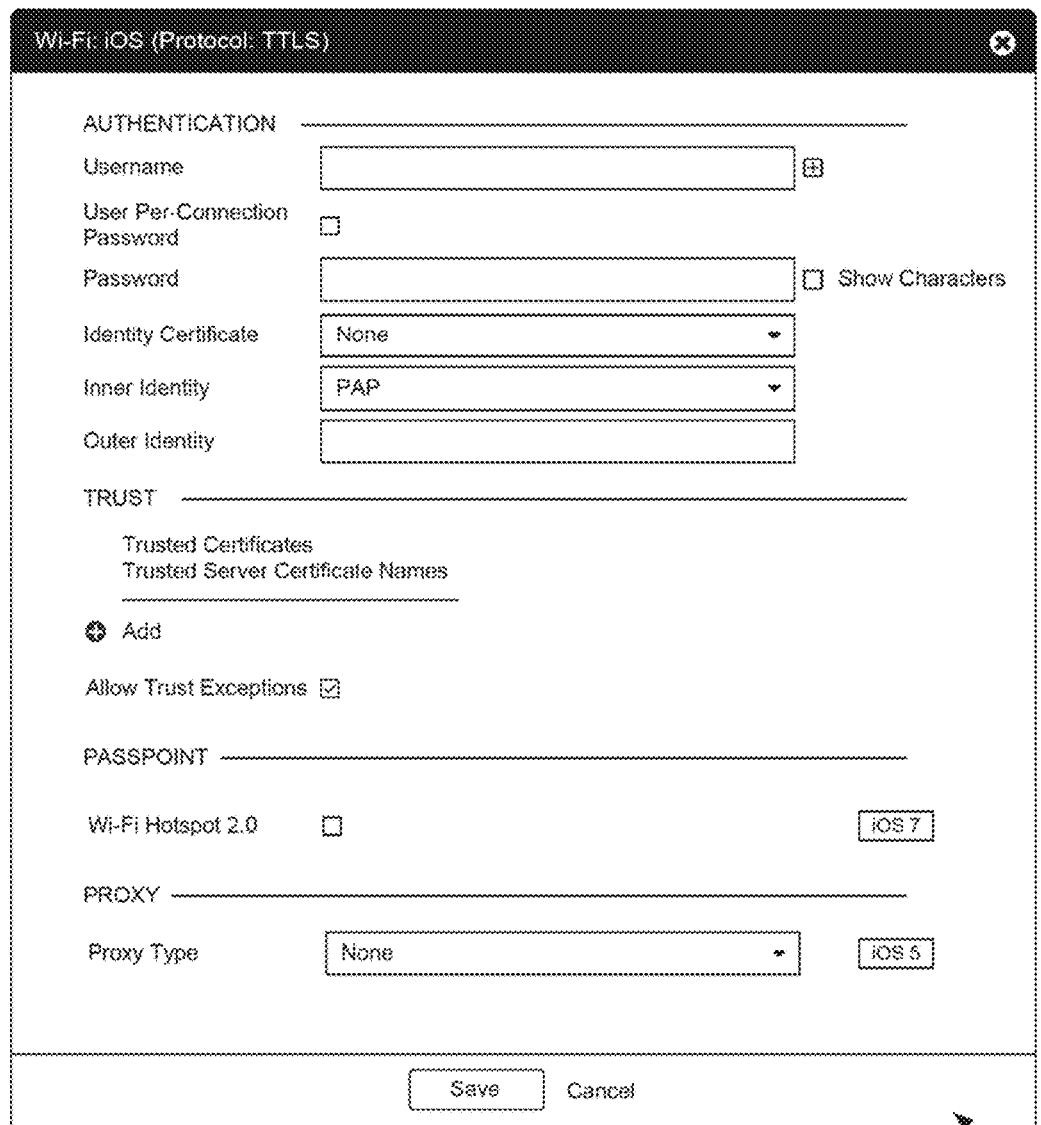
Figure 15C:
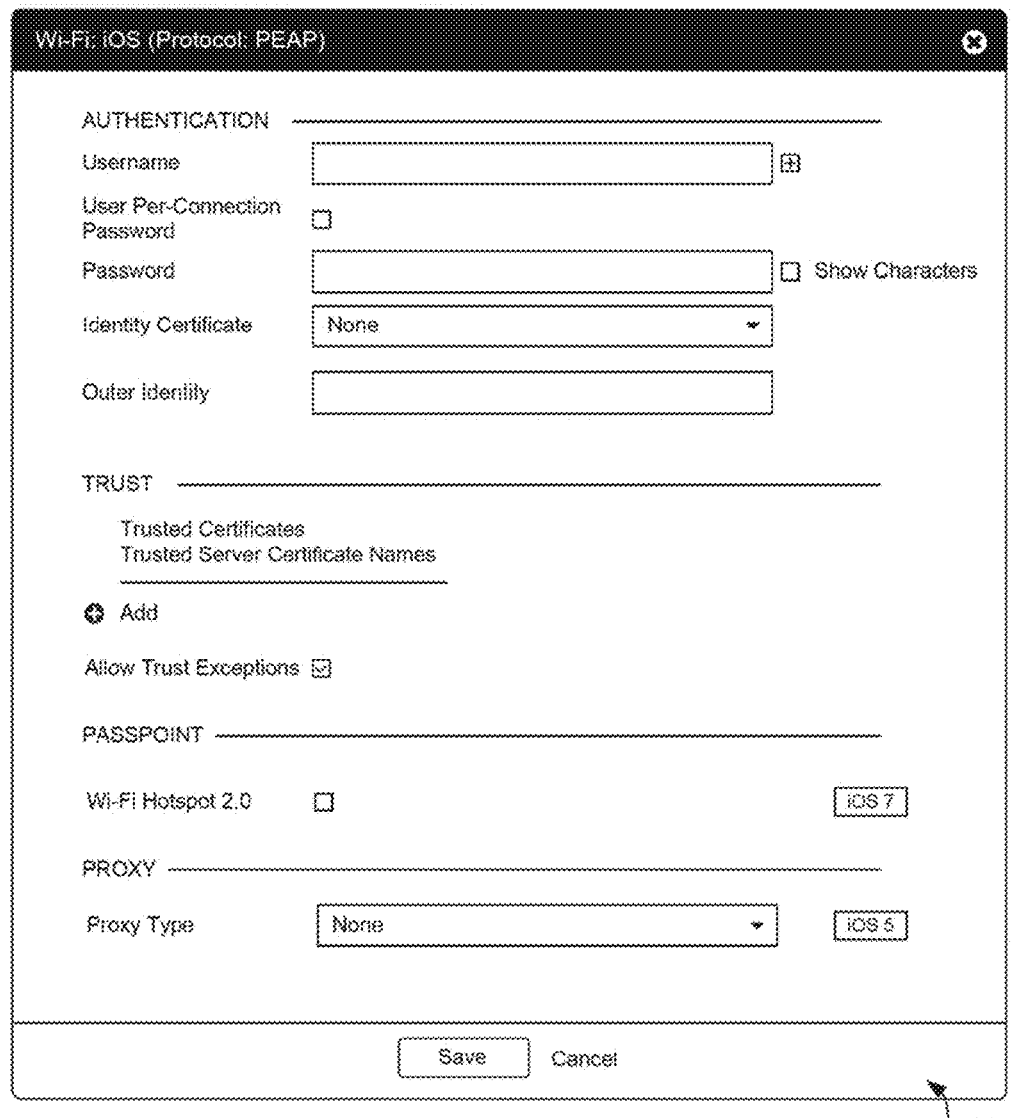
Figure 15D:
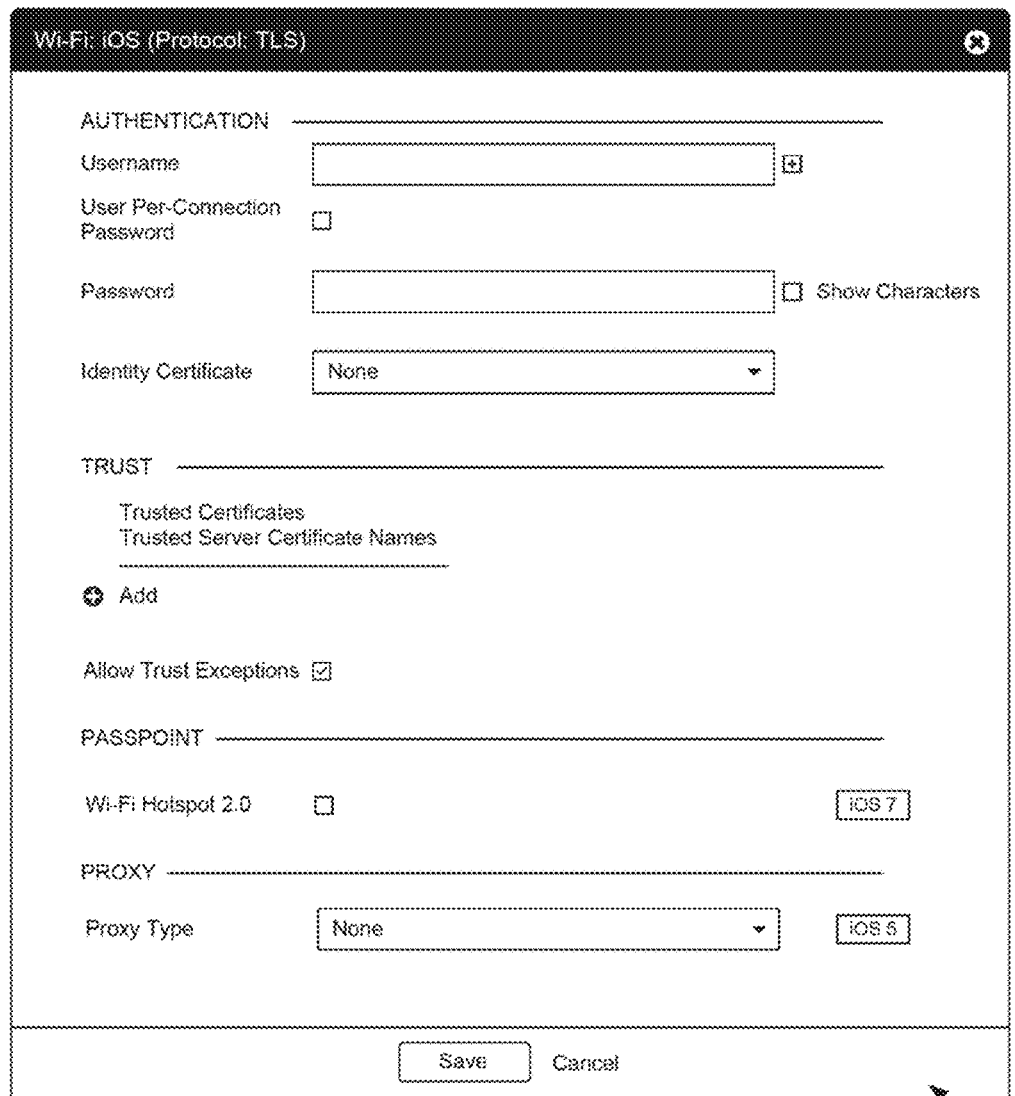
Figure 15E:
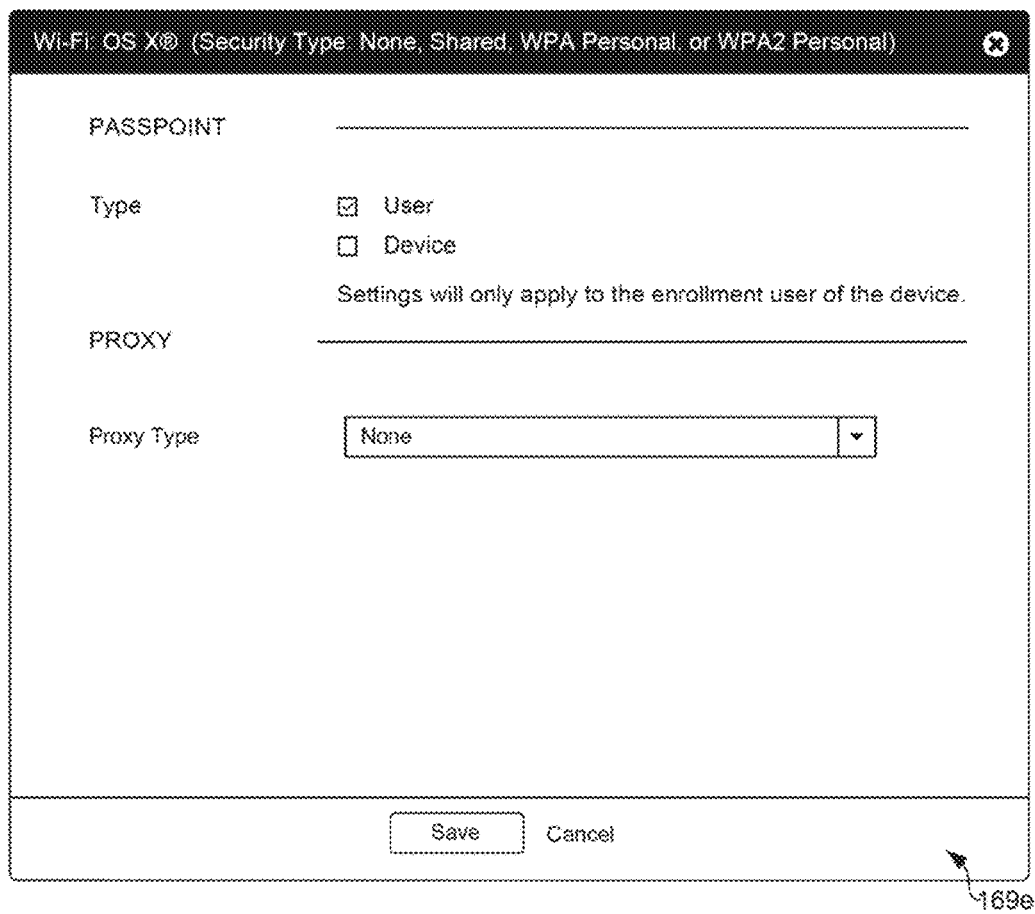
Figure 15F:
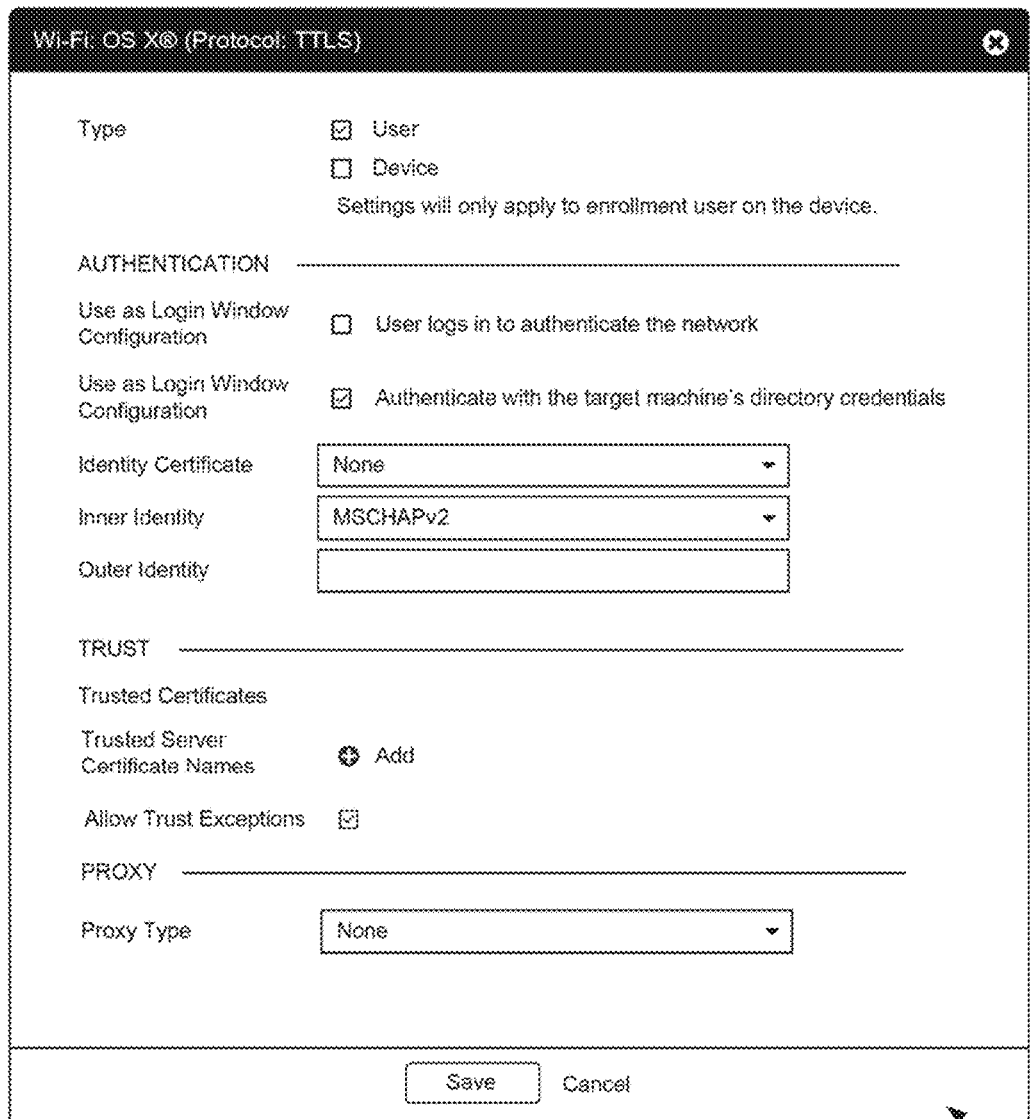
Figure 15G:
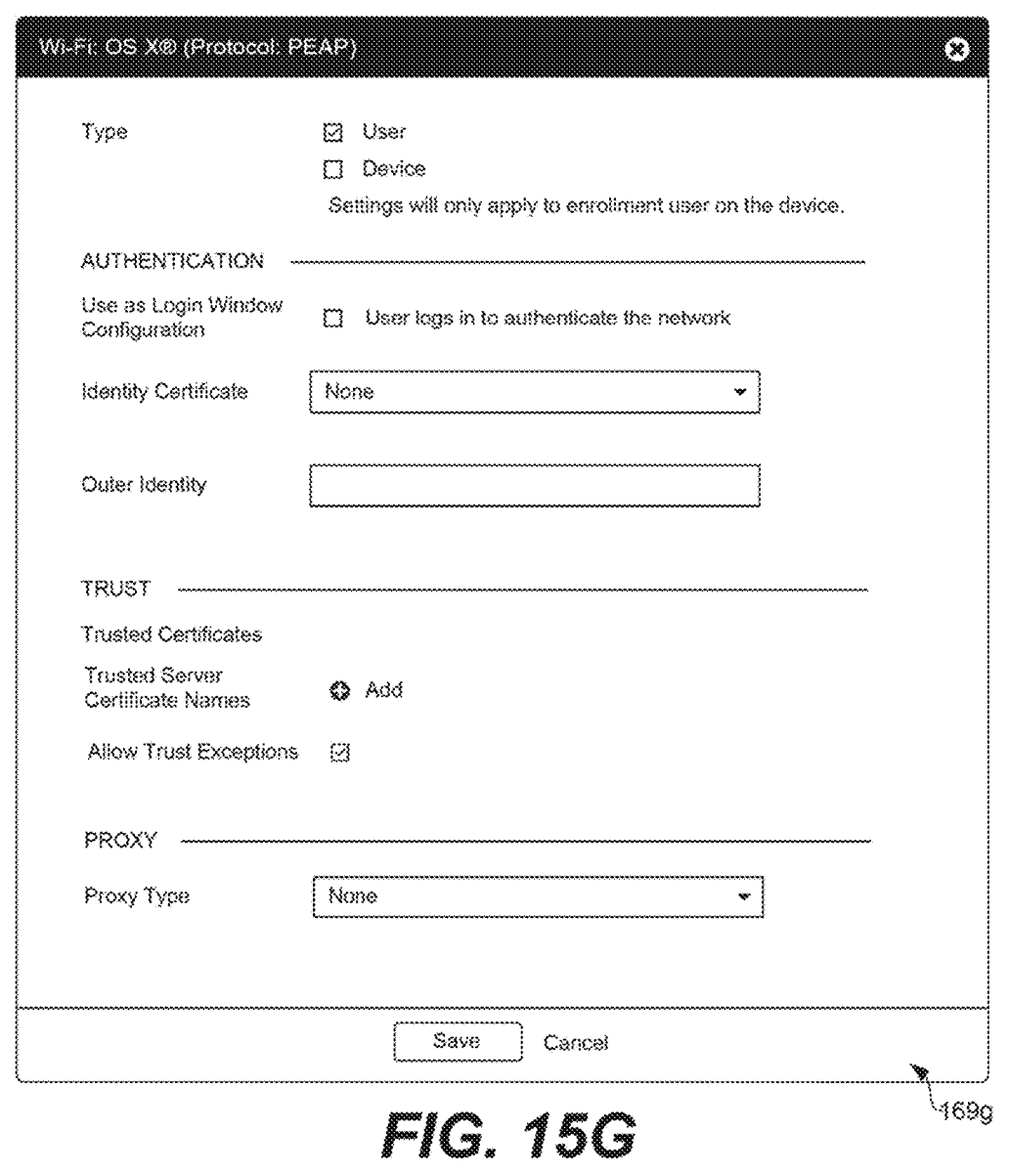
Figure 15H:
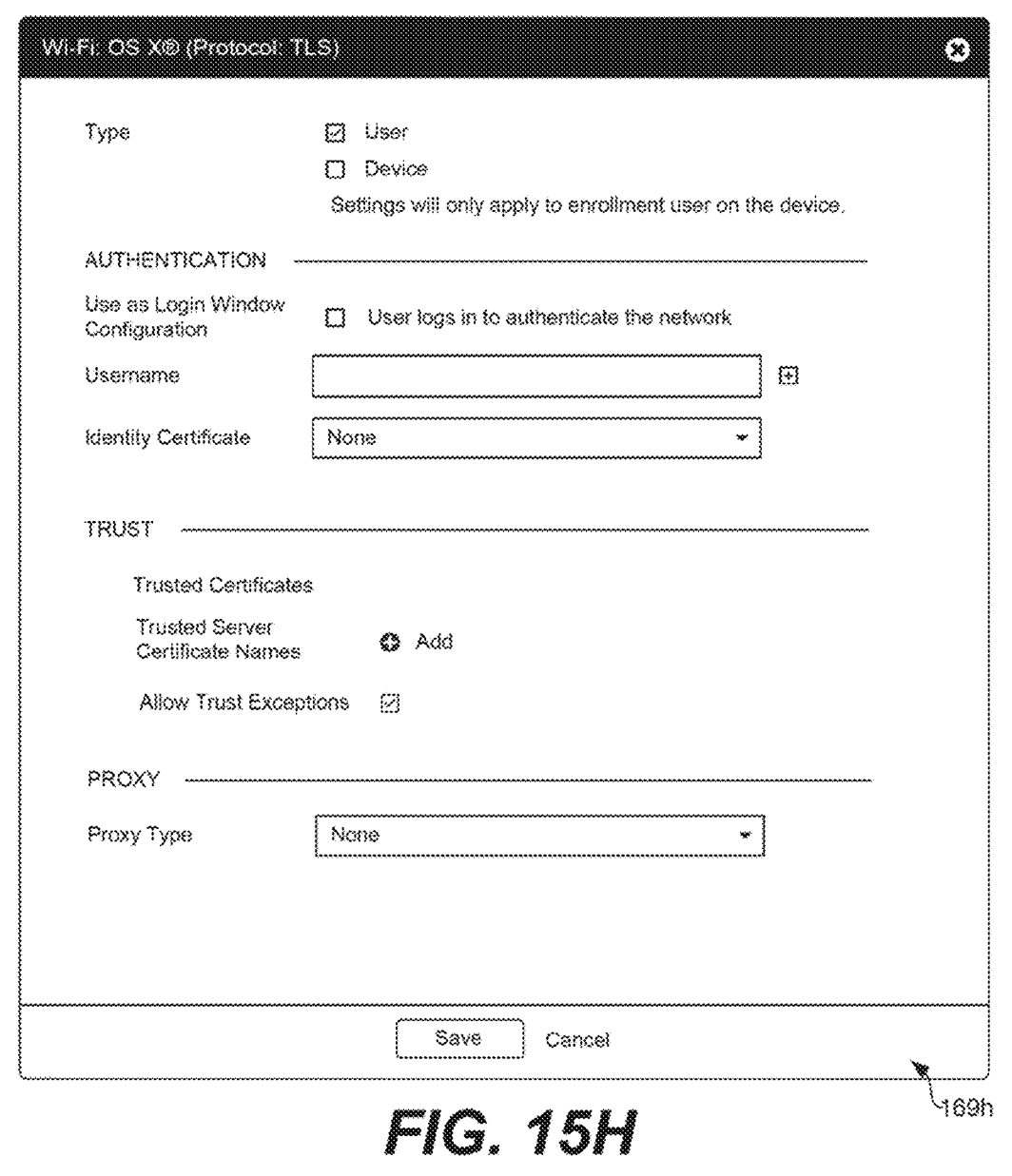
Figure 15I:
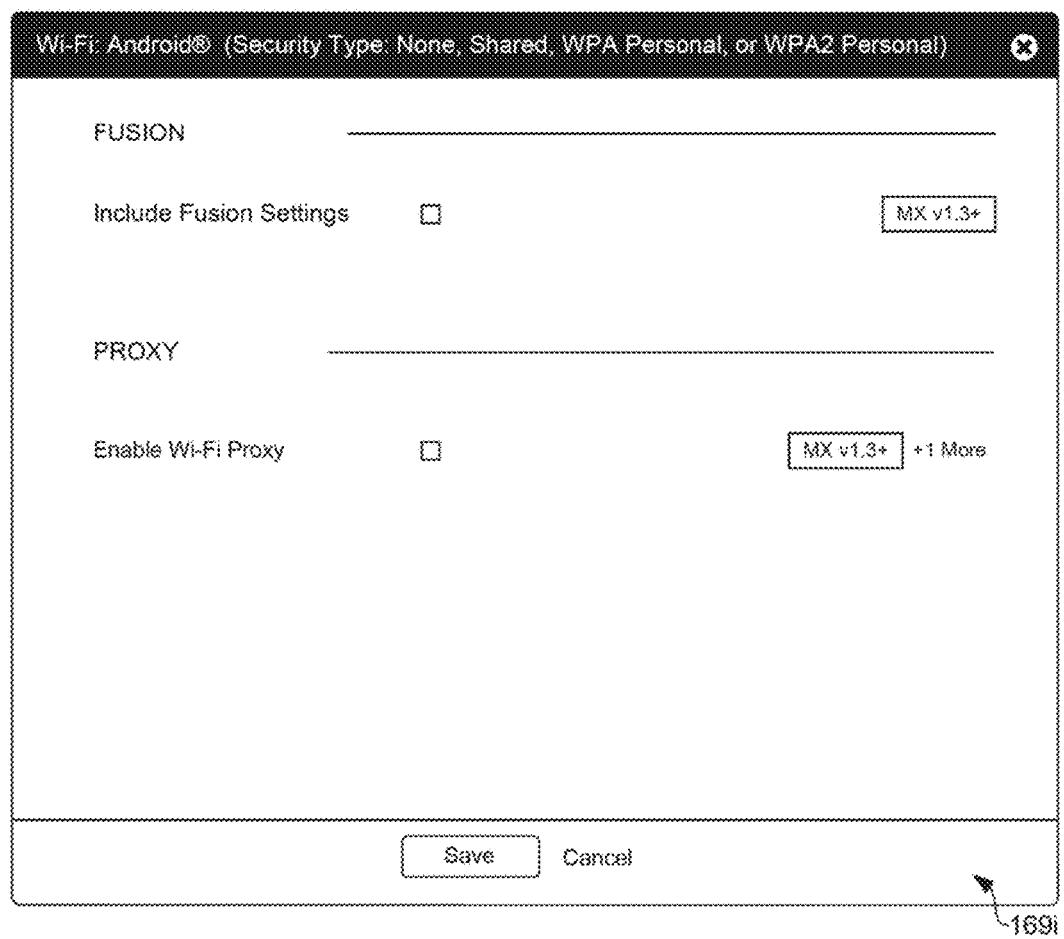
Figure 15J:
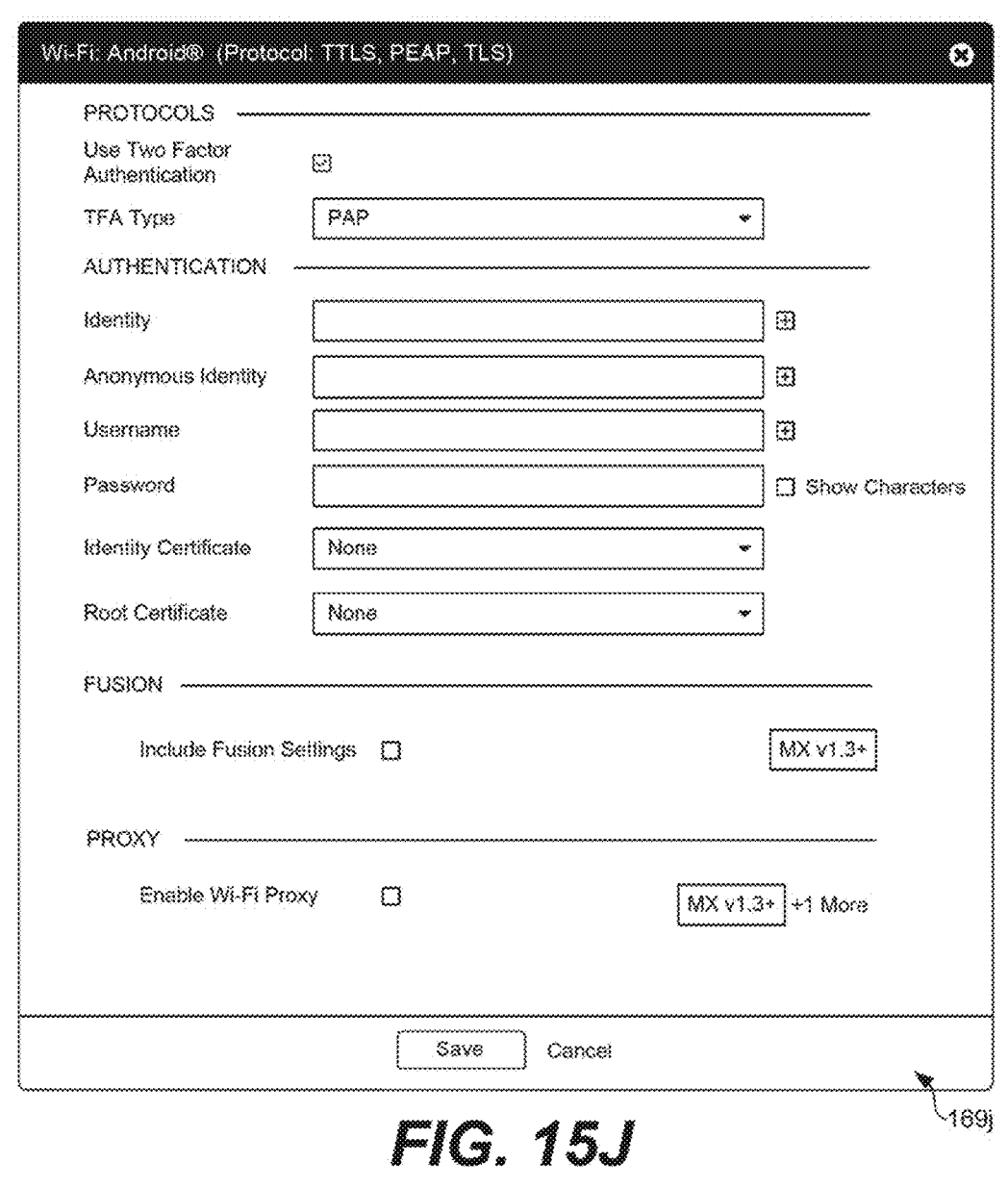
Figure 15K:
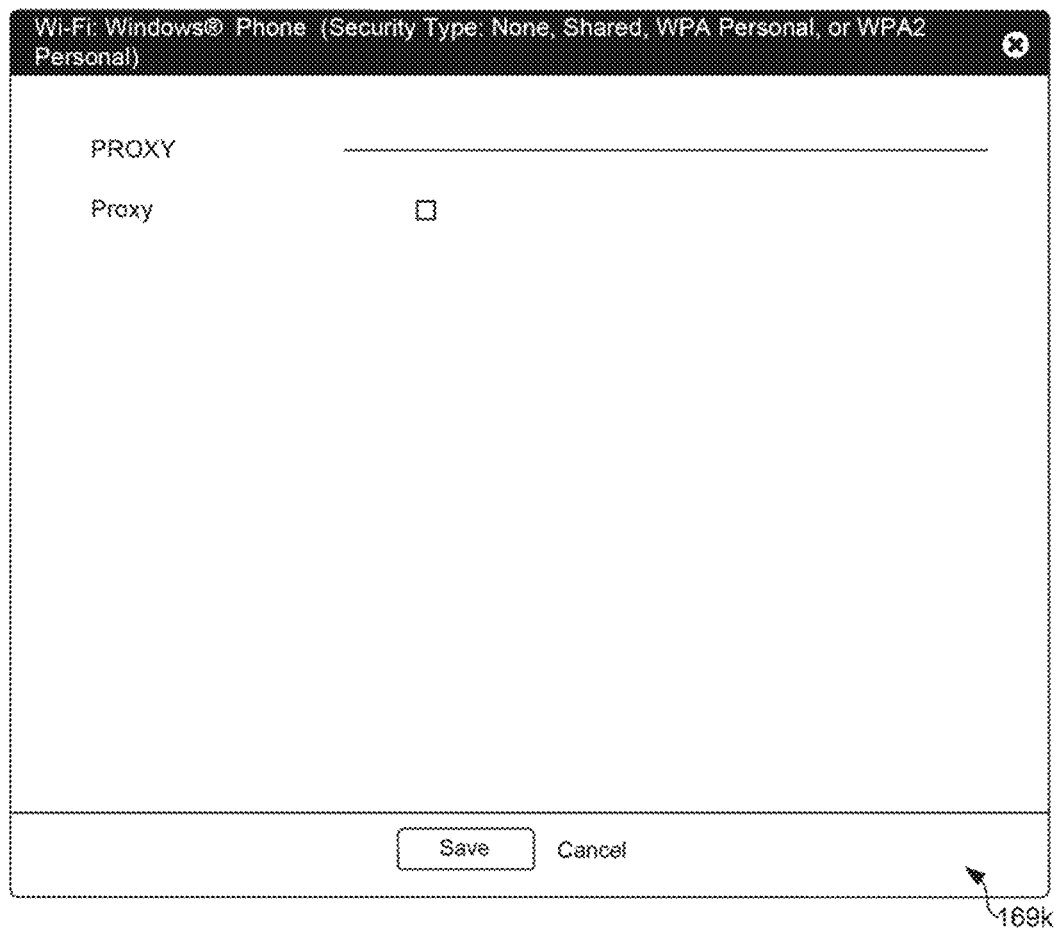
Figure 15L:
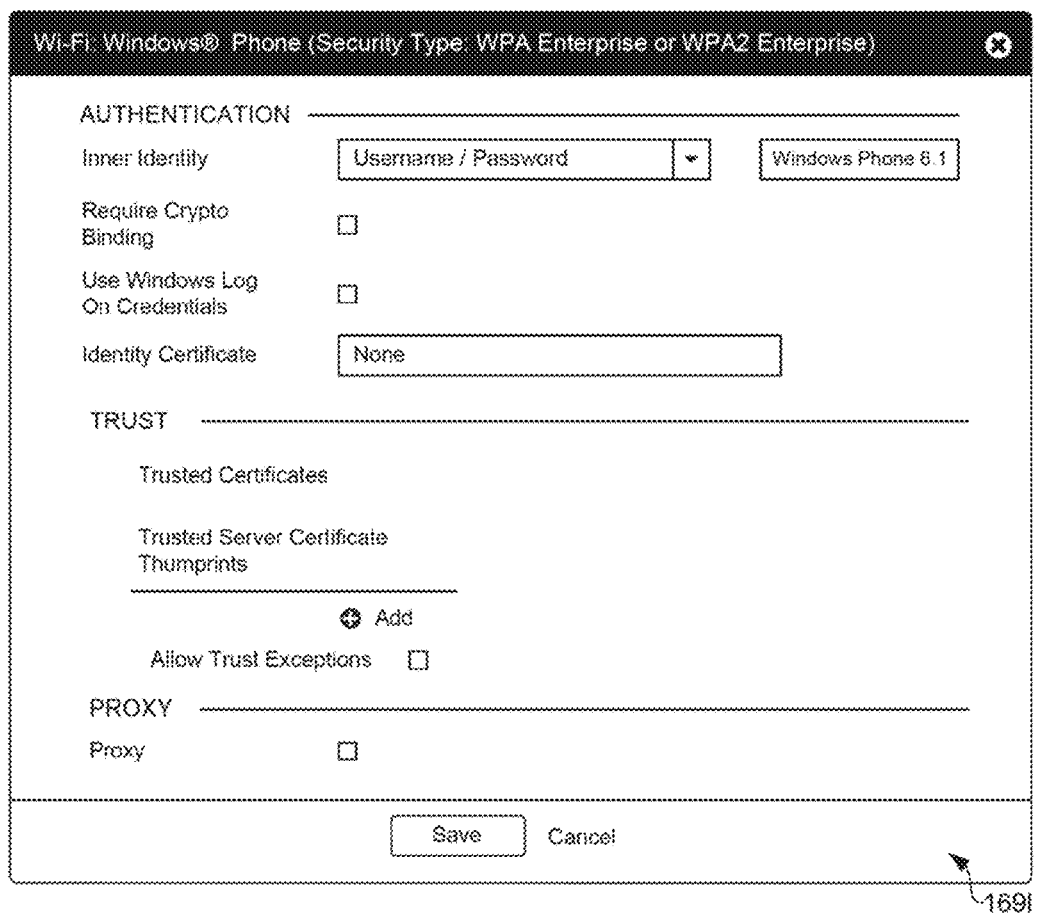
Figure 15M:
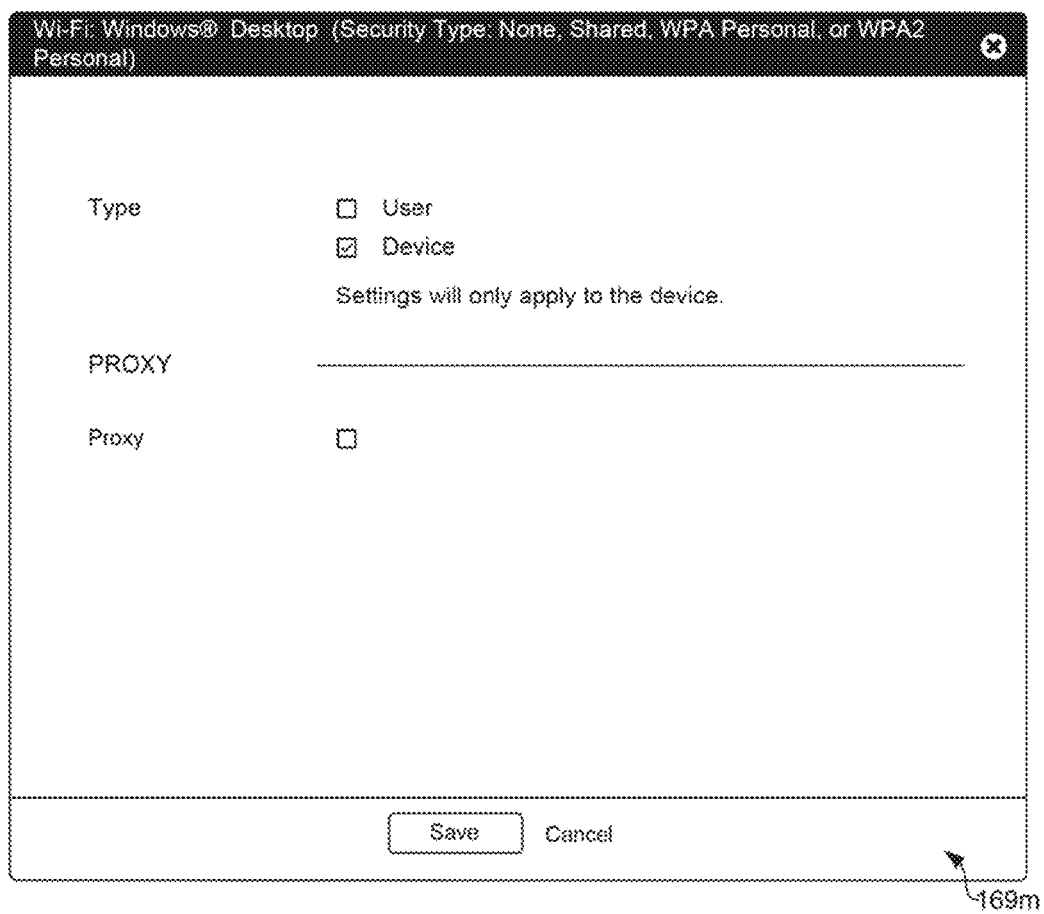
Figure 15N:
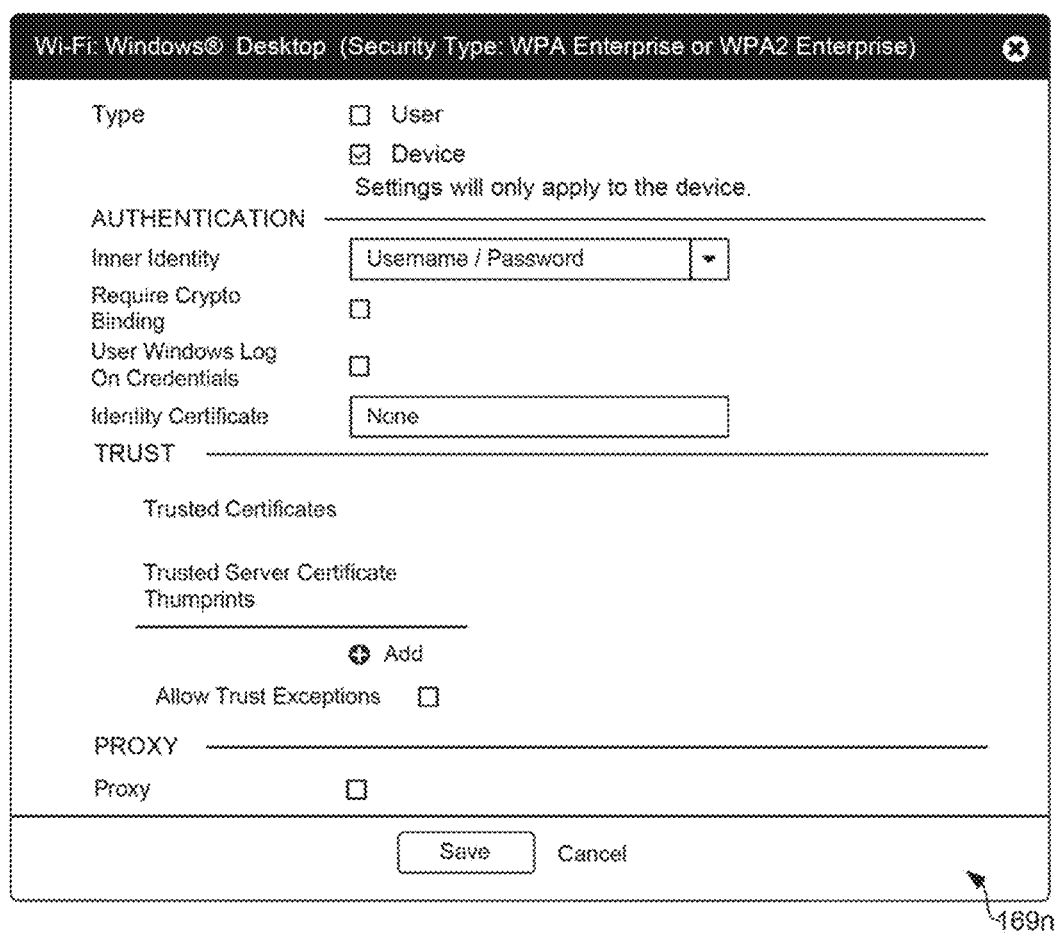

Turning now to FIGS. 15A-15N, user interfaces 169*a* . . . 169*n* for configuring advanced Wi-Fi settings specific to various platforms are shown according to various examples. Similar to VPN and email settings, each type of operating system 166 or device can have a different degree of configurability for W-Fi network settings. Thus, each of the user interfaces 169*a* . . . 169*n* can include fields 500 varying from other platforms. A mapping of advanced settings for resources 139 to profile settings for Wi-Fi are shown in the database tables 700*f* . . . 700*g* of FIGS. 7F and 7G.

Referring to FIG. 15A, a user interface 169*a* is shown for advanced Wi-Fi settings for the iOS platform if a security type specified in FIG. 14 is one of "None," "Shared," "WPA Personal," or "WPA2 Personal." The settings can include, for example, a Wi-Fi Hotspot 2.0 setting and a proxy type. A default value for the proxy type can be "None" and a checkbox for the Wi-Fi Hotspot 2.0 can be unchecked by default.

Referring to FIG. 15B, a user interface 169*b* is shown for advanced Wi-Fi settings for the iOS platform if a protocol specified in FIG. 14 is "TTLS." The advanced settings for generating a configuration profile 25 for iOS can include, for example, a username, a user per-connection password setting, a password, an identity certificate, an inner identity, an outer identity, trusted certificate settings, trusted server certificate names, an allow trust exception setting, a Wi-Fi Hotspot 2.0 setting, a proxy type, and similar settings. In some examples, a default value for the identity certificate can include "None," a default value for the inner identity can include "PAP," and a default value for the proxy type can include "None." A checkbox for the Wi-Fi Hotspot 2.0 and the user per-connection password can be unchecked by default while a checkbox for allow trust exceptions can be checked by default.

Referring to FIG. 15C, a user interface 169*c* is shown for advanced Wi-Fi settings for the iOS platform if a protocol specified in FIG. 14 is "PEAP." The advanced settings for generating a configuration profile 25 for iOS can include, for example, a username, a user per-connection password setting, a password, an identity certificate, an outer identity, trusted certificate settings, trusted server certificate names, an allow trust exception setting, a Wi-Fi Hotspot 2.0 setting, a proxy type, and similar settings. In some examples, a default value for the identity certificate can include "None" and a default value for the proxy type can include "None." A checkbox for the Wi-Fi Hotspot 2.0 and the user per-connection password can be unchecked by default while a checkbox for allow trust exceptions can be checked by default.

In FIG. 15D, a user interface 169d is shown for advanced Wi-Fi settings for the iOS platform if a protocol specified in FIG. 14 is "TLS." The advanced settings for generating a configuration profile 25 for iOS can include, for example, a username, a user per-connection password setting, a password, an identity certificate, trusted certificate settings, trusted server certificate names, an allow trust exception setting, a Wi-Fi Hotspot 2.0 setting, a proxy type, and similar settings. In some examples, a default value for the identity certificate can include "None" and a default value for the proxy type can include "None." A checkbox for the Wi-Fi Hotspot 2.0 and the user per-connection password can be unchecked by default while a checkbox for allow trust exceptions can be checked by default.

Referring to FIG. 15E, a user interface 169e is shown for advanced Wi-Fi settings for the OS X® platform if a security type specified in FIG. 14 is one of "None," "Shared," "WPA Personal," or "WPA2 Personal." The settings can include, for example, a profile type, a proxy type, or similar setting. A default value for the proxy type can be "None" and a checkbox for a user profile type setting can be checked while a device user profile type is unchecked. In some examples, an administrator can specify both a user profile type and a device profile type.

Referring to FIG. 15F, a user interface 169f is shown for advanced Wi-Fi settings for the OS X® platform if a protocol specified in FIG. 14 is "TTLS." The advanced settings for generating a configuration profile 25 for OS X® can include, for example, a profile type, use as login window settings, an identity certificate, an inner identity, an outer identity, trusted certificate settings, trusted server certificate names, an allow trust exception setting, a proxy type, and similar settings. In some examples, a default value for the identity certificate can include "None," a default value for the inner identity can include "MSCHAPv2," and a default value for the proxy type can include "None." A checkbox for the user profile type, the use as login window configuration (pertaining to authenticating the target machine's directory credentials), and the allow trust exception setting can be checked by default.

In FIG. 15G, a user interface 169g is shown for advanced Wi-Fi settings for the OS X® platform if a protocol specified in FIG. 14 is "PEAP." The advanced settings for generating a configuration profile 25 for OS X® can include, for example, a profile type, a use as login window setting, an identity certificate, an outer identity, trusted certificate settings, trusted server certificate names, an allow trust exception setting, a proxy type, and similar settings. In some examples, a default value for the identity certificate can include "None" and a default value for the proxy type can include "None." A checkbox for the user profile type and the allow trust exception setting can be checked by default. OS X® only has both the user and the device profile type available. In some examples, the default is selected on the user profile type, however, the administrator can specify the device profile type or both.

In FIG. 15H, a user interface 169h is shown for advanced Wi-Fi settings for the OS X® platform if a protocol specified in FIG. 14 is "TLS." The advanced settings for generating a configuration profile 25 for OS X® can include, for example, a profile type, a use as login window setting, a username, an identity certificate, trusted certificate settings, trusted server certificate names, an allow trust exception setting, a proxy type, and similar settings. In some examples, a default value for the identity certificate can include "None" and a default value for the proxy type can include "None." A checkbox for the user profile type and the allow trust exception setting can be checked by default.

Referring to FIG. 15I, a user interface 169i is shown for advanced Wi-Fi settings for the Android® platform if a security type specified in FIG. 14 is one of "None," "Shared," "WPA Personal," or "WPA2 Personal." The settings can include, for example, an include fusion settings checkbox and an enable Wi-Fi proxy checkbox. In some examples, neither checkbox is checked by default.

Referring to FIG. 15J, a user interface 169j is shown for advanced Wi-Fi settings for the Android® platform if a protocol specified in FIG. 14 is one of "TTLS," "PEAP," or "TLS." The advanced settings for generating a configuration profile 25 for Android® can include, for example, a user two-factor authentication setting, a TFA type, an identity setting, an anonymous identity setting, a username, a password, an identity certificate, a root certificate, an include fusion setting, an enable Wi-Fi proxy setting, and similar settings. In some examples, a default value for the TFA type can include "PAP," a default value for the identity certificate can include "None," and a default value for the root certificate can include "None." A checkbox for the use two-factor authentication setting can be checked by default.

Referring to FIG. 15K, a user interface 169k is shown for advanced Wi-Fi settings for the Windows® Phone platform if a security type specified in FIG. 14 is one of "None," "Shared," "WPA Personal," or "WPA2 Personal." The settings can include, for example, a proxy checkbox. In one example, the checkbox is unchecked by default. As Windows® Desktop only has the device profile type available, the profile type setting can be shown on an advanced settings user interface or the user interface 169 of FIG. 14, but the device profile type is checked by default and unable to be modified.

Figure 16:
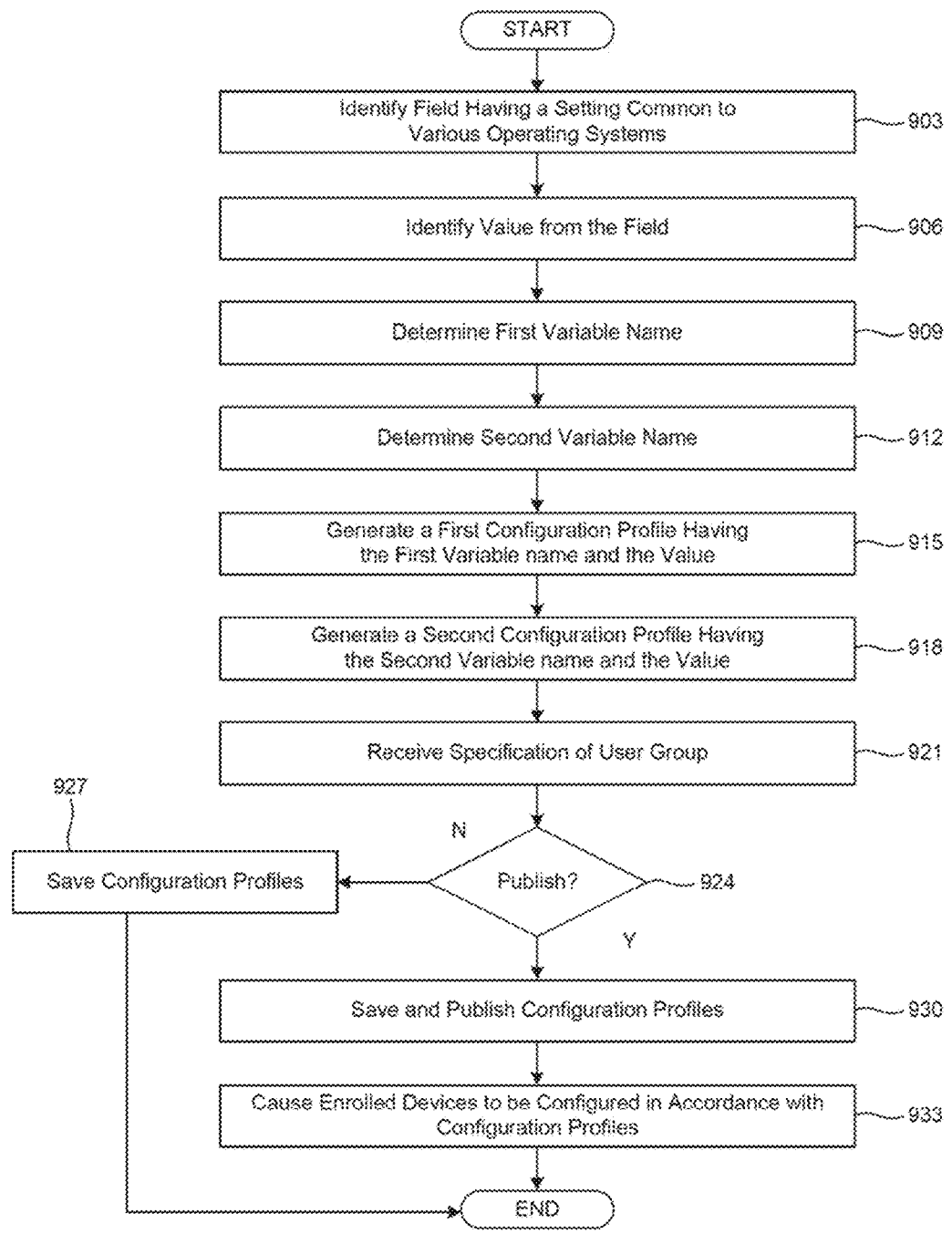
FIG. 16 is a flowchart illustrating functionality implemented by components of the networked environment.

Moving on to FIG. 16, shown is a flowchart that provides one example of the operation of a portion of the computing environment 103. The flowchart of FIG. 16 can be viewed as depicting an example of elements of a method implemented by the management service 115 executing in the computing environment 103 according to one or more examples. The separation or segmentation of functionality as discussed herein is presented for illustrative purposes only.

Beginning with step 903, the computing environment 103 can identify a field that pertains to a setting common to various operating systems 166. In other words, the computing environment 103 can locate a field in a user interface that is not specific to a particular operating system 166 or device. In some examples, common settings can include settings pertaining to Wi-Fi, VPN, or email. Thus, the field can include a textbox for entry of a Wi-Fi SSID or password, a textbox for entry of a VPN internet protocol (IP) address, or a textbox for an email server address. In some examples, the computing environment 103 can identify the field based on a "name" attribute associated with the field. For example, a textbox can be defined for use in a user interface using the following hypertext markup language (HTML) markup:

<input type="text" name="common_wifi_ssid"/>

The computing environment 103 can identify the HTML markup above using JavaScript, jQuery, or related language library based on the name field, the "common_" preface of the name of the field, or the name of the field itself. For instance, the data store 112 can maintain a listing of names for fields that are common to different operating systems 166.

In step 906, the computing environment 103 can identify the value from the field. As can be appreciated, the value can include something an administrator typed into a textbox, selected from a dropdown box, selected from an option box, or other interaction with a field of a user interface. For instance, the computing environment 103 can use JavaScript, jQuery, or related language library to access the value of the field having the name "common_wifi_ssid."

In step 909, the computing environment 103 can determine a first variable name 145 for inclusion in a first configuration profile 25. The computing environment 103 can identify the first variable name 145, for example, from the data store 112 based on a first operating system 166 specified by an administrator. As noted above, the configuration profile 25 can include an XML document having markup text that can be parsed by the client device 50. The XML document can include, for example, XML markup. Assuming the administrator desires to create a configuration profile 25 for iOS devices, an HTML tag can be constructed dynamically to form an XML document reading:

. . .
<WiFi_Mac_SSID>AlphaCo Employee WiFi</WiFi_Mac_SSID>
. . .

where "WiFi_Mac_SSID" is the variable name 145 identified for the Wi-Fi SSID for iOS devices. As can be appreciated, the agent application 121 on the client device 50 will use the variable name 145 to configure the client device 50. If the operating system 166 of the client device 50 is not iOS, the client device 50 will not be properly configured.

Similarly, in step 912, the computing environment 103 can determine a second variable name 145 for inclusion in a second configuration profile 25. The computing environment 103 can identify the second variable name 145, for example, from the data store 112 based on a second operating system 166 specified by an administrator. As the variable name 145 identified in step 909 will not work a different operating system 166. e.g., the second operating system 166 specified by the administrator, the variable name 145 must be one that will successfully configure the second operating system 166. Assuming the second operating system 166 selected by the administrator in Android®, an HTML tag can be constructed dynamically to form an XML document reading:

. . .
<WiFi_Droid_SSID>AlphaCo Employee WiFi</Wi-Fi_Droid_SSID>
. . .

where "WiFi_Droid_SSID" is the variable name 145 identified for the Wi-Fi SSID for Android® devices.

In step 915, the computing environment 103 can dynamically generate the first configuration profile 25 using the value identified in step 906 and the first variable name 145 determined in step 909. Generating a configuration profile 25 can include, for example, creating a new XML document or modifying an existing XML document to include the variable name 145 and the value while complying with XML schema. In some examples, the variable name 145 and the value can be specified as a key-value pair, where the variable name 145 determined in step 909 is the key and the value identified in step 906 is the value in the key-value pair.

Similarly, in step 918, the computing environment 103 can dynamically generate the second configuration profile 25 using the value identified in step 906 and the second variable name 145 determined in step 912. While the first configuration profile 25 and the second configuration profile 25 are both generated dynamically using the same value identified from step 906, it is understood that the first configuration profile 25 and the second configuration profile 25 may be vastly different based on the differences among the variable names 145 and the XML schema required by the first and second operating systems 166.

Next, in step 921, the computing environment 103 can receive a specification of a user group. For instance, the administrator can specify particular configuration profiles 25 be deployed to client devices 50 associated with particular user groups. In some examples, the user groups can pertain to a particular organization unit in an enterprise, such as "IT Team Devices," "Sales Team Devices." or "Engineering Team Devices." In some examples, the user groups can pertain to a particular operating system 166 or type of device, such as "Android Devices," "iOS Devices," or "Windows Mobile Devices." The customization of user groups can be dependent on the various needs of an administrator to configure different types of devices or devices associated with particular personnel, as can be appreciated.

In step 924, the computing environment 103 can determine whether to publish the first configuration profile 25 and/or the second configuration profile 25. For instance, after completion of the wizard, the administrator can specify whether to save the configuration profiles 25 for later access or modification, or can instruct the computing environment 103 to publish the configuration profiles 25. Publication can include, for example, the computing environment 103 sending the configuration profiles 25 to client device 50 corresponding to the user group specified in step 921. The client device 50, upon receipt of the configuration profile 25, can configure the client device 50 in accordance with the settings specified in the configuration profile 25.

If the administrator has not published the configuration profiles 25, the process can continue to step 927. In step 927, the computing environment 103 can save the configuration profiles 25 in the data store 112 for later access by the administrator. Thereafter, the process can proceed to completion. Referring back to step 924, if the administrator has published the configuration profiles 25, the process can proceed to step 930.

In step 930, the computing environment 103 can save and publish the configuration profiles 25. As noted above, the computing environment 103 will publish the configuration profiles 25 by sending the configuration profiles 25 to client devices 50 corresponding to the user group specified in step 921. Additionally, the first configuration profile 25 will be sent to a subset of the client devices 50 having the first operating system 166 installed thereon while the second configuration profile 25 will be sent to client devices 50 having the second operating system 166 installed thereon.

In step 933, the computing environment 103 can cause the client devices 50 enrolled with the management service 115 to be configured in accordance with the configuration policies. In one example, the client device 50, upon receipt of a configuration profile 25, can automatically configure the client device 50 in accordance with the settings specified in the configuration profile 25. In another example, the client device 50, upon receipt of a configuration profile 25, can store the configuration profile 25 on the client device 50 until the computing environment 103 instructs the client device 50 to configure the client device 50 to self-configure using the configuration profile 25. If a client device 50 is part of more than one user group, any duplicate client applications, resources, or other data can be ignored and, if conflicting policies exist among the different user groups, then the more restrictive policy can be automatically employed. Thereafter, the process can proceed to completion.

Figure 17:
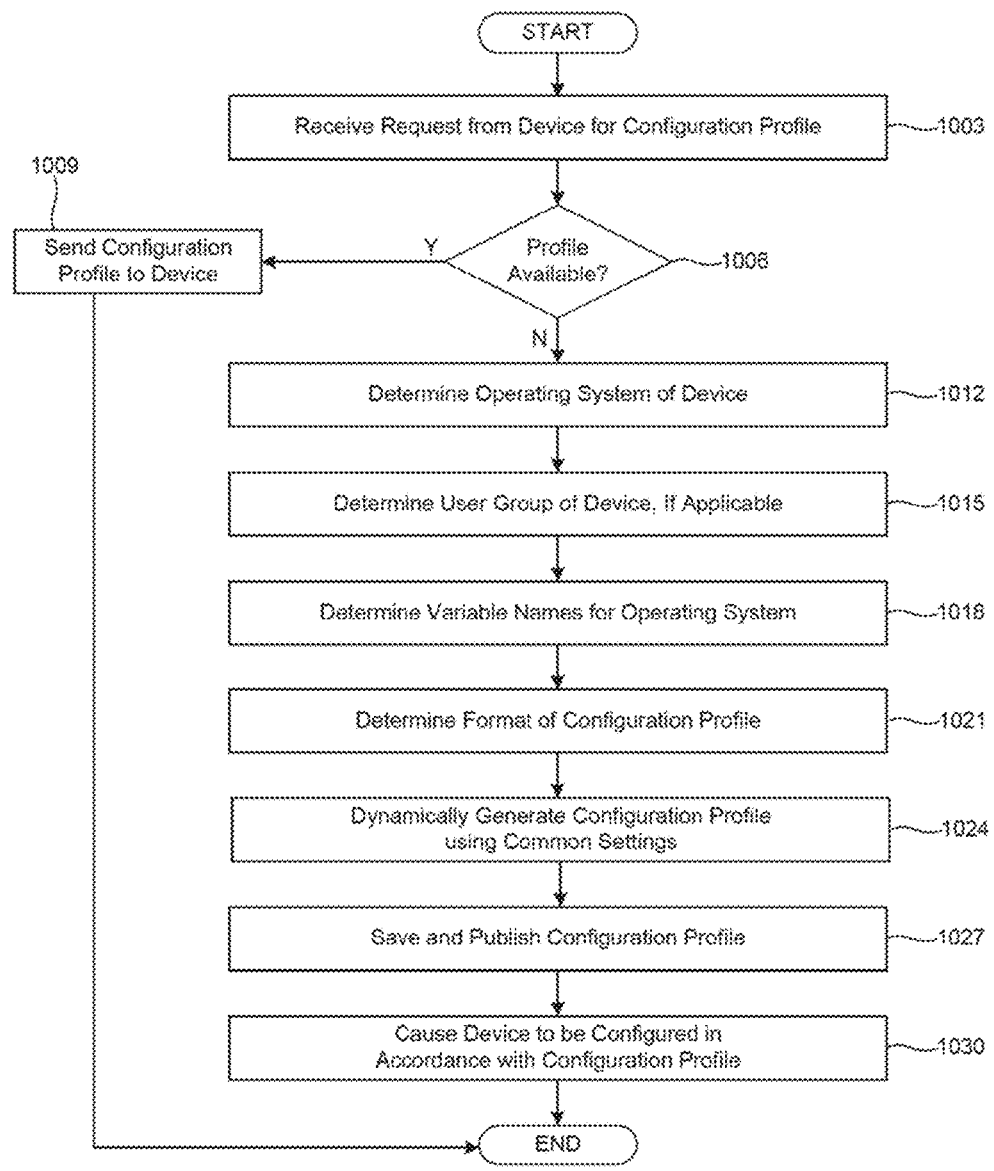
FIG. 17 is a flowchart illustrating functionality implemented by components of the networked environment.

Turning now to FIG. 17, shown is a flowchart that provides one example of the operation of a portion of the computing environment 103. The flowchart of FIG. 17 can be viewed as depicting an example of elements of a method implemented by the management service 115 executing in the computing environment 103 according to one or more examples. The separation or segmentation of functionality as discussed herein is presented for illustrative purposes only.

Typically, when an end user starts employment at an enterprise, he or she is required to download the agent application 121 on his or her client device 50 and start an enrollment process through the agent application 121. The enrollment process can include providing an email address, a password, or other authentication information. When attempting to enroll, the agent application 121 can be configured to communicate with the computing environment 103, which then provides the agent application 121 with a configuration profile 25 for the client device 50. However, in some situations, a configuration profile 25 may not exist that is applicable to the client device 50. For instance, an administrator may have created a configuration profile 25 for iOS devices; however, the administrator may have not created a configuration profile 25 for Android® devices. If a client device 50 having the Android® operating system 166 installed thereon attempts to enroll with the management service 115, the management service 115 does not have a configuration profile 25 to provide to the client device 50. As a result, the management service 115 is required to deny enrollment or enrolls the client device 50 without being able to oversee operating of the client device 50, which subjects enterprise data 136 to unauthorized access. Accordingly, in some examples, a configuration profile 25 can be generated for the client device 50 dynamically, even though an administrator has not created a configuration profile 25 for an operating system 166 of the client device 50.

Beginning with step 1003, the computing environment 103 can receive a request from a client device 50 for a configuration profile 25. In some examples, when a user of an agent application 121 executes the agent application 121 and provides suitable authentication information, the agent application 121 can communicate a request to the computing environment 103 for an applicable configuration profile 25. As noted above, in some situations, a configuration profile 25 for the particular type of client device 50 or particular operating system 166 of the client device 50 may not exist.

Hence, in step 1006, the computing environment 103 can determine whether a configuration profile 25 is available (or has been created) for the client device 50. In some examples, the determination is made based on an operating system 166 of the client device 50, a manufacturer of the client device 50, a user group 142 for the client device 50, other hardware or software settings or capabilities of the client device 50, as well as other information.

If a configuration profile 25 exists, for example, when an administrator has previously created a configuration profile 25 that is available to the client device 50, the process can proceed to step 1009. In step 1009, the configuration profile 25 identified in step 1006 is merely published or otherwise made available to the client device 50. As can be appreciated, the agent application 121 can download the configuration profile 25 and configure the client device 50 accordingly. Thereafter, the process can proceed to completion.

Referring back to step 1006, as discussed above, in some scenarios, a configuration profile 25 for the particular type of client device 50 or particular operating system 166 of the client device 50 may not exist. If a configuration profile 25 is not available, the process can proceed to step 1012.

In step 1012, the computing environment 103 can determine an operating system 166 of the client device 50. In some examples, the request received by the computing environment 103 can include information identifying the operating system 166. In other examples, the computing environment 103 can send a request to the agent application 121 to transmit information pertaining to the operating system 166, such as an operating system manufacturer, version number, update number, or other information that can be used to identify a type or version of an operating system 166 installed on the client device 50.

Next, in step 1015, the computing environment 103 can determine a user group 142 for the client device 50, if applicable. For instance, an email address provided by an end user can include "john@sales.enterprise.site" when enrolling through the agent application 121, where the "sales.enterprise.site" domain indicates that the end user is a member of the "Enterprise Sales" user groups 142.

In step 1018, the computing environment 103 can determine a variable name 145 for inclusion in a first configuration profile 25. The computing environment 103 can identify the variable name 145, for example, from the data store 112 based on a type or version of the operating system 166 identified in step 1012. As noted above, the management service 115 can generate a configuration profile 25 having markup text that can be parsed by the client device 50. The configuration profile 25 can include, for example, XML markup. As can be appreciated, the agent application 121 on the client device 50 will use the variable name 145 to configure the client device 50.

In step 1021, the computing environment 103 can determine a format for the configuration profile 25 based on, for example, a type or version of the operating system 166 identified in step 1012. For example, while a configuration profile 25 for a first operating system 166 and a configuration profile 25 for a second operating system 166 are both XML documents, the arrangement of the XML markup in the document must be structured differently. Accordingly, the computing environment 103 can maintain templates or other information pertaining to the required format or schema for the configuration profiles 25 in operating system data 133.

Next, in step 1024, the computing environment 103 can dynamically generate the configuration profile 25 based on the format identified in step 1021 and using the variable names 145 identified in step 1018. Moreover, common settings can be identified for inclusion in the configuration profile 25. For example, Wi-Fi settings, VPN settings, or email settings can be identified using the process described in FIG. 16 that are applicable to different operating systems 166. The values specified by the administrator can be used in dynamically generating the configuration profile 25. Generating the configuration profile 25 can include, for example, creating a new XML document to include the variable name 145 and the value while complying with required XML schema for the operating system 166 identified in step 1012. In some examples, the variable name 145 and the value can be specified as a key-value pair, where the variable name 145 determined in step 1018 is the key and the value is the value in the key-value pair. The computing environment 103 can further use settings defined in association with the user group 142 for inclusion in the configuration profile 25.

In step 1027, the computing environment 103 can save and publish the configuration profile 25. Publication can include, for example, the computing environment 103 sending the configuration profile 25 to the requesting client device 50. In some examples, an administrator can be notified prior to publication. The administrator can determine, for example, whether to authorize publication of the configuration profile 25 for the client device 50 or other client devices 50 having the same or similar operating system 166 installed thereon.

In step 1030, the computing environment 103 can cause the client devices 50 enrolled with the management service 115 to be configured in accordance with the configuration policies. In one example, the client device 50, upon receipt of a configuration profile 25, can automatically configure the client device 50 in accordance with the settings specified in the configuration profile 25. In another example, the client device 50, upon receipt of a configuration profile 25, can store the configuration profile 25 on the client device 50 until the computing environment 103 instructs the client device 50 to configure the client device 50 to self-configure using the configuration profile 25. If a client device 50 is part of more than one user group, any duplicate client applications, resources, or other data can be ignored, and if conflicting policies exist among the different user groups, then the more restrictive policy can be automatically employed. Thereafter, the process can proceed to completion.

Figure 18:
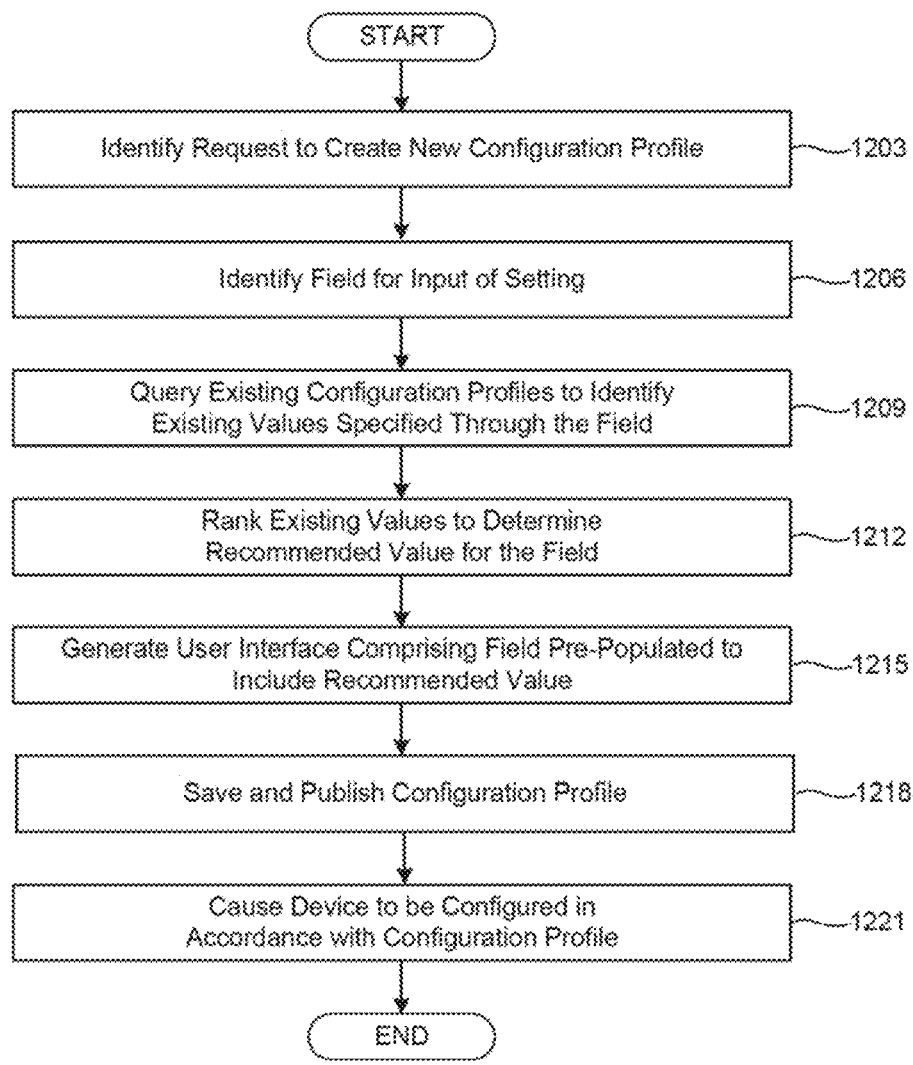
FIG. 18 is a flowchart illustrating functionality implemented by components of the networked environment.

Referring next to FIG. 18, shown is a flowchart that provides one example of the operation of a portion of the computing environment 103. The flowchart of FIG. 18 can be viewed as depicting an example of elements of a method implemented by the management service 115 executing in the computing environment 103 according to one or more examples. The separation or segmentation of functionality as discussed herein is presented for illustrative purposes only.

When customizing a configuration profile 25, administrators often encounter situations in which the administrators do not have a requisite understanding of a field 500 for a particular value. For instance, in the example user interface 169 of FIG. 11, an administrator may not understand whether to check a box to ignore SSL errors, whether to allow HTML format emails, and so forth. Accordingly, in examples described herein, a field 500 of a user interface 169 may be pre-populated using a default value where the default value is determined dynamically using pre-made or existing configuration profiles 25.

Beginning with step 1203, the computing environment 103 can identify a request to create a new configuration profile 25. For instance, an administrator can begin an ingestion process where the administrator is presented with a series of user interfaces 169 to obtain information that will be used to generate the configuration profile 25. For instance, the administrator can specify settings pertaining to client application 118 required for installation on the client devices 50. The administrator can further specify settings pertaining to policies to be implemented on the client device 50, such as hardware or software functions that are able to be performed on the client device 50. In some examples, the hardware or software functions can include taking a photograph, capturing a screenshot, using Bluetooth® functions, or other functions as can be appreciated.

Next, in step 1206, the computing environment 103 can identify a field 500 for input of a setting. For instance, the user interfaces 169 in the ingestion process include fields 500, such as textboxes, checkboxes, dropdown menus, or other types of fields 500, that allow an administrator to specify a setting for overseeing or managing operation of a client device 50. The computing environment 103 can identify the field 500, or other field 500, as a user interface 169 is generated. As can be appreciated, the field 500 may be associated with a setting that is problematic for some administrators to configure.

In step 1209, the computing environment 103 can query existing configuration profiles 25 to identify existing settings that have been specified through the field 500. For instance, the computing environment 103 can identify a value to recommend to the user based on values having been used in the creation of other configuration profiles 25. To this end, in some examples, a commonly used value can be identified as a suggestion for the administrator. In some examples, the computing environment 103 can query configuration profiles 25 previously created by the same administrator. In other examples, the computing environment 103 can query configuration profiles 25 previously created by a group of administrators at a same enterprise. In further examples, the computing environment 103 can query configuration profiles 25 previously created by administrators at various enterprises.

Next, in step 1212, the computing environment 103 can rank existing settings specified through the field 500 to determine a recommended value for the field 500. The computing environment 103 can rank the values identified in step 1209, for example, based on a score determined for each of the values. In some examples, a score can be determined for a value based on a number of uses of a value in active configuration profiles 25. In additional examples, the score can be determined for a value based on whether the value has caused an error on a client device 50. In further examples, the score can be determined for a value based on whether the value has been deployed on client devices 50 associated with similar types of enterprise. For example, assuming an enterprise operating the management service 115 is in the hotel industry, other values common for other enterprises in the hotel industry can be identified and scored higher than values common in non-related industries.

In some examples, an administrator can specify a number of client applications 118 that can be installed on the client devices 50. In these examples, the value identified to recommend to the user can include one or more client applications 118. In other examples, an administrator can specify one or more policies that can be implemented on the client devices 50, such as disabling camera functionality when a client device 50 is in a particular geographic location. The value identified for recommendation to the administrator can include policies implemented by similar types of enterprises.

In step 1215, the computing environment 103 can generate a user interface 169 comprising the field 500, where the field 500 is pre-populated to include the recommended value determined in step 1212. For instance, if the most commonly used setting for the field 500*a* in FIG. 11 is to check the box to "Ignore SSL Errors," the field 500*a* can be pre-checked. Similarly, if the most commonly used setting for the field 500*b* in FIG. 11 is "2 Weeks," the field 500*b* can be pre-populated to have "2 Weeks" as the default value. As can be appreciated, in some examples, a value can be determined and pre-populated in some fields 500, where other fields 500 are ignored and not pre-populated. The computing environment 103 can determine whether to prepopulate certain fields 500 based on, for example, a name attribute associated with the field 500. In some examples, a list of name attributes for the fields 500 to be pre-populated are stored in the data store 112. In other examples, the computing environment 103 can identify fields 500 having a predetermined string in the attributes for pre-population. For instance, any name attributes for fields 500 beginning or ending with, or otherwise including, the "prepop_" will be pre-populated whereas fields 500 not including the string will not be pre-populated. In some examples, the fields 500 can still be edited to change the pre-populated value to another value.

In step 1218, the computing environment 103 can save and publish the configuration profile 25. Publication can include, for example, the computing environment 103 sending the configuration profile 25 to the requesting client device 50. In some examples, an administrator can be notified prior to publication. The administrator can determine, for example, whether to authorize publication of the configuration profile 25 for the client device 50 or other client devices 50 having the same or similar operating system 166 installed thereon.

In step 1221, the computing environment 103 can cause the client devices 50 enrolled with the management service 115 to be configured in accordance with the configuration policies. In one example, the client device 50, upon receipt of a configuration profile 25, can automatically configure the client device 50 in accordance with the settings specified in the configuration profile 25. In another example, the client device 50, upon receipt of a configuration profile 25, can store the configuration profile 25 on the client device 50 until the computing environment 103 instructs the client device 50 to configure the client device 50 to self-configure using the configuration profile 25. If a client device 50 is part of more than one user group, any duplicate client applications, resources, or other data can be ignored and, if conflicting policies exist among the different user groups, then the more restrictive policy can be automatically employed. Thereafter, the process can proceed to completion.

The client devices 50 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 118, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 50 can include a display 172 upon which a user interface 169 generated by the client application 118 or another application can be rendered. In some examples, the user interface 169 can be generated using user interface data provided by the computing environment 103. The client device 50 can also include one or more input/output devices that can include, for example, a capacitive touchscreen or other type of touch input device, fingerprint reader, or keyboard.

Although the management service 115, the client application 118, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   at least one computing device; and
   program instructions executable in the at least one computing device that, when executed by the at least one computing device, cause the at least one computing device to:
      identify a request to generate a configuration profile, the configuration profile comprising information for configuring at least one client device through interaction with a management service;
      identify at least one field for input of a setting used to generate the configuration profile;
      query a plurality of existing configuration profiles to identify a plurality of existing settings specified through the at least one field;
      determine a score for each of the plurality of existing settings based at least in part on a number of active uses of a corresponding one of the plurality of existing settings in active ones of the plurality of existing configuration profiles;
      rank the plurality of existing settings to determine a recommended value for the at least one field based at least in part on the score determined for each of the plurality of existing settings;
      generate at least one user interface comprising the at least one field, wherein the at least one field is pre-populated in the at least one user interface to comprise the recommended value as a default value; and
      generate the configuration profile for deployment to the at least one client device.

2. The system of claim 1, wherein the recommended value is one of the plurality of existing settings having a highest score in the ranking.

3. The system of claim 1, wherein the recommended value is a client application recommended to install on a plurality of managed devices.

4. The system of claim 1, wherein:
   the at least one user interface is generated by the at least one computing device for access by a first enterprise; and
   the plurality of existing configuration profiles were generated by a second enterprise, the plurality of existing configuration profiles being identified by the at least one computing device based at least in part on the first enterprise and the second enterprise being in a same industry.

5. The system of claim 1, wherein the at least one field is a first one of a plurality of fields identified based at least in part on a predetermined string appearing in a name attribute associated with the at least one field.

6. The system of claim 1, wherein the configuration profile generated by the at least one computing device comprises an extensible markup language (XML) document for deployment to the at least one client device, the at least one client device being configured to, through execution of an agent application, configure the at least one client device in accordance with the configuration profile based at least in part on an analysis of an XML document.

7. The system of claim 1, wherein the configuration profile is generated by:
   determining an operating system and a version of the operating system installed on the at least one client device;
   identifying a variable name used by the version of the operating system to configure the at least one client device using the XML document; and
   generating the configuration profile using the variable name in at least one portion of the XML document.

8. A non-transitory computer-readable medium embodying program instructions executable in at least one computing device that, when executed by the at least one computing device, direct the at least one computing device to:
   identify a request to generate a configuration profile, the configuration profile comprising information for configuring at least one client device through interaction with a management service;
   identify at least one field for input of a setting used to generate the configuration profile;
   query a plurality of existing configuration profiles to identify a plurality of existing settings specified through the at least one field;
   determine a score for each of the plurality of existing settings based at least in part on a number of active uses of a corresponding one of the plurality of existing settings in active ones of the plurality of existing configuration profiles;
   rank the plurality of existing settings to determine a recommended value for the at least one field based at least in part on the score determined for each of the plurality of existing settings;
   generate at least one user interface comprising the at least one field, wherein the at least one field is pre-populated in the at least one user interface to comprise the recommended value as a default value; and
   generate the configuration profile for deployment to the at least one client device.

9. The non-transitory computer-readable medium of claim 8, wherein the recommended value is one of the plurality of existing settings having a highest score in the ranking.

10. The non-transitory computer-readable medium of claim 8, wherein the recommended value is a client application recommended to install on a plurality of managed devices.

11. The non-transitory computer-readable medium of claim 8, wherein:
the at least one user interface is generated by the at least one computing device for access by a first enterprise; and
the plurality of existing configuration profiles were generated by a second enterprise, the plurality of existing configuration profiles being identified by the at least one computing device based at least in part on the first enterprise and the second enterprise being in a same industry.

12. The non-transitory computer-readable medium of claim 8, wherein the at least one field is a first one of a plurality of fields identified based at least in part on a predetermined string appearing in a name attribute associated with the at least one field.

13. The non-transitory computer-readable medium of claim 8, wherein the configuration profile generated by the at least one computing device comprises an extensible markup language (XML) document for deployment to the at least one client device, the at least one client device being configured to, through execution of an agent application, configure the at least one client device in accordance with the configuration profile based at least in part on an analysis of an XML document.

14. The non-transitory computer-readable medium of claim 8, wherein the configuration profile is generated by:
determining an operating system and a version of the operating system installed on the at least one client device;
identifying a variable name used by the version of the operating system to configure the at least one client device using the XML document; and
generating the configuration profile using the variable name in at least one portion of the XML document.

15. A computer-implemented method, comprising:
identifying a request to generate a configuration profile, the configuration profile comprising information for configuring at least one client device through interaction with a management service;
identifying at least one field for input of a setting used to generate the configuration profile;
querying a plurality of existing configuration profiles to identify a plurality of existing settings specified through the at least one field;
determining a score for each of the plurality of existing settings based at least in part on a number of active uses of a corresponding one of the plurality of existing settings in active ones of the plurality of existing configuration profiles;
ranking the plurality of existing settings to determine a recommended value for the at least one field based at least in part on the score determined for each of the plurality of existing settings;
generating at least one user interface comprising the at least one field, wherein the at least one field is pre-populated in the at least one user interface to comprise the recommended value as a default value; and
generating the configuration profile for deployment to the at least one client device.

16. The computer-implemented method of claim 15, wherein the recommended value is one of the plurality of existing settings having a highest score in the ranking.

17. The computer-implemented method of claim 15, wherein the recommended value is a client application recommended to install on a plurality of managed devices.

18. The computer-implemented method of claim 15, wherein the at least one field is a first one of a plurality of fields identified based at least in part on a predetermined string appearing in a name attribute associated with the at least one field.

19. The computer-implemented method of claim 15, wherein the configuration profile generated by the at least one computing device comprises an extensible markup language (XML) document for deployment to the at least one client device, the at least one client device being configured to, through execution of an agent application, configure the at least one client device in accordance with the configuration profile based at least in part on an analysis of an XML document.

20. The computer-implemented method of claim 15, wherein the configuration profile is generated by:
determining an operating system and a version of the operating system installed on the at least one client device;
identifying a variable name used by the version of the operating system to configure the at least one client device using the XML document; and
generating the configuration profile using the variable name in at least one portion of the XML document.

* * * * *